(12) United States Patent
Vorbach

(10) Patent No.: US 12,293,193 B2
(45) Date of Patent: May 6, 2025

(54) ADVANCED PROCESSOR ARCHITECTURE

(71) Applicant: Ubitium GmbH, Dusseldorf (DE)

(72) Inventor: Martin Vorbach, Lingenfeld (DE)

(73) Assignee: Ubitium GmbH, Dusseldorf (DE)

( * ) Notice: Subject to any disclaimer, the term of this patent is extended or adjusted under 35 U.S.C. 154(b) by 0 days.

(21) Appl. No.: 17/373,592

(22) Filed: Jul. 12, 2021

(65) Prior Publication Data

US 2021/0406027 A1 Dec. 30, 2021

Related U.S. Application Data

(63) Continuation of application No. 15/535,697, filed as application No. PCT/US2015/065418 on Dec. 13, 2015, now Pat. No. 11,061,682.

(30) Foreign Application Priority Data

Dec. 15, 2014 (EP) ................................ 14197929
Jun. 24, 2015 (EP) ................................ 15020103

(51) Int. Cl.
*G06F 9/38* (2018.01)
*G06F 9/30* (2018.01)
*G06F 9/32* (2018.01)

(52) U.S. Cl.
CPC .......... *G06F 9/3856* (2023.08); *G06F 9/3001* (2013.01); *G06F 9/30065* (2013.01); *G06F 9/30098* (2013.01); *G06F 9/3017* (2013.01); *G06F 9/325* (2013.01); *G06F 9/327* (2013.01); *G06F 9/382* (2013.01); *G06F 9/3824* (2013.01); *G06F 9/3826* (2013.01);

(Continued)

(58) Field of Classification Search
CPC ..................................................... G06F 9/3826
See application file for complete search history.

(56) References Cited

U.S. PATENT DOCUMENTS 5,699,537 A   12/1997   Sharangpani et al.
5,923,862 A    7/1999   Nguyen et al.
(Continued)

FOREIGN PATENT DOCUMENTS

EP    14185745.8      9/2014
WO    2002/071249     9/2002
(Continued)

OTHER PUBLICATIONS

"ARM7TDMI-S Data Sheet", Document No. ARM DDI 0084D, ARM Ltd., UK, 1998, 60 pages.
(Continued)

*Primary Examiner* — Michael J Metzger
(74) *Attorney, Agent, or Firm* — Zhong Law, LLC

(57) ABSTRACT

The invention relates to a method for processing instructions out-of-order on a processor comprising an arrangement of execution units. The inventive method comprises looking up operand sources in a Register Positioning Table and setting operand input references of the instruction to be issued accordingly, checking for an Execution Unit (EXU) available for receiving a new instruction, and issuing the instruction to the available Execution Unit and entering a reference of the result register addressed by the instruction to be issued to the Execution Unit into the Register Positioning Table (RPT).

21 Claims, 26 Drawing Sheets

(52) U.S. Cl.
CPC .......... *G06F 9/3828* (2013.01); *G06F 9/3836* (2013.01); *G06F 9/384* (2013.01); *G06F 9/3842* (2013.01); *G06F 9/3844* (2013.01); *G06F 9/3846* (2013.01); *G06F 9/3848* (2013.01); *G06F 9/3854* (2023.08); *G06F 9/3858* (2023.08); *G06F 9/3861* (2013.01); *G06F 9/3863* (2013.01); *G06F 9/3885* (2013.01)

(56) References Cited

U.S. PATENT DOCUMENTS

| | | | |
|---|---|---|---|
| 6,560,629 B1* | 5/2003 | Harris | G06F 9/30058 712/10 |
| 7,096,345 B1 | 8/2006 | Chen et al. | |
| 7,111,152 B1 | 9/2006 | Cofler et al. | |
| 7,958,336 B2* | 6/2011 | Lahav | G06F 9/3859 712/216 |
| 2006/0101232 A1* | 5/2006 | Takada | G06F 15/7867 712/E9.067 |
| 2009/0216993 A1* | 8/2009 | Venkumahanti | G06F 9/3885 712/225 |
| 2010/0122071 A1* | 5/2010 | Yoshikawa | G06F 15/7867 712/225 |
| 2014/0201509 A1* | 7/2014 | Jackson | G06F 9/3806 712/239 |

FOREIGN PATENT DOCUMENTS

| | | |
|---|---|---|
| WO | 2010/142432 | 2/2010 |
| WO | 2010/043401 | 4/2010 |
| WO | 2011/079942 | 7/2011 |
| WO | 2012/003997 | 1/2012 |
| WO | 2012/123061 | 9/2012 |
| WO | 2012/167933 | 12/2012 |
| WO | 2013/098643 | 7/2013 |

OTHER PUBLICATIONS

"Computer Organization and Architecture, Chapter 15. Control Unit Operation", umcs.maine.edu, http://aturing.umcs.maine.edu/~meadow/courses/cos335/COA15.pdf,, Mar. 16, 2010, 9 pages.

Balasubramonian, "Lecutre Notes: Out-of-Order Processors", University of Utah, Oct. 13, 2007, 8 pages.

WIPO, International Search Report for International Patent Application No. PCT/US2015/065418, Jul. 7, 2016, 6 pages.

WIPO, Written Opinion for International Patent Application No. PCT/US2015/065418, Jul. 7, 2016, 8 pages.

Fog, "The microarchitecture of Intel, AMD and VIA CPUs: An optimization guide for assembly programmers and compiler makers", http://www.agner.org/optimize/microarchitecture.pdf, 1996-2017, 233 pages.

Goulding-Hotta, et al., "The GreenDroid Mobile Application Processor: an Architecture for Silicon's Dark Future", University California, San Diego; Published by the IEEE Computer Society, Mar./Apr. 2011, 10 pages.

Gunadi, et al., "CRIB: Consolidated Rename, Issue, and Bypass", ISCA'11, Jun. 4-8, 2011, San Jose, California, USA, 2011, 10 pages.

WIPO, International Preliminary Report for Patentability for International Patent Application No. PCT/US2015/065418, Jun. 20, 2017, 9 pages.

Jeong, et al., "In-Order Issue Out-of-Order Execution Floating-Point Coprocessor for CalmRISC32", Proceedings of the 15th IEEE Symposium on Computer Arithmetic, 2001, pp. 195-200.

Lazzaro, "CS 152 Computer Architecture and Engineering: Lecture 6—Superpipelining + Branch Pre-diction", UC Berkeley, https://inst.eecs.berkeley.edu/~cs152/sp14/lecnotes/lec3-2.pdf, Feb. 6, 2014, 37 pages.

Rotenberg, et al., "Trace Cache: a Low Latency Approach to High Bandwidth Instruction Fetching", Proceedings of the 29th annual ACM/IEEE international symposium on Microarchitecture. IEEE Computer Society, Dec. 2-4, 1996, 12 pages.

Sima, "Microarchitecture of Superscalars (3): Branch Prediction", Universitas Budensis, John von Neumann Faculty of Informatics, Fall 2007, 73 pages.

Thomadakis, "The Architecture of the Nehalem Processor and Nehalem-EP SMP Platforms", Texas A&M University, Mar. 17, 2011, 49 pages.

Tomasulo, "An Efficient Algorithm for Exploiting Multiple Arithmetic Units", IBM Journal of Research and Development archive; vol. 11, Issue 1, Jan. 1967, pp. 25-33.

UK Intellectual Property Office, Examination Report for United Kingdom Patent Application No. 1711202.0, Aug. 17, 2017, 10 pages.

UK Intellectual Property Office, Examination Report for United Kingdom Patent Application No. 1711202.0, Aug. 20, 2018, 5 pages.

USPTO, Non-final Office Action for U.S. Appl. No. 15/535,697, filed Jan. 11, 2019, 7 pages.

USPTO, Notice of Allowance for U.S. Appl. No. 15/535,697, filed Jan. 8, 2021, 8 pages.

USPTO, Non-final Office Action for U.S. Appl. No. 15/535,697, filed May 13, 2020, 8 pages.

USPTO, Final Office Action for U.S. Appl. No. 15/535,697, filed Sep. 12, 2019, 9 pages.

\* cited by examiner

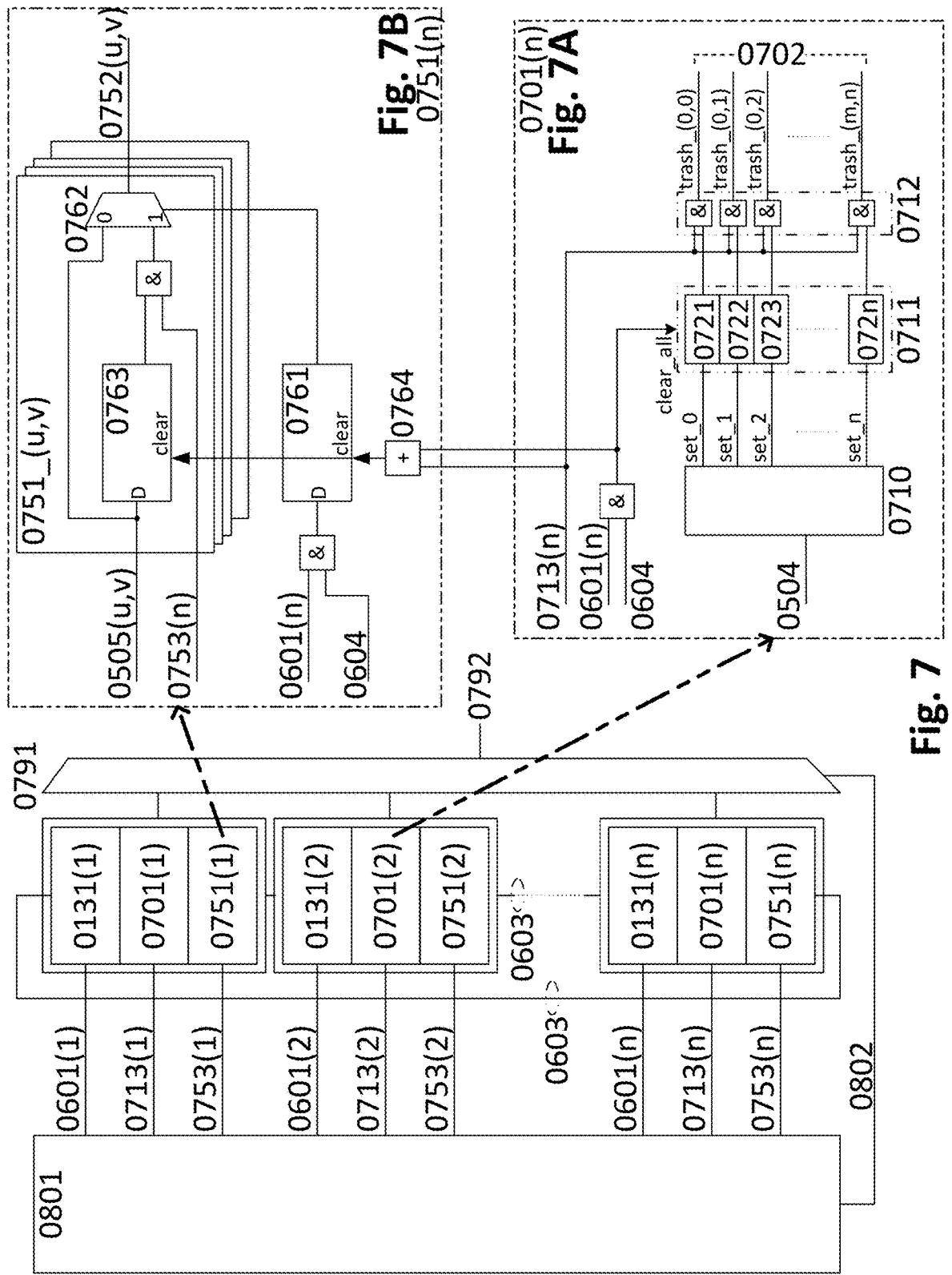

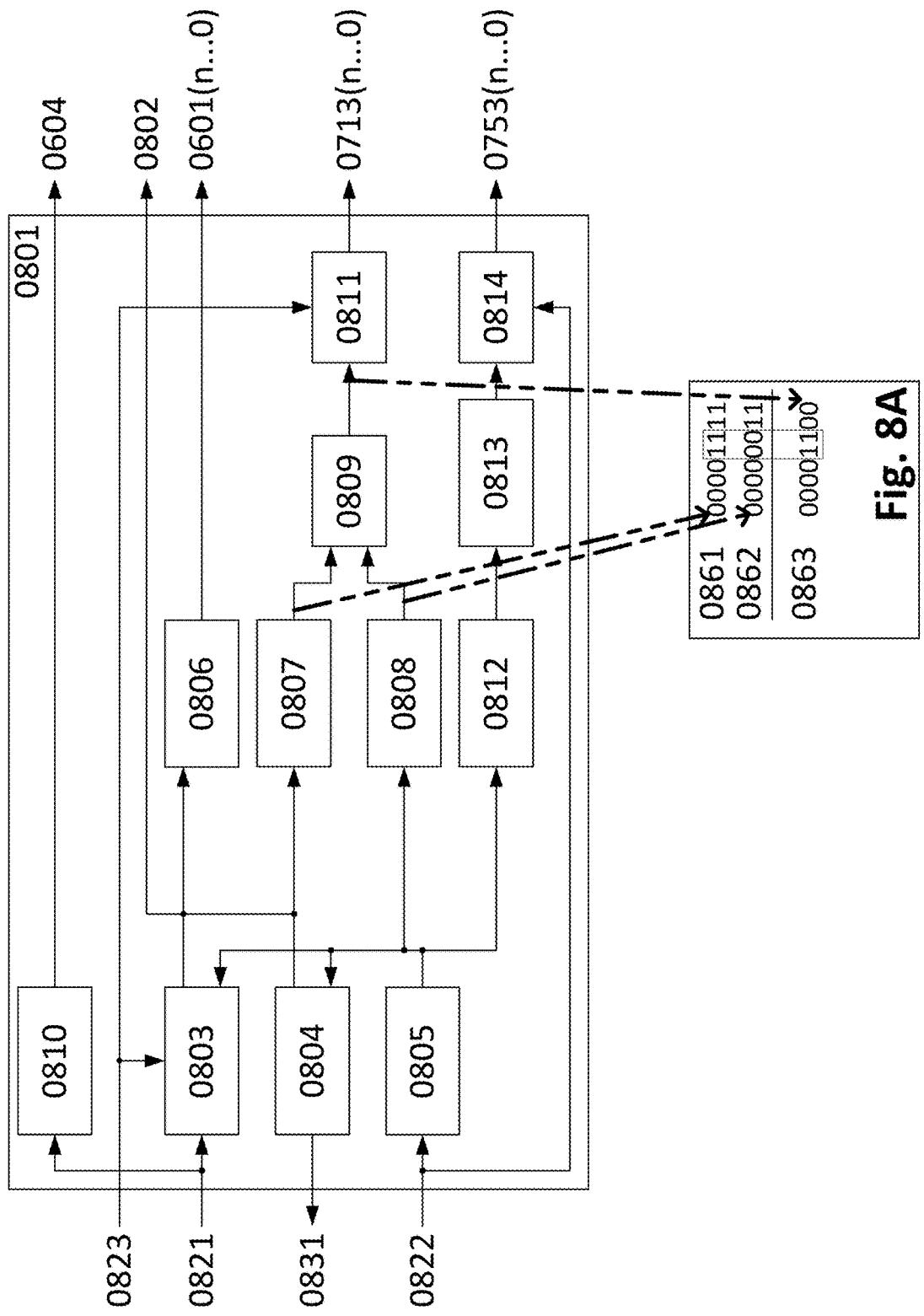

```
while:  MOV    R0, R1, #5    0952   ; R0 is current number, 5 assumed for start value
        MOV    R1, #0               ; R1 is count of number of iterations
        SUBS   R7, R0, #1           ; repeat if R0 != 1
        BEQ    exit
body:   ADD    R1, R1, #1           ; increment number of iterations
        ANDS   R7, R0, #1           ; test whether R0 is odd
        BEQ    even
        ADD    R0, R0, R0, LSL #1   ; if odd, set R0 = R0 + (R0 << 1) + 1
        ADD    R0, R0, #1
        B      while                ; could jump directly to 'loop': (guaranteed R0 > 1)
even:   MOV    R0, R0, ASR #1       ; if even, set R0 = R0 >> 1
        B      while
exit:                               ; else done
```

Fig. 9A

```
while:  MOV    R1, #0        0951   ; R1 is count of number of iterations
        MOV    R0, #5               ; R0 is current number, 5 assumed for start value
        SUBS   R7, R0, #1    0931 0941  ; repeat if R0 != 1
        BEQ    exit
body:   ADD    R1, R1, #1           ; increment number of iterations
        ANDS   R7, R0, #1           ; test whether R0 is odd
        ADDNE  R0, R0, R0, LSL #1   ; if odd, set R0 = R0 + (R0 << 1) + 1
        ADDNE  R0, R0, #1
        MOVEQ  R0, R0, ASR #1  0942 ; if even, set R0 = R0 >> 1
        B      while         0932
exit:                               ; else done
```

Fig. 9B

```
        MOV    R0, #5              ; R0 is current number, 5 assumed for start value
        MOV    R1, #0              ; R1 is count of number of iterations
while   SUBS   R7, R0, #1          ; repeat if R0 != 1
        BEQ    exit
body    ADD    R1, R1, #1          ; increment number of iterations
        ANDS   R7, R0, #1          ; test whether R0 is odd
        ADD    R2, R0, R0, LSL #1  ; if odd, set R0 = R0 + (R0 << 1) + 1; SPECULATIVE!!
        ADDNE  R0, R2, #1
0901    MOVEQ  R0, R0, ASR #1      ; if even, set R0 = R0 >> 1
        B      while               ; else done
exit
```
                                                                                      0902

```
        MOV    R0, #5              ; R0 is current number, 5 assumed for start value
        MOV    R1, #0              ; R1 is count of number of iterations
while   SUBS   R7, R0, #1          ; repeat if R0 != 1
        BEQ    exit
body    ADD    R1, R1, #1          ; increment number of iterations
        ADD    R2, R0, R0, LSL #1  ; if odd, set R0 = R0 + (R0 << 1) + 1; SPECULATIVE!!
        IF     #2, R0 & #1
        ADD.T  R0, R2, #1
0921    MOV.F  R0, R0, ASR #1      ; if even, set R0 = R0 >> 1
        B      while               ; else done
exit
```

Fig. 9D

```
              mov  r0, #0       ; i
i_loop:       mov  r1, #0       ; k k_loop:  ┌─────────────────────────────────┐
         │ mul  r3, r10, r0                │
         │ add  r3, r3, r1                 │
         │ ldr  r3, [r7, r3]; matrix C     │   1101
         └─────────────────────────────────┘ mov  r2, #0       ; j j_loop:  ┌─────────────────────────────────┐
         │ mul  r4, r10, r0                │
         │ add  r4, r4, r2                 │
         │ ldr  r4, [r8, r4]; matrix A     │   1102
         └─────────────────────────────────┘

┌─────────────────────────────────┐
         │ mul  r5, r12, r2                │
         │ add  r5, r5, r1                 │
         │ ldr  r5, [r9, r5]; matrix B     │   1103
         └─────────────────────────────────┘

┌─────────────────────────────────┐
         │ mul  r4, r4, r5                 │
         │ add  r3, r3, r4                 │   1121
         └─────────────────────────────────┘

┌─────────────────────────────────┐
         │ add  r2, r2, #1  ; end j_loop   │
         │ cmp  r2, r12                    │
         │ bne  j_loop                     │   1111
         └─────────────────────────────────┘

┌─────────────────────────────────┐
         │ mul  r4, r10, r0                │
         │ add  r4, r4, r1                 │
         │ str  r3, [r7, r4]               │   1104
         └─────────────────────────────────┘

┌─────────────────────────────────┐
         │ add  r1, r1, #1  ; end k_loop   │
         │ cmp  r1, r11                    │
         │ bne  k_loop                     │   1112
         └─────────────────────────────────┘

┌─────────────────────────────────┐
         │ add  r0, r0 #1   ; end i_loop   │
         │ cmp  r0, r10                    │
         │ bne  i_loop                     │   1113
         └─────────────────────────────────┘ exit:
```

Fig. 11

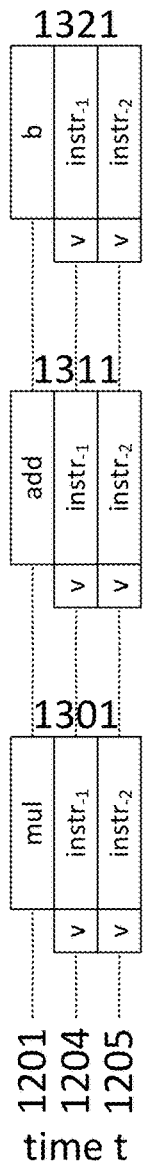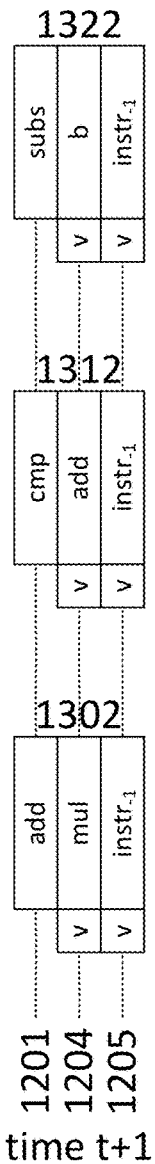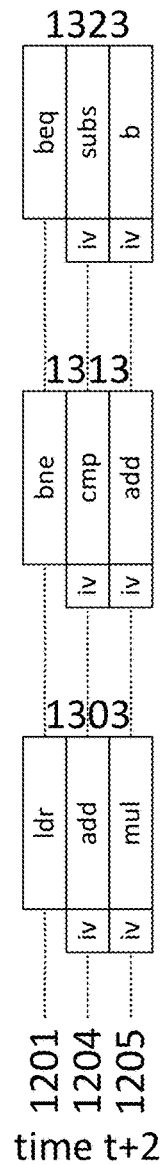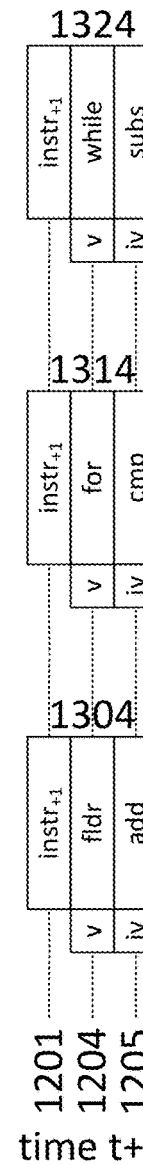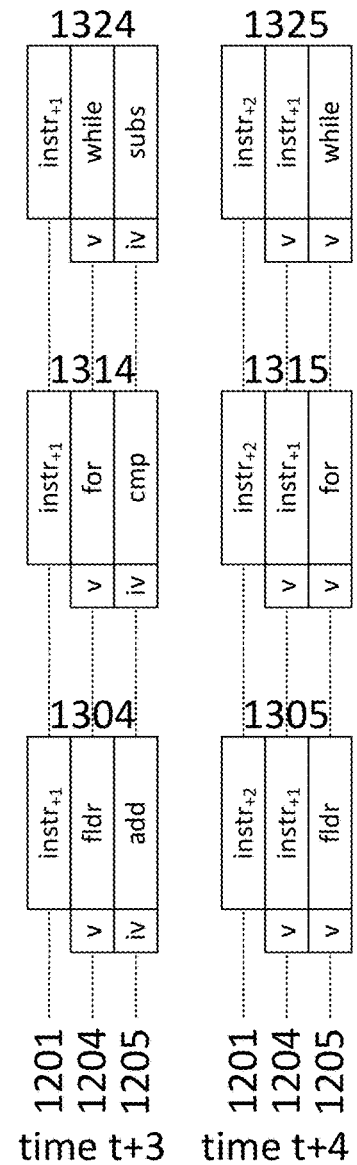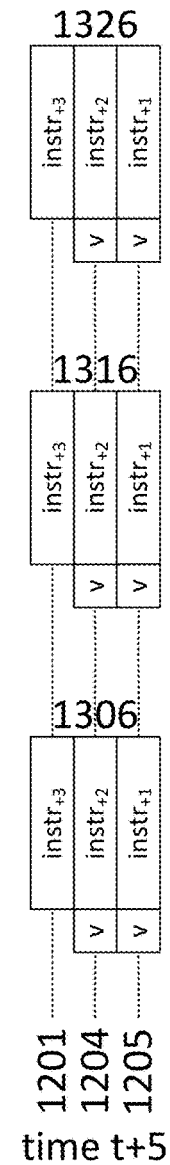
Fig. 13A  Fig. 13B  Fig. 13C

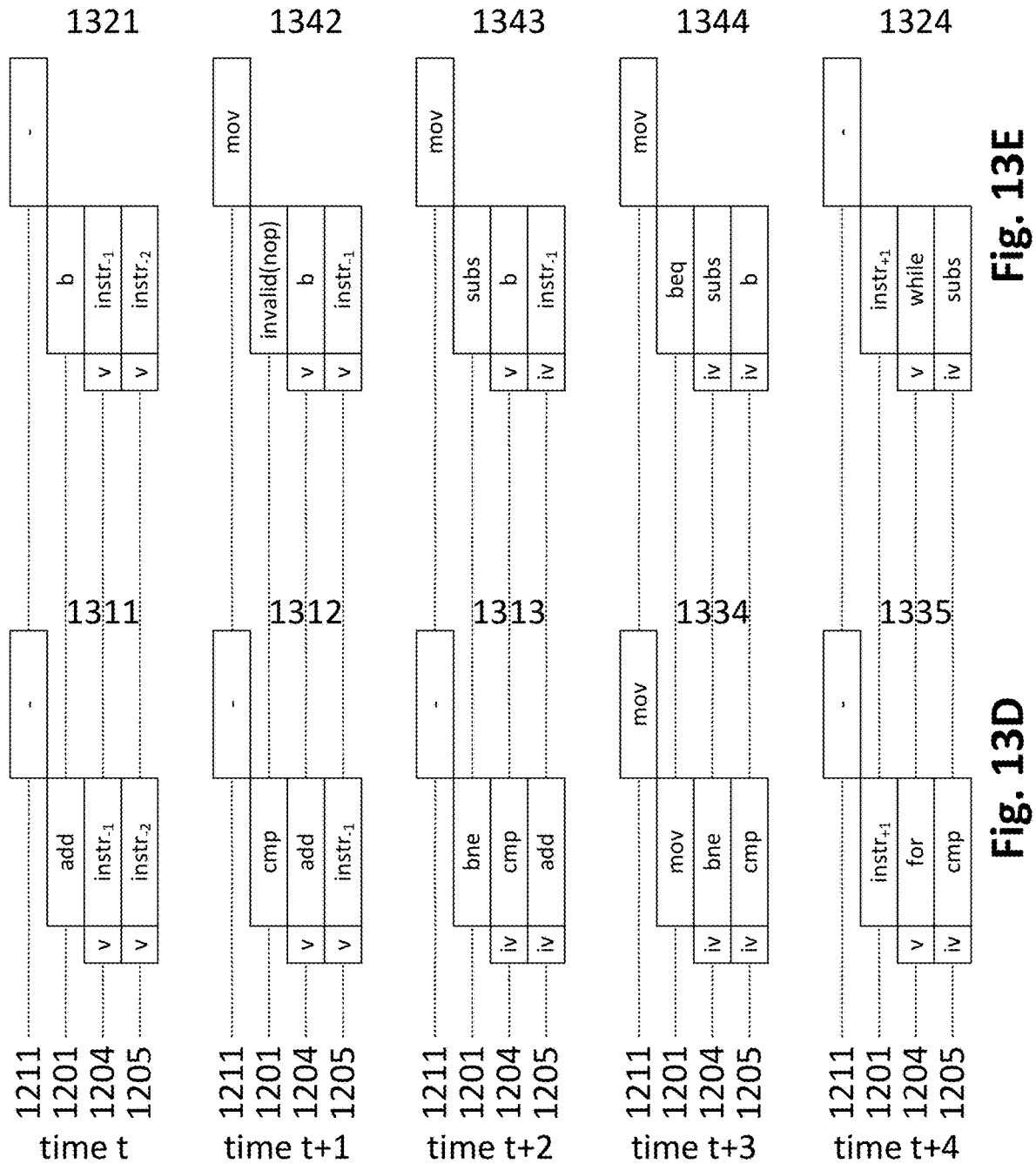

```
            mov       r0, #0        ; i
i_loop:     mov       r1, #0        ; k k_loop:     fldr      r3, [r3, (r10*r0)+r1)]    1401
            mov       r2, #0        ; j j_loop:     fldr      r4, [r8, (r10*r0)+r2)]    1402
            fldr      r5, [r8, (r12*r2)+r1)]    1403 mul       r4, r4, r5
            add       r3, r3, r4 endfor    (r2, +#1, r12, j_loop)    1411 fstr      r3, [r7, (r10*r0)+r1)]    1404 endfor    (r1, +#1, r11, k_loop)    1412
            endfor    (r0, +#1, r10, i_loop)    1413 exit:
```

Fig. 14A

```
            (nop)     ; mov    r0, #0           1431
i_loop:     (nop)     ; mov    r1, #0           1432 k_loop:     fldr      r3, [r3, (r10*r0)+r1)]    1401
            (nop)     ; mov    r2, #0           1433 j_loop:     fldr      r4, [r8, (r10*r0)+r2)]    1402
            fldr      r5, [r8, (r12*r2)+r1)]    1403 mul       r4, r4, r5
            add       r3, r3, r4   1431 endfor    (r2, +#1, r12, j_loop, #0)  1421 fstr      r3, [r7, (r10*r0)+r1)]    1404 endfor    (r1, +#1, r11, k_loop, #0)  1422
            endfor    (r0, +#1, r10, i_loop, #0)  1423 exit:
```

Fig. 14B

```
i_loop:     for       (r0, +#1, r10, #0)

k_loop:     for       (r1, +#1, r11, #0)
            fldr      r3, [r3, (r10*r0)+r1)]

j_loop:     for       (r2, +#1, r12, #0)
            fldr      r4, [r8, (r10*r0)+r2)]
            fldr      r5, [r8, (r12*r2)+r1)]

mul       r4, r4, r5
            add       r3, r3, r4 endfor fstr      r3, [r7, (r10*r0)+r1)]

endfor
            endfor exit:
```

Fig. 14C

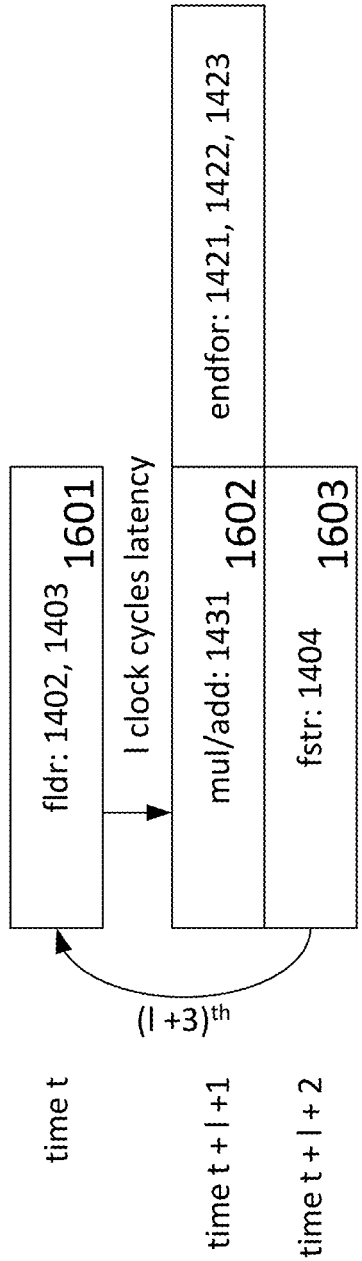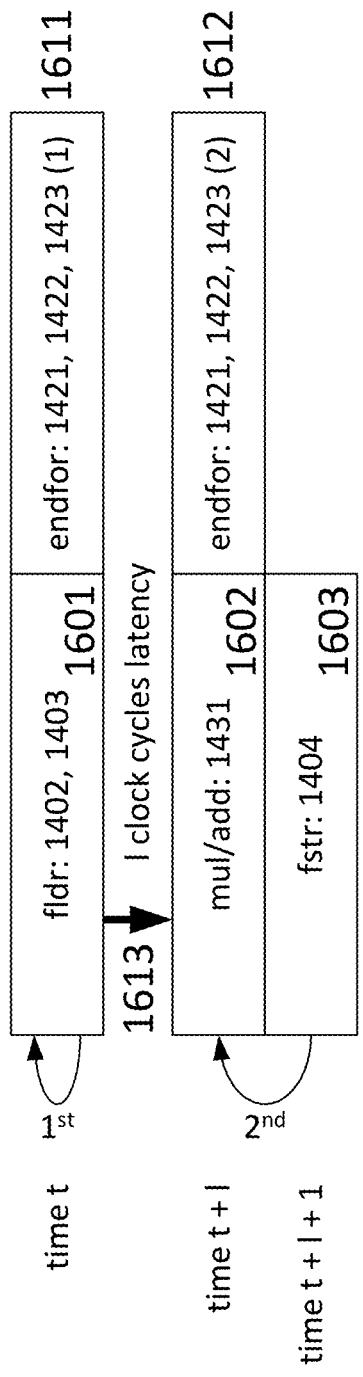
Fig. 16A
Fig. 16B

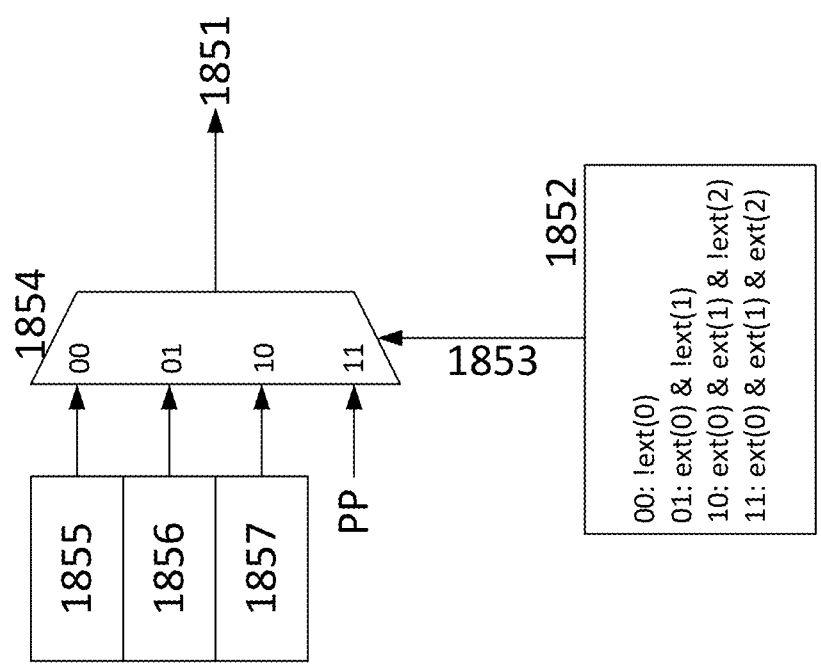

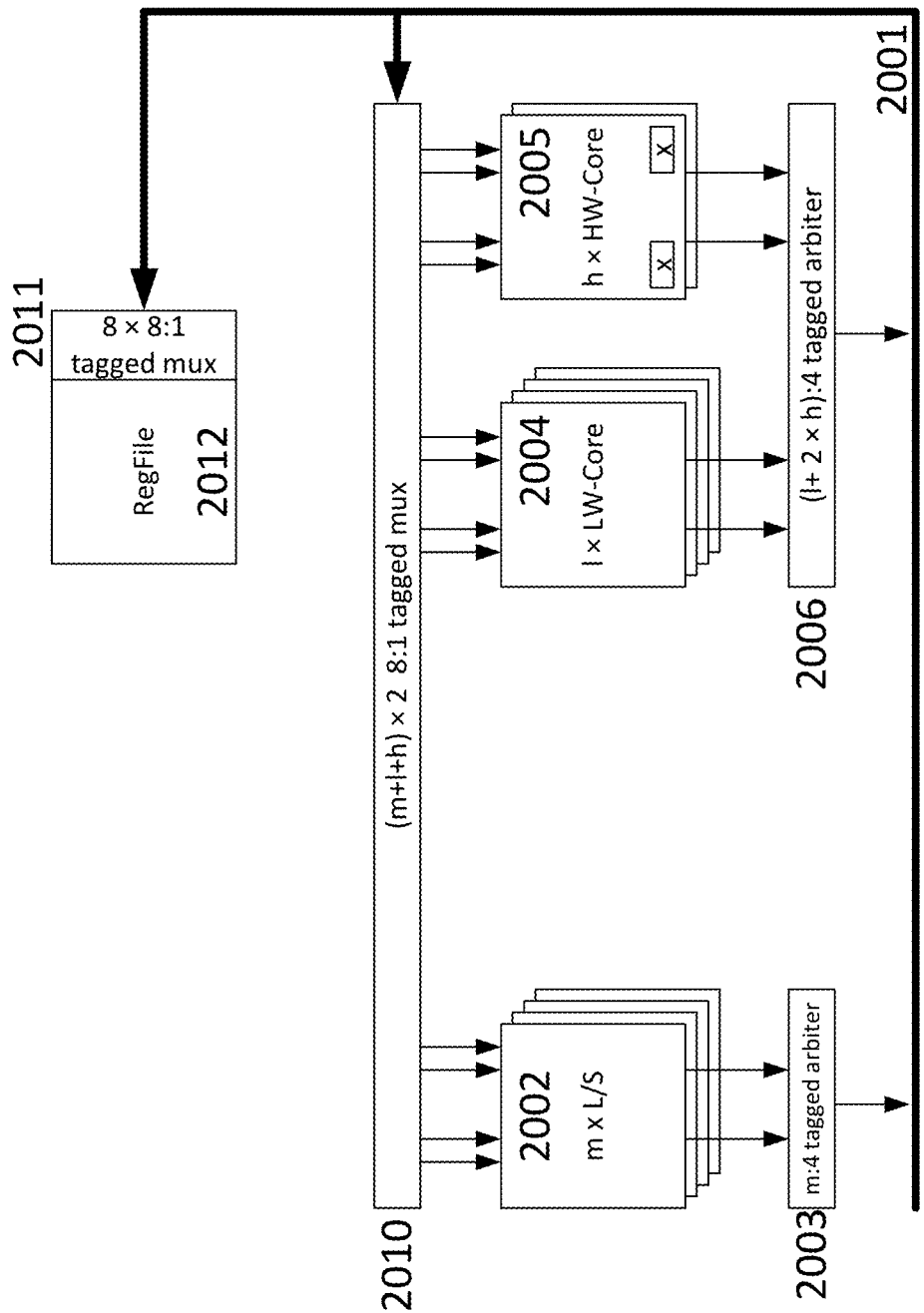

ADVANCED PROCESSOR ARCHITECTURE

CROSS REFERENCE TO RELATED APPLICATIONS

The present application is a continuation of U.S. patent application Ser. No. 15/535,697, filed Jun. 13, 2017, which is a U.S. national phase application of International Patent Application No. PCT/US2015/065418, filed Dec. 13, 2015, which claims priority to European Patent Application No. 14197929.4, filed Dec. 15, 2014, and European Patent Application No. 15020103.6, filed Jun. 24, 2015, the contents of all of which are incorporated herein by reference in their entirety.

The present application also claims priority to the following applications, all incorporated by reference in their entirety:
PCT/EP2009/007415, filed Oct. 15, 2009;
PCT/EP2010/003459, filed Jun. 9, 2010;
PCT/EP2010/007950, filed Dec. 28, 2010;
PCT/EP2011/003428, filed Jul. 8, 2011;
PCT/EP2012/000713, filed Feb. 17, 2012;
PCT/EP2012/002419, filed Jun. 6, 2012;
PCT/IB2012/002997, filed Dec. 17, 2012; and
EP 14 18 5745.8, filed Sep. 22, 2014.

BACKGROUND AND FIELD OF INVENTION

The present invention relates to data processing in general and to data processing architecture in particular.

Energy efficient, high speed data processing is desirable for any processing device. This holds for all devices wherein data are processed such as cell phones, cameras, hand held computers, laptops, workstations, servers and so forth offering different processing performance based on accordingly adapted architectures.

Often similar applications need to be executed on different devices and/or processor platforms. Since coding software is expensive, it is be desirable to have software code which can be compiled without major changes for a large number of different platforms offering different processing performance.

It would be desirable to provide a data processing architecture that can be easily adapted to different processing performance requirements while necessitating only minor adoptions to coded software.

BRIEF DESCRIPTION OF THE DRAWINGS

FIG. 5A is a diagrammatic illustration of an example Register Positioning Table which can be used in the implementation of FIG. 5;
FIG. 7 is a diagrammatic illustration of an example implementation using a described Issue Unit;
FIG. 7A is a diagrammatic illustration of an example Trash Unit for an associated Register Positioning Table;
FIG. 7B is a diagrammatic illustration of an example Sample-and-Hold Unit comprising a dedicated Sample-and-Hold Stage for each one of the Execution Units;
FIG. 8 is a diagrammatic illustration of an example Control Unit;
FIG. 8A is a diagrammatic illustration of example level outputs of decoders of the Control Unit of FIG. 8;
FIGS. 9A-9D are diagrammatic illustrations of examples of assembly programs and pseudo code including interrupt processing;
FIG. 11 is a diagrammatic illustration of example code implementing an example matrix multiplication for an Analyzer and Optimizer Unit (AOU);
FIGS. 13A-13E are diagrammatic illustrations of different example instruction patterns operated on by an AOU;
FIGS. 14A-14C are diagrammatic illustrations of example instructions and/or microcode generated by an AOU;
FIGS. 16A-16D are diagrammatic illustrations of example execution sequences;
FIG. 18A is a diagrammatic illustration of an example implementation providing computation of a Program Pointer (PP) while a Loop Control Unit is active;
FIG. 20 is a diagrammatic illustration of an example implementation of a shared bus.

DETAILED DESCRIPTION OF THE INVENTION

Figure 1:
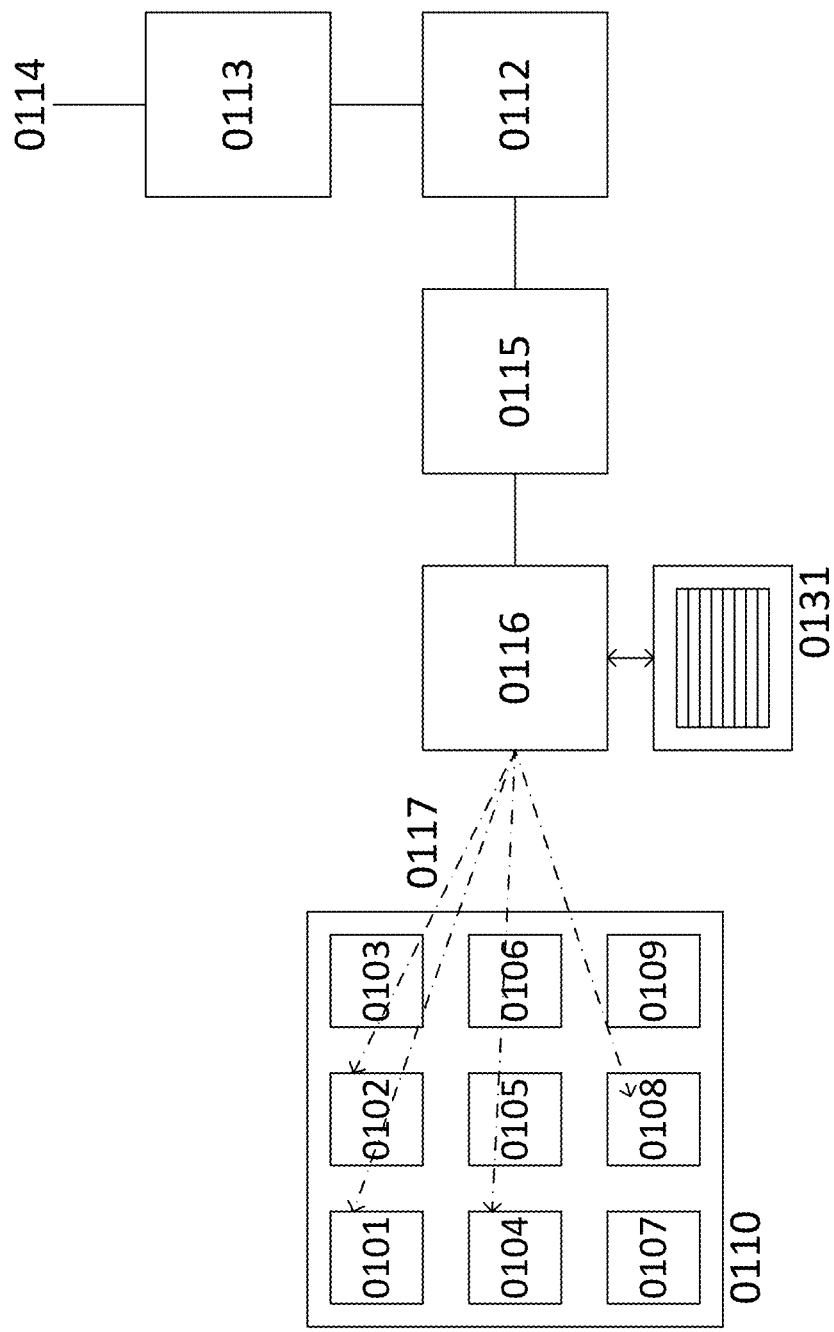
FIG. 1 is a diagrammatic illustration of an example EXU-Block comprising multiple EXUs.

This patent describes a novel, optimized method and architecture overcoming the above limitations.

This patent focuses on implementations of out-of-order processing modes on ZZYX processors.

It is an object of the present invention to provide an improvement over the prior art of processing architectures with respect to at least one of data processing efficiency, power consumption and reuse of the software codes.

The present invention describes a new processor architecture called ZZYX thereafter, overcoming the limitations of both, sequential processors and dataflow architectures, such as reconfigurable computing.

It shall be noted that whereas hereinafter, frequently terms such as "each" or "every" and the like are used when certain preferred properties of elements of the architecture and so forth are described. This is done so in view of the fact that generally, it will be highly preferred to have certain advantageous properties for each and every element of a group of similar elements. It will be obvious to the average skilled person however, that some if not all of the advantages of the present invention disclosed hereinafter might be obtainable, even if only to a lesser degree, if only some but not all similar elements of a group do have a particular property. Thus, the use of certain words such as "each", "any" "every" and so forth. is intended to disclose the preferred mode of invention and whereas it is considered feasible to limit any claim to only such preferred embodiments, it will be obvious that such limitations are not meant to restrict the scope of the disclosure to only the embodiments preferred. Subsequently Trace-Caches are used. Depending on their implementation, they either hold undecoded instructions or decoded instructions. Decoded instructions might be microcode according to the state of the art. Hereinafter the content of Trace-Caches is simply referred as instruction or opcodes. It shall be pointed out, that depending on the implementation of the Trace-Cache and/or the Instruction Decode (ID) stage, actually microcode might reside in the Trace-Cache. It will be obvious for one skilled in the art that this is solely implementation dependent; it is understood that "instructions" or "opcodes" in conjunction with Trace-Cache is understood as "instructions, opcodes and/or microcodes (depending on the embodiment)".

It shall also be noted that notwithstanding the fact that a completely new architecture is disclosed hereinafter, several aspects of the disclosure are considered inventive per se, even in cases where other advantageous aspects described hereinafter are not realized.

The technology described in this patent is particularly applicable on
  ZYXX processors as described in PCT/EP 2009/007415 and PCT/EP 2011/003428 and PCT/EP 2012/000713 and DE 11 007 370.7;
  their memory architectures as described in PCT/EP 2010/003459, which are also applicable on multi-core processors are known in the state of the art (e.g. from Intel, AMD, MIPS, IBM and ARM); and
  exemplary methods for operating ZYXX processors and the like as described in ZZYX09 (DE 10 013 932.8), PCT/EP 2010/007950.

Particularly reference is made to following related patent applications: Priority is claimed to the patent applications [1], [2], [3], [4], [5], [6], [7], and [8].

The patents listed above are fully incorporated by reference for detailed disclosure.

The ZZYX processor comprises multiple ALU-Blocks in an array with pipeline stages between each row of ALU-Blocks. Each ALU-Block may comprise further internal pipeline stages. In contrast to reconfigurable processors data flows preferably in one direction only, in the following exemplary embodiments from top to bottom. Each ALU may execute a different instruction on a different set of data, whereas the structure may be understood as a MIMD (Multiple Instruction, Multiple Data) machine.

It shall be explicitly noted, that the term ALU or ALU-Block is not limiting to the functionality of Arithmetic-Logic-Units. It should rather be understood as EXU or EXU-Block, where EXU stands for Execution Unit. Thus an "ALU" within an ALU-Block might support arithmetic-logic functions, but not necessarily has to. An "ALU" as used in this specification might be for example a floating point unit, a multiplier, a square root unit, a fixed function unit, such as a crypto or Huffman accelerator, or an Arithmetic-Logic Unit in the traditional meaning.

In a preferred embodiment, the arrangement of ALUs of the ALU-Block is heterogeneous, i.e. not every ALU of the ALU-Block is the same and does not comprise the same functionality. For example most ALUs of the ALU-Block might be actual ALUs for processing integer and logic operations, while some others might comprise floating point units for processing floating point numbers and others again might comprise SIMD or Vector units.

Starting with this specification the term EXU-Block will be introduced and replace the term ALU-Block. EXU-Block and ALU-Block shall be understood synonymously. Yet, in light of the aforesaid, we decided that the terms "EXU-Block" (compared to "ALU-Block") and "EXU" compared to "ALU" might be more precise.

The ZZYX processor is optimized for loop execution. In contrast to traditional processors, instructions once issued to the EXUs may stay the same for a plurality of clock cycles, while multiple data words are streamed through the EXUs. Each of the multiple data words is processed based on the same temporarily fixed instructions. After a plurality of clock cycles, e.g. when the loop has terminated, the operation continues with one or a set of newly fetched, decoded and issued instruction(s).

The ZZYX processor provides sequential VLIW-like processing combined with superior dataflow and data stream processing capabilities. The ZZYX processor cores are scalable in at least 3 ways:
1. The number of EXUs can be scaled at least two dimensionally according to the required processing performance; the term multi-dimensional is to refer to "more than one dimension". It should be noted that stacking several planes will lead to a three dimensional arrangement;
2. the amount of Load/Store units and/or Local Memory Blocks is scalable according to the data bandwidth required by the application;
3. the number of ZZYX cores per chip is scalable at least one dimensionally, preferably two or more dimensionally, according to the product and market. Low cost and low power mobile products (such as mobile phones, PDAs, cameras, camcorders and mobile games) may comprise only one or a very small amount of ZZYX cores, while high end consumer products (such as Home PCs, HD Settop Boxes, Home Servers, and gaming consoles) may have tens of ZZYX cores or more.
  High end applications, such as HPC (high performance computing) systems, accelerators, servers, network infrastructure and high and graphics may comprise a very large number of interconnected ZZYX cores.

ZZYX processors may therefore represent one kind of multicore processor and/or chip multiprocessors (CMPs) architecture.

The major benefit of the ZZYX processor concept is the implicit software scalability. Software written for a specific ZZYX processor will run on single processor as well as on a multi processor or multicore processor arrangement without modification as will be obvious from the text following hereinafter. Thus, the software scales automatically according to the processor platform it is executed on.

The concepts of the ZZYX processor and the inventions described in this patent are applicable on traditional processors, multithreaded processors and/or multi-core processors. A traditional processor is understood as any kind of processor, which may be a microprocessor, such as e.g. an AMD Phenom, Intel i7, i5, Pentium, Core2 or Xeon, IBM's and Sony's CELL processor, IBM's Power(PC), ARM, Tensilica or ARC; but also DSPs such as e.g. the C64 family from TI, 3DSP, Starcore, or the Blackfin from Analog Devices.

The concepts disclosed are also applicable on reconfigurable processors, such as SiliconHive, IMEC's ADRES, the DRP from NEC, Stretch, or IPFlex; or multi-processors systems such as Picochip or Tilera. Most of the concepts, especially the memory hierarchy, local memories elements, and Instruction Fetch units as well as the basic processor model can be used in FPGAs, either by configuring the according mechanisms into the FPGAs or by implementing according hardwired elements fixedly into the silicon chip. FPGAs are known as Field Programmable Gate Arrays, well known from various suppliers such as XILINX (e.g. the Virtex or Spartan families), Altera, or Lattice.

The concepts disclosed are particularly well applicable on stream processors, graphics processors (GPU) as for example known from NVidia (e.g. GeForce, and especially the CUDA technology), ATI/AMD and Intel, and especially General Purpose Graphics Processors (GPGPU) also know from NVidia, ATI/AMD and Intel.

ZZYX processors may operate stand alone, or integrated partially, or as a core into traditional processors or FPGAs (such as e.g. Xilinx Virtex, Spartan, Artix, Kintex, ZYNQ; or e.g. Altera Stratix, Arria, Cyclone). While ZZYX may operate as a co-processor or thread resource connected to a processor (which may be a microprocessor or DSP), it may be integrated into FPGAs as processing device. FPGAs may integrate just one ZZYX core or multiple ZZYX cores arranged in a horizontal or vertical strip or as a multi-dimensional matrix.

Particularly the present invention is applicable on all kind of microprocessors and multi-core processors (e.g. the ones mentioned above) comprising a plurality of Execution Units (such as integer units, load/store units, floating-point units).

All described embodiments are exemplary and solely for the purpose of outlining the inventive apparatuses and/or methods. Different aspects of the invention can be implemented or combined in various ways and/or within or together with a variety of other apparatuses and/or methods.

A variety of embodiments is disclosed in this patent. However, it shall be noted, that the specific constellation of methods and features depends on the final implementation and the target specification. For example may a classic CISC processor require another set of features than a CISC processor with a RISC core, which again differs from a pure RISC processor, which differs from a VLIW processor. Certainly, a completely new processor architecture, not bound to any legacy, may have another constellation of the disclosed features. On that basis it shall be expressively noted, that the methods and features which may be exemplary combined for specific purposes may be mixed and claimed in various combinations for a specific target processor.

Operation Modes

ZZYX processors are capable of operation in a variety of modes. At runtime the processor can switch "on-the-fly" within one or only a few clock cycles in between the modes. Switching may initialized by a variety of causes, e.g. by respective binary code instructions, instructing the processor to switch, or e.g. by code analysis done by the processor hardware at runtime, e.g. when detecting a loop (reference is made in particular to [4]).

Operation modes may include one or a combination of some or all of the following modes (reference is made in particular to [1], [4], [6], [7], and [8]):
Single-Instruction-Single-Data
VLIW
Multi-Thread
Synchronous (MIMD)/Loop Acceleration/Hyperscalar
Asynchronous (MIMD)
Out-of-Order (MIMD)
SIMD This patent focuses on implementations of out-of-order processing modes on ZZYX processors.

Out-of-Order processing is well known in the state of the art and well documented. One skilled in the art acknowledges that it is known as a basic operation principle to most modern microprocessors and respectively implemented in their processor architecture and hardware.

The principles are first described by R. M. Tomasulo and known as the Tomasulo algorithm. Reference is made to [10].

For an introduction to out-of-order processing further reference is made to [20] which is herewith incorporated by reference in its entirety.

It is of prime importance for out-of-order processors to ensure the preservation of precedence which is necessary to preserve the logical integrity of the program. This is achieved in the prior art by tagging operands and/or results to identify the position in the reservations station and by such the timely order (reference is made to [10]) or attaching time-stamps to operands and/or results (reference is made to [11]).

One goal of out-of-order processor architectures of the state of the art is to reduce the number of execution units implemented in the processor hardware to a minimum. Thus reservation stations are implemented to use an execution unit for as many issued instructions as any possible. The reservation stations sort out which of the issued instructions is ready for execution at a point in time, i.e. a specific clock cycle. Reference is made to [10].

[4] discloses an out-of-order implementation based on tags/time-stamps, optimized for ZZYX processors. However, the implementation is complex and costly in terms of required hardware resources.

This patent describes a novel, optimized method and architecture overcoming said limitations.

The preservation of precedence is maintained by connecting the execution units with the EXU-Block according to the graph defined by the operand and result registers of the program.

Reservation stations are eliminated by issuing the instructions to the vast amount of EXUs in the EXU-Block. (It shall be noted, that some reservation stations may still exist inside a ZZYX processor, e.g. for units which are only available in a rather limited number, such might be for example load/store units).

[13] discusses the CRIB architecture with similar concepts as have been shown in [4].

FEATURES OF THE INVENTION

This patent focuses on out-of-order processing (OOO) on processors having a plurality of Execution Units, ideally arranged in a multi-dimensional manner (e.g. a 2-dimensional array). The ZZYX architecture as referenced above is used as an exemplary architecture. Since the patent focusses on OOO, other execution modes of the ZZYX architecture are not discussed and usually ignored. Yet, it shall be clearly expressed that nothing in this patent limits the ZZYX processor to OOO. Depending on the actual implementation, the processor might switch into all or at least some of its other operation modes. For this aspect, reference is particularly made to [1].

Instruction Issue (Elimination of Reservation Stations)

Instructions are read from instruction memory, decoded, and issued in order to the processor's execution units. The order is defined by the sequence produced by the program pointer (PP) (i.e. program counter), including respective jumps. The processor's execution units are typically the EXUs of the EXU-Block; for a detailed description of a ZZYX processor and the EXU-Block reference is made to [1], [2], [3], [4], [5], [6], [7], and [8].

Some of the operation modes of ZZYX processors may require the compiler and/or programmer (if assembly code is written by the programmer) to prearrange the instructions in a way to indicate or even define their placement, respectively location, into the arrangement of Execution Units (i.e. e.g. EXUs of the EXU-Block). In contrast, the placement of instructions in out-of-order processing mode is entirely random and not predefined; it solely depends on the availability of processing resources. The Instruction Issue unit issues instructions in-order to those Execution Units being available for accepting new instructions (i.e. being unused and/or having their previous instruction executed). The issuing pattern is defined by the availability of resources and/or the order in which resources become available. If, at a point in time, no resources are available since all are either currently executing their instruction or waiting for input operand data (operands) to become available, code issue stalls. It shall be noted, that this is also in contrast to FPGAs and the like (including e.g. the XPP/VPU processor technology). These technologies require a clear pre-arrangement of instructions in the so called configurations data. The configuration data is compiled at design time by respective design tools, typically including placement and routing routines (placer & router).

FIG. 1 shows an EXU-Block (0110) comprising 9 EXUs (0101-0109). The EXUs in the EXU-Block might be interconnected by any kind of interconnection network and topology. In a preferred embodiment the network is limited to an efficient top-down (and possibly left-right) data-flow. For an exemplary implementation, reference is made to [1] (e.g. FIGS. 4, 11, 12, and 27).

An instruction fetch unit (0111) fetches instructions, referenced by the program pointer (PP), from an instruction memory, e.g. a level-1 instruction cache (0113). The instruction cache is typically connected to a higher level memory hierarchy (0114), which might be a level-2 cache, possibly a level-3 cache and at last a main memory (e.g. DRAM based system memory) which usually connects to some kind of solid state memory.

The fetched instructions are decoded and possibly optimized (such as e.g. loop optimizations) (0115). This unit might also comprise a Trace Cache and/or Loop Buffer as e.g. known from various Intel (exemplary reference is made to [12] or ARM processor architectures. In particular reference is made to [4].

The Issue Unit (0116) issues the instructions as addressed by the program pointer PP (in order) to the Execution Units (e.g. the EXUs of the EXU-Block) as exemplary indicated by the arrows (0117) (note: only some "issue-arrows" are exemplary shown, naturally all execution units can be addressed by the issue unit for receiving instructions.

By issuing the instructions in order to the Execution Units (e.g. the EXUs of the EXU-Block), the reservation stations (see [10]) are eliminated. An Execution Unit simply executes the instruction issued as soon as all operands become available; until then, the Execution Unit waits. The waiting status is reported to the processor front end, so that no new instructions are issued to waiting Execution Units. In fact, if all Execution Units are waiting (e.g. for read data from memory) the front end stalls (e.g. instruction issue, decode, fetch stops) until Execution Units (resources) finished execution and become available for receiving new instructions again. Consequently, once the instruction is executed, the Execution Units signals its readiness for receiving a new instruction.

The Issue Unit monitors the state of the Execution Unit. Once an Execution Units signals it's availability for receiving a new instruction the Issue Unit might issue the next instruction to it, thus each Execution Unit (i.e. e.g. an EXU of the EXU-Block) is separately addressable by the instruction Issue Unit.

For a further detailed description of this concept reference is made to [4].

Figure 1A:
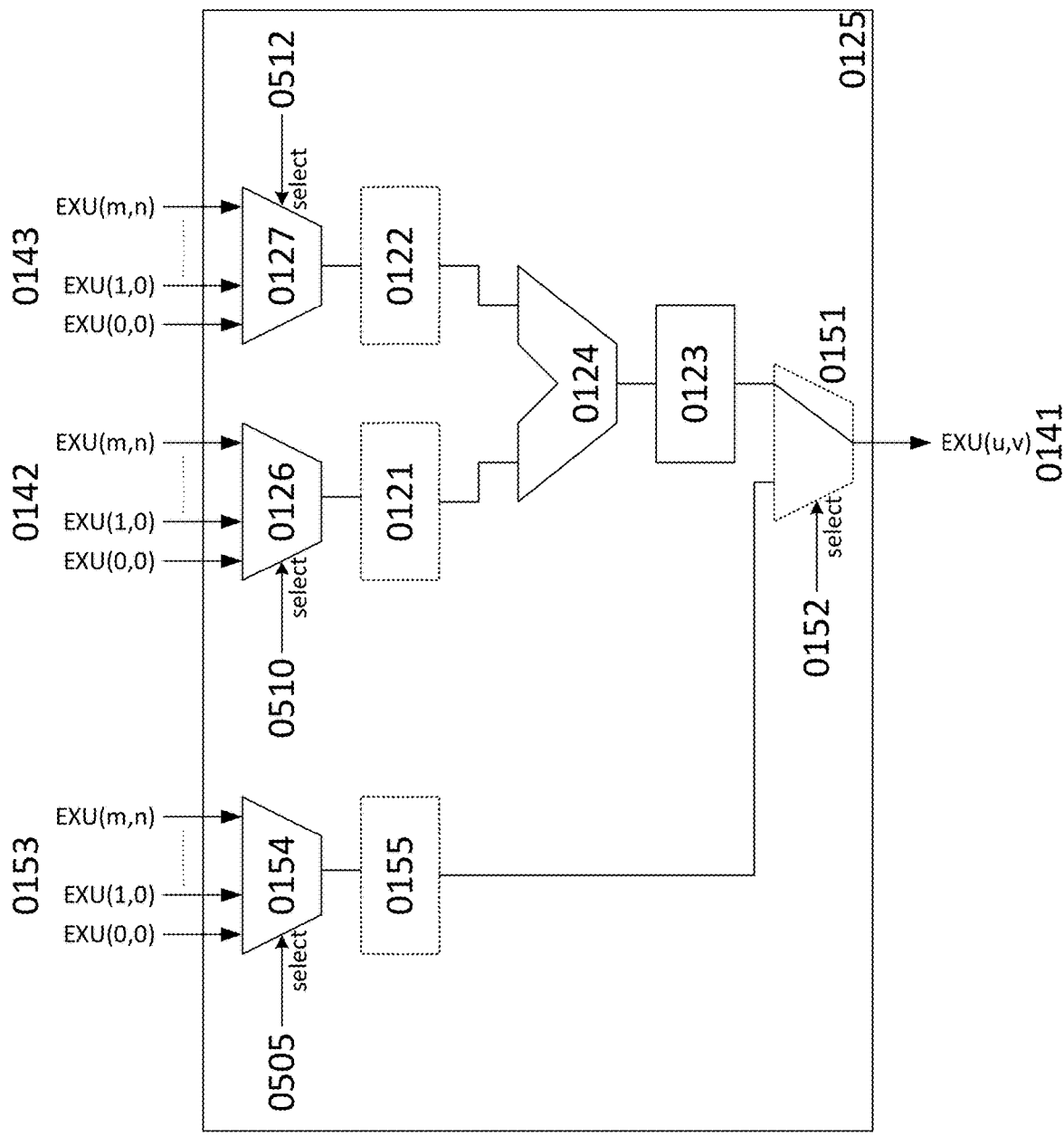
FIG. 1A is a diagrammatic illustration of an example execution unit.

An exemplary Execution Unit (0125) (i.e. e.g. 0101-0109) is shown in FIG. 1A. Note: The Execution Unit (0125) is not shown in full detail, because it is not the intention of this patent to discuss the implementation of Execution Units. One skilled in the art will appreciate that FIG. 1A merely provides an overview of some of the basic elements of an Execution Unit and that a wide variety of embodiments and modifications is obviously possible. The scope of this patent shall in no way be limited to the exemplary Execution Unit shown.

The Execution Unit 0125 is located within the arrangement of Execution Units at position (u, v), which is location u in X-direction and v in Y-direction. Accordingly the result output (0141) of the Execution Unit connected to the network interconnection the Execution Units of the arrangement of Execution Units (0110) addresses the result produced by Execution Unit as EXU(x,y).

The Execution Unit comprises at least one result output register (0123) for transmitting the result to the network interconnecting the Execution Units (EXUs) (indicated by the outgoing arrow). In some embodiments a plurality of output registers are implemented for increased efficiency, as will be described later on. Further the Execution Unit comprises a data processing stage (0124). The data processing stage may vary between the implementations and types of Execution Units. For example most Execution Units may comprise integer EXUs (Arithmetic Logic Units), others may comprise Floating Point arithmetic units, others may comprise some dedicated functions (e.g. cryptography, bit manipulation, complex mathematic functions, Viterbi coders, Huffman coders, etc.); others again may implement input/output functionality such as load/store units transferring data to/from memory and calculating memory and/or peripheral addresses.

The example shown as 0125 comprises an integer Arithmetic Logic Unit (0124). Other embodiments may comprise Floating Point Units, Special Function Units (e.g. for trigonometry, graphics, bit manipulation or cryptography functions), Field Programmable Gate Array (FPGA) cells or memory/lookup-function cells). Load/Store Units for transmitting data to and from memory might be located outside the arrangement of Execution Units and connected to the network or implemented as an embodiment of an Execution Unit (e.g. as Load/Store cell). Different kind of function cells can be mixed within a heterogeneous arrangement of Execution Units.

The Execution Units have at least 2 data inputs for receiving operand data from the network (0142, 0143). In preferred embodiments at least 3 to 4 inputs are implemented (e.g. for efficiently processing and implementing a multiply-add instruction (i.e. result=(operand0×operand1)+operand2)). The Execution Unit receives the input data from the result output of other Execution Units via the network. Exemplary shown is the connection the result outputs of EXU(0,0), EXU(1, 0) and EXU(m,n) (being the last EXU in the arrangement of EXUs). While input registers are not mandatory, some embodiments may comprise operand input registers (0121, 0122). Operand registers are beneficial in some embodiments as will be described later on. In some embodiments, the result and input registers might be implemented within the network. Reference is made to [1] and [4].

Register Positioning Table (RPT)

The result of the execution of an instruction is located in the output register (e.g. 0123) of the respective Execution Unit. It might be written into a global register file, as it is e.g. known from out of order processors (see e.g. [10]); also, in addition or as an alternative embodiment, other Execution Unit might receive it directly from said output register as operand inputs for further processing. In any case a reference table is required, for looking up the location of the data of a specific register in the array each time a future instruction references to the register as operand data input. Those kind of reference tables are known from out-of-order processors in the state of the art and called Register Allocation Table (RAT), which mainly translating a register reference to its actual physical register address in the register file. A similar reference table is used, however it does not reference to a physical register address but to an Execution Unit, which in turn means the table points a register reference to the position of the Execution Unit comprising the register value. Consequently the table is called Register Positioning Table (RPT). In other words, the RAT points a register reference to the actual physical location of the register value in a register file, while the RPT points a register reference to the actual physical location of the register value within in an arrangement (e.g. array) of Execution Units.

The Instruction Issue Unit (0116) is connected to the RPT (0131). Once a instruction is issued to an Execution Unit, the Issue Unit writes an entry into the RPT, referencing the location of the Execution Unit and its output register to the output register of the instruction.

For example: A first instruction first add r3, r2, r4 is placed by the Issue Unit (0116) into an Execution Unit at location (X=2, Y=3) with an arrangement of Execution Units (e.g. an EXU-Block). Respectively a reference is made in the RPT, pointing the register reference r3 to (X=2, Y=3), i.e. r3→(X=2, Y=3).

Later on a second instruction mov r7, r3 arrives at the Issue Unit from the Instruction Decoder (0115). The Instruction Decoder checks the location of r3 in the RPT, r3 points to the Execution Unit at location (X=2, Y=3), i.e. r3→(X=2, Y=3). Accordingly the operand input of the second instruction is set by the Issue Unit such that it receives the result value from the Execution Unit located at (X=2, Y=3), and by such from the first instruction.

As a matter of completeness, it shall be noted that the Issue Unit, while processing the second instruction, not only looks up the location of r3, but also makes an entry in the RPT for the new location of r7 (as described for the first instruction). Respectively the Issue Unit, while processing the first instruction, not only makes an entry in the RPT for the new location of r7, but also looks up the sources of r2 and r4 (as described for the second instruction).

The patent also disclosed the use of multiple output register, as will be discussed below. If multiple output registers are implemented in a specific embodiment, the RPT not only references to the location of the Execution Units, i.e. e.g. r3→(X=2, Y=3), but also to the output register within the Execution Unit in which the register value (in this example the value of r3) is stored, i.e. e.g. r3→(X=2, Y=3, OR=2).

In difference to [13], the RAT is not consolidated into the Execution Unit. The RPT (replacing the RAT) remains existing within or associated with the Issue Unit.

Elimination of the Register File

In one embodiment, the result values produced the Execution Units might be written via the network into a global register file, as it is common for microprocessors, reference is made e.g. to [10]. Consequently, the outputs of Execution Units and the Register File or even the Register File exclusively might be used as a source of operand data for instructions and the respective Execution Units.

However, this would imply additional traffic in the network, possibly increased latency and also the existence of a large multi-ported Register File. Thus, in view of silicon area, complexity and power dissipation, this embodiment appears not ideal and is therefore not preferred.

In the preferred embodiment, the monolithic Register File is completely eliminated. The sole sink of result data and source of operand data are the result output registers (e.g. 0123 (=rr0), rr1, rr2, rr3) of the Execution Units.

Preservation of Precedence by Interconnection

In the original out-of-order model [10] tags are used to ensure the correct sequence of produced data.

In [4] precedence is preserved by two concepts: i) resolution of register dependencies by interconnecting the Execution Units according to the graph defined by the register dependencies themselves in the source code; and ii) implementation of time stamps for ensuring the correctness of the data held in the register file.

Figure 2:
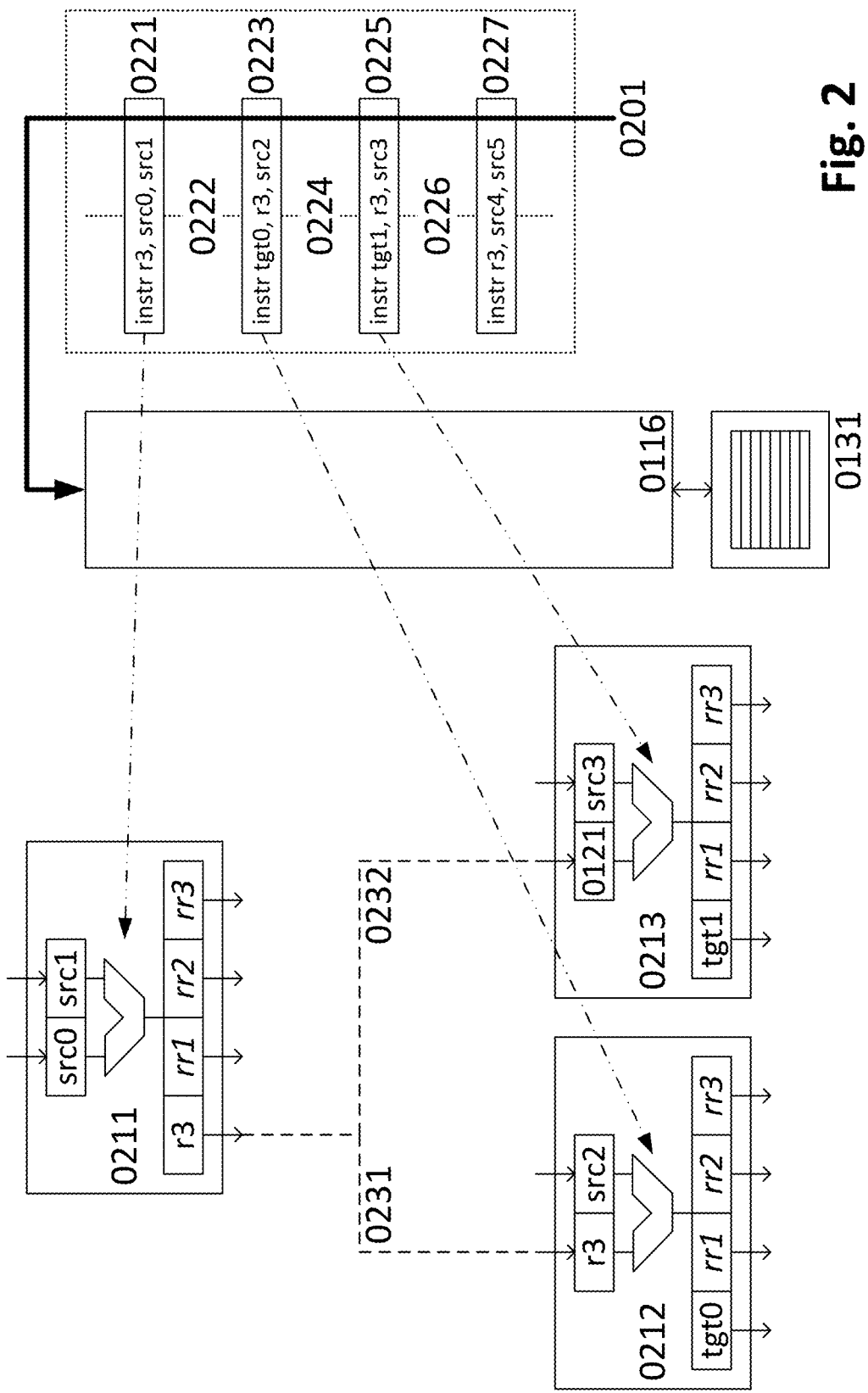
FIG. 2 is a block diagram of an example system illustrating a fundamental operating mode for one or more described features.

In [13] a strict dependency between renamed registers held in an internal register bank (register column), issued instructions and their execution order is maintained (see [13] FIG. 2).

All methods in the prior art require some hardware overhead and/or limit the flexibility and scalability of the processor architecture.

The inventive method transforms the chronology of register accesses into network connections. Theoretically all register accesses form a directed finite graph. The producer of a register value, i.e. the instruction having a register R as a result of the operation and consequently the respective Execution Unit (EXU) to which the instruction is issued to, is the tail. All instructions (consumers) consuming the register R as an operand source, are direct successors. Another instruction (producer) using the same register R as a result operation has other direct successors (consumers). This results in two independent and distinct graphs. All direct successors of R have exactly one tail or direct predecessor, which is exactly one R of the first or second producer (instruction). Such a graph can be mapped onto a data transmission network, transmitting result data of an producer Execution Unit ($EXU_P$) to the operand inputs of one or more consumer Execution Units ($EXU_{C0 \ldots Cn}$). It shall be noted that of course ($EXU_P$) can receive its own results as operand input (e.g. for cyclic operations such as counters, accumulators, and the like) and thus could also be one of ($EXU_{C0 \ldots Cn}$).

Multiple graphs all using the same register R but having different producers can coexist within the same network at the same time or overlapping times, because, as previously discussed, these are independent and each direct successor (consumer) is linked to exactly one direct predecessor (producer).

Figure 3:
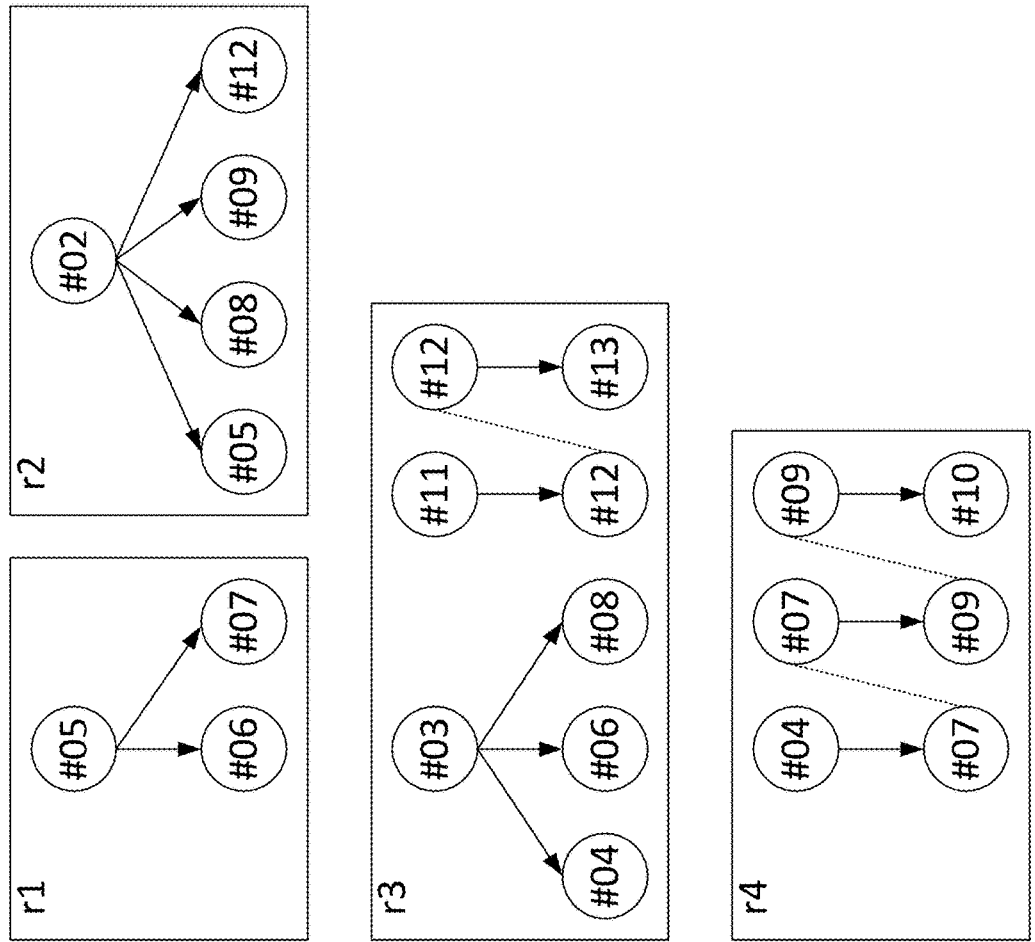
FIG. 3 is a diagrammatic illustration of example graphs for registers and example code using the graphs.
Figure 4:
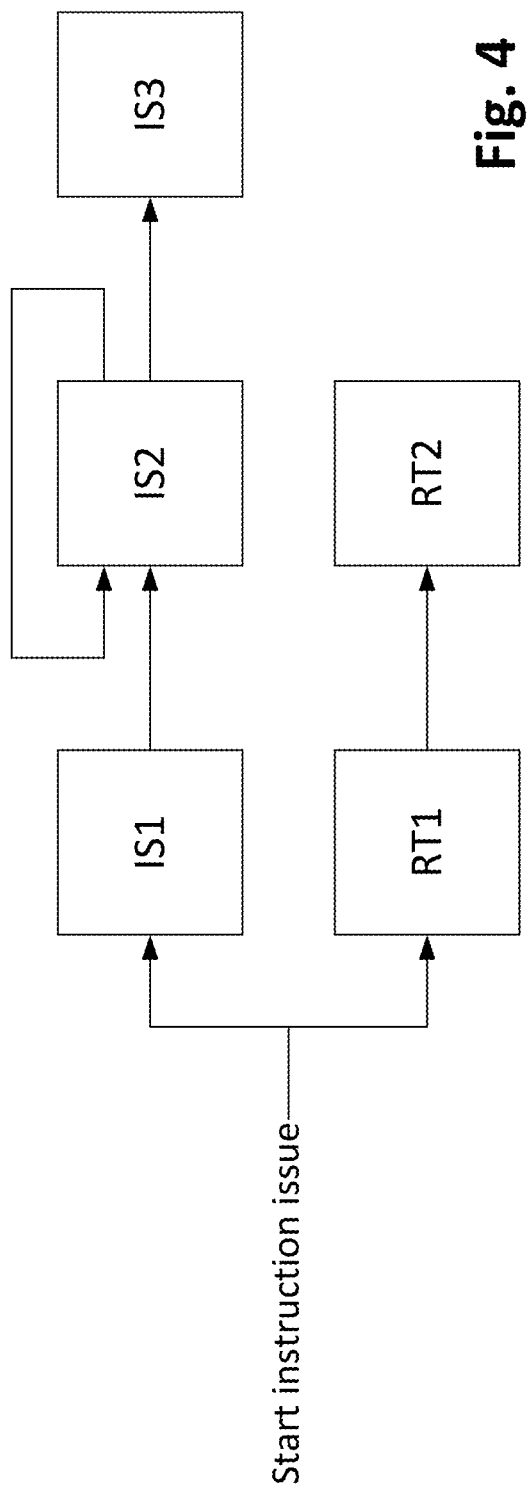
FIG. 4 is a diagrammatic illustration of an example algorithm implementing an out-of-order processing mode.

FIG. 3 provides an example for said graphs:

The graphs for each register (r1, r2, r3, r4) used by an exemplary code (0301) are shown.

The register r1 result from instruction #5 is transmitted to instruction #06 and #07. This can occur (at least in respect to register r1) simultaneously and thus the instruction can execute (at least in respect to register r1) in parallel.

The register r2 result from instruction #2 is transmitted to instruction #05, #08, #09 and #12. This can occur (at least in respect to register r2) simultaneously and thus the instruction can execute (at least in respect to register r2) in parallel.

The register r3 result from instruction #3 is transmitted to instruction #04, #0 and #08. This can occur (at least in respect to register r3) simultaneously and thus the instruction can execute (at least in respect to register r3) in parallel. Simultaneously (at least in respect to register r3) can instruction #11 produce a register r3 result which is transmitted to instruction #12. Instruction #12 could produce a new register r3 result which is transmitted in parallel to instruction #13. Yet, since instruction #12 requires register r3 as an operand input, the execution of instruction #13 will not perform in parallel. The dependence is indicated by the dotted line between the #12 consumer and producer. This is actually no problem, since handshake signals between the Execution Units signal the availability of results and consequently their availability as operand inputs for subsequent Execution Units (and respectively instructions). Handshake signals can be, depending on the embodiment, simple valid flags or full blown protocols, such as e.g. a ready/acknowledge (RDY/ACK) protocol. Reference is made to [1].

The connections #03 to {#04, #06, #08} and #11 to #12 and #12 to #13 are separately routed through the data transmission network. Since producers (data senders) and consumers (data receivers) are directly connected according to said graphs and the timing is controlled by a handshake protocol, the preservation of precedence is ensured, even if the instructions are simultaneously scheduled for execution and possibly even execute in parallel.

Register r4 constitutes a special case. The given code example (0301) supports predication, i.e. an instruction implicit execution condition. Those instructions will either modify the result register, in case the instruction is executed, or leave it unaltered, in case the instruction is not executed. The respective instructions must be treated as producer and consumer to ensure the preservation of precedence. Since data processing has been transformed from a sequential processing method into dataflow processing the respective instructions must be amended in a single assignment manner and by such require a multiplexer to select, depending on the condition, between the original register value of the result register or the produced result. A move operation (mov) represents the simplest case, in which the move operation is simply replaced by a multiplexer as shown in 0302.

In one embodiment, a respective instruction set might be implemented. However, the transformation can actually be performed as a step of instruction decoding in the Instruction Decoder and thus be completely transparent to the programmer. For that reason 0302 does not show the transformed mux instruction in typical assembly style syntax, but rather in a better readable C style, as a matter of disclosure.

The graph for r4 does not require further explanation. It is clear from the above said. The dependencies, introduced by the mux instruction, are again shown as dotted lines (between the producer and consumer of instruction #7 and the producer and consumer of instruction #9).

Heterogeneous Array

In a preferred embodiment, the arrangement of Execution Units (i.e. EXU-Block) might be heterogeneous. Only the most common and frequently used functions are implemented in the majority of the Execution Units. Complex and large functions and/or less frequently used functions might be implemented in only a few of the Execution Units.

For example some Execution Units might comprise dividers and/or floating-point arithmetic units and/or other special purpose functions and/or less frequently used functions (e.g. crypto, trigonometric, square root, etc.).

These Execution Units might be located on the edges of the arrangement of Execution Units or, for better network efficiency, be spread throughout the arrangement.

Exemplary Description of the Fundamental Operation Mode

FIG. 2 explains the fundamental operation mode using an example. An instruction (0221) producing a result to be stored exemplary in register r3 is received in the instruction stream (0201) from Instruction Decoder (0115) and issued by the Issue Unit (0116) to a first Execution Unit (0211) located somewhere in (or associated with) the EXU-Block. For this consideration the potential operands and their source for this first instruction are irrelevant. Thus, the input registers are simply marked with src0 (source 0) and src1 (source 1). The result output register of the Execution Unit (0211) becomes register r3. The Issue Unit (0201) records in a table called Register Position Table (RPT) (0131) the location of register r3 to be in the output register of Execution Unit (0211).

The Issue Unit checks RPT for all instructions to be issued. The operand source registers are translated by the RPT into the actual source of the operand data.

Other instructions (0222) might be received and issued which do not use r3 as an operand and thus are of no consequence for this consideration.

A second instruction (0223) is received by the Issue Unit referencing to r3 as an operand source. The Issue Unit looks up the source of the register r3 data and connects, via the network (0231), the operand input of the Execution Unit to which the instruction is issued (0212) to the respective output of the source Execution Unit (0211) containing the data value of r3. The second source (src2) and result target (tgt0) of the instruction are irrelevant for this consideration.

Other instructions (0224) might be received and issued which do not use r3 as an operand and thus are of no consequence for this consideration.

A third instruction (0225) is received by the Issue Unit referencing to r3 as an operand source. The Issue Unit looks up the source of the register r3 data and connects, via the network (0232), the operand input of the Execution Unit to which the instruction is issued (0213) to the respective output of the source Execution Unit (0211) containing the data value of r3. The second source (src3) and result target (tgt1) of the instruction are irrelevant for this consideration.

Other instructions (0226) might be received and issued which are of no consequence for this consideration.

A fourth instruction (0227) is received by the issue unit (0116) in the instruction stream (0201) from the Instruction Decoder (0115). The fourth instruction is reusing the exemplary register r3 as a new result target of the operation. Consequently the Issue Unit (0116) updated the Register Position Table (RPT) (0131) with the new location of the content of register r3, which is in an output register of the newly placed instruction 0227's Execution Unit (not shown in FIG. 2). All future operand references are linked via the network to the new source.

Retirement

With the arrival of the fourth instruction superseding the former r3 value of 0211, 0211 becomes obsolete. The instruction could be removed from the EXU-Block and replaced by a newly issued one; it can retire.

Yet, there are a few things to discuss, in two respects, ensuring correct execution of the algorithm, and efficiency.

Input Registers

Actually 0211 can only retire, if all subsequent Execution Units, the direct successors of the register r3 graph, have actually received the result data vEXUe. While it is guaranteed that all respective instructions have been issued to the EXU-Block (instruction issue occurs in order), it cannot be guaranteed that all direct successors have actually executed their operation and consumed the data value of r3. Several mechanisms can be implemented to ensure this, for example i) an overlaying control structure monitoring the execution of all Execution Blocks and their dependencies, as a disadvantage that would be complex and power hungry;

ii) a confirmation signal from all direct successors, confirming the reception and consumption of the register r3 data value, as a disadvantage that would increase the network complexity and rise timing and/or pipelining/latency issues.

A further possible implementation seems the most efficient one and is thus preferred: Each Execution Unit comprises input registers or latches storing all operand values right after their availability, ideally immediately after or with the instruction issue to the Execution Unit. Consequently, as soon as an instruction (0227) is issued superseding the register r3 data value of the old instruction (instruction 0221 in Execution Unit 0211), the old instruction (0221) in Execution Unit 0211 can retire, since all direct successors (i.e. in this example 0112 and 0213) have already stored the result value of 0211 in their input registers or latches.

Retirement of an instruction (e.g. 0221) means in the most fundamental context that the respective Execution Unit (e.g. 0211) is available for getting a new instruction issued by the Issue Unit and processing this instruction.

Multiple Result Registers

A disadvantage of the described method is the late retirement of instructions. Late retirement means that an Execution Unit has to keep an instruction after its execution until all receivers (consumers) have been issued. Although the actual execution has been performed an Execution Unit is blocked and unavailable for processing a new instruction. Consequently the resource is wasted.

One possible solution to the problem is to reintroduce a register file. Once the execution of an instruction has been performed, the result data (in the example above the register r3 value) is written into the register file. All future instructions, addressing r3 as an operand, receive the data from the register file.

Another, preferred, embodiment uses additional output registers in the Execution Units. When an instruction is issued to an Execution Unit it is associated with an available output register. Available means, the data stored in the output register has been transferred to (consumed by) all instructions (and by such Execution Units (consumers) referencing to it. The respective, available output register is entered in the RPT, such that all direct successors (instructions requiring its data as an input operand) are respectively connected via the network. If no output register of a specific Execution Unit is available, it is marked as busy or waiting and no instruction can be issued to it.

This method allows writing result data of an executed instruction into one of a plurality of output registers. As long as output registers are available, new instructions can be issued right after a previous instruction has been executed. The previous result data remains in one of the plurality of output registers until it has been consumed (means all receivers (consumers) have been issued and have received the value). Simultaneously another of the plurality of output registers is available to receive new result data from a newly executed instruction. The Execution Unit resource is available for data execution, even while not all result data has been consumed.

The actual number of output registers in each of the Execution Units will depend on the size of the array of Execution Units (e.g. EXUs within an EXU-Block). Ultimately it depends on the to be supported amount of instructions in flight. So far 4 output registers per Execution Unit appear reasonable for array sizes of 16 to 32 Execution Units (EXUs per EXU-Block). Smaller arrays may operate efficiently with only 1 to 2 output registers; larger arrays might perform best with 8 to 16 or even more output registers per Execution Unit.

It shall be expressively noted that not all Execution Units must comprise the same amount of output registers. In a preferred embodiment, the array of Execution Units (i.e. EXU-Block) might be heterogeneous. For example some Execution Units might comprise dividers and/or floating-point arithmetic units and/or other special purpose functions and/or less frequently used functions (e.g. crypto, trigonometric, square root, etc.). Since fewer units are implemented, it might be more important to ensure their actual availability for execution. Thus, these Execution Units may require more output registers than others for efficient performance.

The same likely applies on load/store units, particularly the load path. For example plenty of load requests might be handled by only a few load units and the loaded data might be required by the executed algorithm by many instructions and/or for a large number of clock cycles. Thus a larger amount of output registers might prove beneficial.

In the example discussed in FIG. 2 each Execution Unit (EXU) comprises 4 output registers. For the sake of simplicity, only the first output register per EXU has been used for the explanation; the remaining three are marked (rr1, rr2, rr3).

Issue Algorithm

Most parts of the processor front end remain largely unmodified. Besides the required modifications in the processor backend (such as e.g. the arrangement of Execution Units and potential removal of the register file) most modifications concern the Issue Unit.

The Issue Unit is of particular importance as the fundamental control methods are implemented there or in an unit associated with it.

The following exemplary algorithm (see FIG. 4) implements the inventive out-of-order processing mode:

When issuing an instruction:

IS1) Lookup operand sources in Register Positioning Table (RPT) and set operand input references of the instruction to be issued (and by such the multiplexers to and in the network) accordingly;

IS2) Check for an Execution Unit (EXU) available for receiving a new instruction (i.e. an Execution Unit (EXU) which is either unused or has completed the execution of the instruction previously issued to it), a) if currently no Execution Unit (EXU) is available repeat checking until an Execution Unit (EXU) becomes available (further instruction issue stalls);

IS3) Issue instruction to the available Execution Unit (EXU-NEW) and enter a reference of the result register (RR) addressed by the instruction to be issued to the Execution Unit into the Register Positioning Table (RPT).

As a further step of issuing an instruction, the Execution Unit storing the value the result register previously referenced to can retire.

RT1) Retrieve Execution Unit (EXU-RET) currently holding the value of the result register (RR) addressed by the instruction to be issued;

to RT2) Send retirement signal to said Execution Unit (EXU-RET).

Exemplary implementation of a Register Positioning Table

The Register Positioning Table (RPT) is a unit of the processor frontend, typically poisoned before or behind the Instruction Decoder (ID). The RPT contains a reference for each register of the Instruction Set Architecture's (ISA) register file to the Execution Unit, which actually comprises the register's data. To that extent, the ISA's Register File is purely virtual, in the physical implementation it does not exist as such, but is implemented as a distributed Register File consisting of the result data registers (e.g. rr0, rr1, rr2, rr3) of the EXUs.

Figure 5:
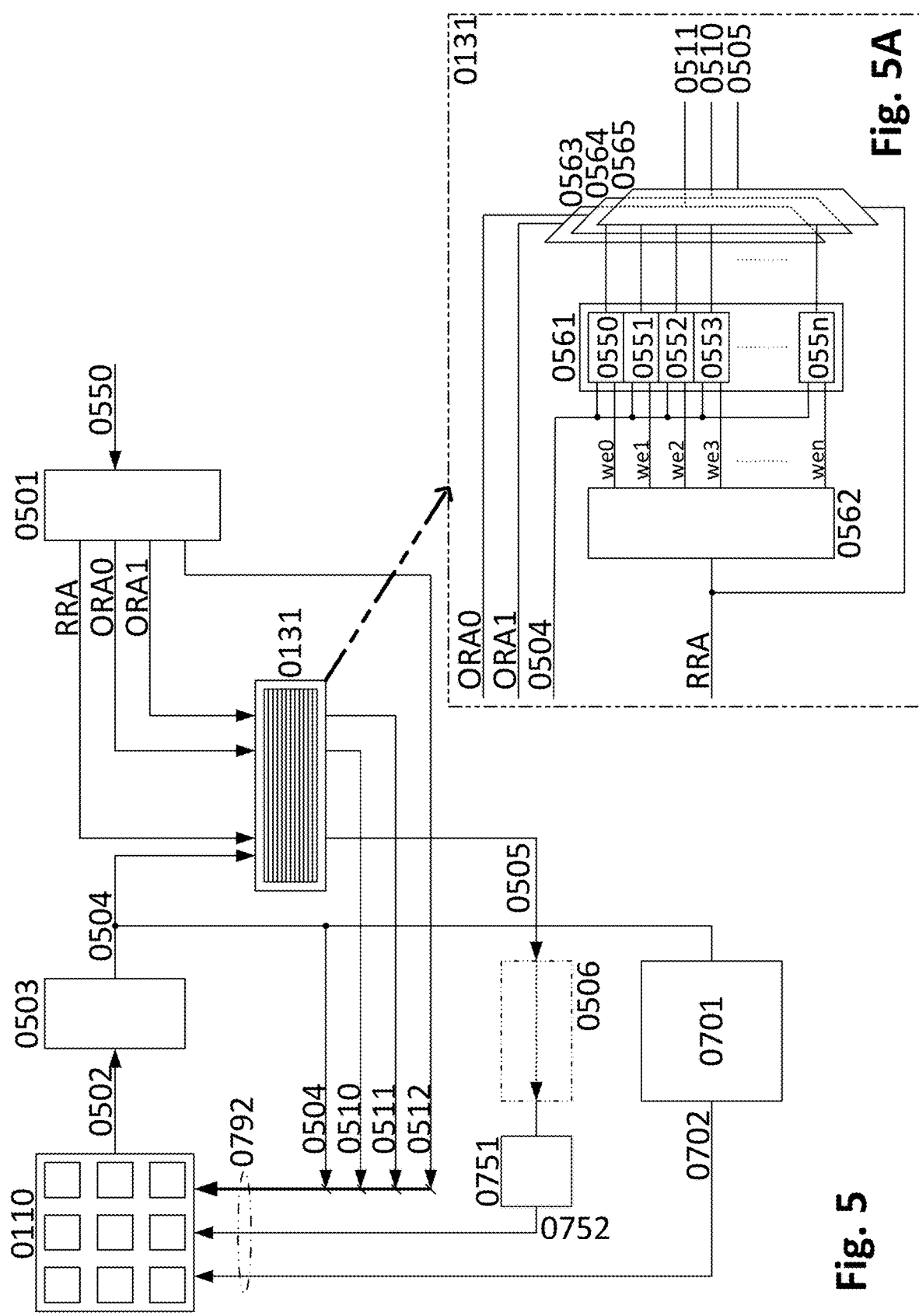
FIG. 5 is a diagrammatic illustration of an example implementation using a Register Positioning Table.

In the exemplary embodiment shown in FIG. 5, the RPT is located behind the Instruction Decoder (ID) (0501) which receives instructions (0550) from the Instruction Fetch Units. The Instruction Decoder delivers the register addresses of the result register (RRA=Result Register Address), and the two operand registers (ORA0, ORA1=Operand Register Address 0 and 1) and the remainder of the decoded instruction (0512). In simple straight forward processor designs ORA0 and ORA1 each select the operand register content via a multiplexer from the Register File. RRA addresses a register of the Register File for writing the result data to.

For the inventive processor design ORA0 and ORA1 have to select (e.g. via a multiplexer, a network configuration and/or a crossbar) the operand data from an Execution Unit result output register. RRA points the Execution Unit processing the currently issued instruction. RRA (e.g. register r5) has to be recorded as a reference in the RPT, so that future read references to the respective register (e.g. r5) can be connected to the respective Execution Unit via the network.

Each Execution Unit of the arrangement of Execution Units (0110) provides a status signal indicating its operation status. The status could be for example "unused", "waiting for availability of operand data", "executing", "finished", "retired". The status "unused" and "retired" indicate the readiness for receiving instructions. In simple implementations "unused" and "retired" can be combined into a status "ready for new instruction"; while "waiting for availability of operand data", "executing" and "finished" are combined into "not ready for new instruction". If multiple result data output registers are implemented (e.g. rr0, rr1, rr2, rr3), the status signal will also indicate the status for each of the registers, i.e. if a register is available (retired or empty) or still in use. Obviously, only EXUs with at least one empty or retired result data register can actually execute a new instruction; and the RPT must, in addition to the position of the EXU containing a register value, also have a reference to the respective result data register within the EXU, so that the register value can be correctly accessed (i.e. connected via the network).

The status signals (0502) from the Execution Units are connected to an arbiter (0503). The arbiter selects one of the available EXUs and produces the EXU's address (0504) in the arrangement of Execution Units (0110). If multiple result output data registers (e.g. rr0, rr1, rr2, rr3) exist, 0504 comprises also a reference to the available register to be selected.

The arbiter might implement a variety of strategies, depending on the embodiment:

1) Prefer specific locations: For example the bottom rows could be preferred, decreasing the load on the higher rows. This is beneficial for switching into Loop Acceleration Mode (also called Hyperscalar mode), reference is made to [1], [4] and [7]. In Loop Acceleration (Hyperscaler) Mode instructions are issued row wise from top to bottom. In smaller sized arrangements of Execution Units (e.g. EXU-Blocks) preferably a complete row is issued as whole. For details see again [1], [4] and [7]. Wider arrangement may not issue a complete row as a whole, but support (or even require) partial issue, e.g. issuing only ½, ¼, ⅛ of a row as a whole. Instruction issue is done in data flow order, which is in the preferred embodiment of ZZYX processors top-to-down. Consequently, when switching into Loop Acceleration (Hyperscaler) Mode it is beneficial if the top rows are sparely used, so that their Execution Units likely terminate operation soon and become quickly available for receiving new instructions in Loop Acceleration (Hyperscaler) Mode.

2) First-come-first-serve: The Execution Units are arbitrated in timely order. The EXU(s) which indicated its/their readiness first in time are arbitrated first.

3) Address based: The EXUs address is decoded by a priority decoder. This method prefers some of the EXUs and is similar to 1).

4) Heat-optimal: Increasingly heat is becoming a problem for semiconductors. Reference is made for example to [9], which "research attacks a key technological problem for microprocessor architects, which [is called] the utilization wall. The utilization wall says that, with each process generation, the percentage of transistors that a chip design can switch at full frequency drops exponentially because of power constraints.

A direct consequence of this is dark silicon—large swaths of a chip's silicon area that must remain mostly passive to stay within the chip's power budget. Currently, only about 1 percent of a modest-sized 32-nm mobile chip can switch at full frequency within a 3-W power budget." For heat-optimal arbitration, Execution Units are arbitrated such that the coldest are arbitrated first and the hottest last. Various embodiments for achieving this are possible. Some possibilities are listed, which might be exclusively implemented or in combination:

i) The most complex and costly might comprise a heat sensor (typically implemented using a diode) for each Execution Unit which value is reported to the arbitrator.

ii) The simplest embodiment might just use round-robin arbitration in which the Execution Unit, to which most recently an instruction has been issued, is put last on the list for arbitration. Thus the longest ago arbitrated Execution Units are selected next which are usually the coldest ones.

iii) Other arbitration strategies might monitor the actual load on an Execution Unit. The load can be determined e.g. by a counter counting up with each instruction issue and counting down on a timing signal which might be produced by a timer equidistantly each couple of e.g. microseconds, milliseconds or microseconds. The Execution Unit with the lowest load factor is selected next.

Obvious for one skilled in the art, other strategies and/or a combination of the disclosed arbitration strategies are feasible.

RRA, ORA0, ORA1 and the EXU address (and, if implemented, address of the result output register) (0504) are fed to the Register Positioning Table (RPT) (0131).

The Result Register Address (RRA) drives an address input of the RPT. The address is used for two purposes: i) The position of the future Execution Unit holding the value associated with RRA is entered into the RPT. (The future Execution Unit is the one to which the current instruction is issued to) For that purpose RRA drives an address for a write port of the RPT for writing the EXU address (and, if implemented, address of the result output register) (0504) into the RPT. ii) The Execution Unit (EXU-C) which currently (until the issue of the current instruction) holds the value associated with RRA has retire. Accordingly RRA drives an address for a read port for reading the EXU-C's address (0505) which is used for sending a retire signal (0513). The retire signal instructs the EXU-C to change its status, depending on the embodiment, either to "ready for new instruction" or "retired". Depending on the embodiment, the retire signal is either i) sent as the address of the EXU to retire to the arrangement of Execution Units (0110) (e.g. EXU-Block), each of the EXUs compares the retirement address with its own address in the arrangement and retires if the addresses match, or ii) decoded by a decoder (alternatively indicated by 0506) and each Execution Unit (EXU) in the arrangement of Execution Units (0110) (e.g. EXU-Block) receives a dedicated signal triggering its retirement.

ORA0 and ORA1 each drive an address of a read port of the RPT for looking up the location information (0510 for ORA0 and 0511 for ORA1) of the EXUs holding the data values of the registers referenced by ORA0 and ORA1. The location information of the EXUs providing the operand data for OR0 and OR1 drive the respective operand data input multiplexers (0126 and 0127) of the EXU to which the instruction is issued to. Reference is made back to FIG. 1A.

The Execution Units address, to which the instruction is issued to, (0504) is used to address and select the Execution Unit and its instruction register (IR). The instruction register stores the decoded instruction (0512) to be executed and the references to the input operands in form of 0510 and 0511. It shall be generally noted that this example describes an implementation for 2 operand inputs. For embodiments with more operand inputs accordingly more lookup capabilities in the RPT have to be provided, e.g. for ORA2, ORA3, etc., delivering accordingly more references.

In one embodiment, the Instruction Register (IR) might be implemented inside each Execution Unit. The Execution Unit is selected by comparing the address bus 0504 to its actual address and if it matches the instruction register is enabled for receiving the instruction.

In another embodiment the instruction register might be global. One large register outside the arrangement of Execution Units stores all instructions for each of the Execution Units. The section for each of the Execution Units is again addressable and selectable for writing by comparing address bus 0504 with the EXU's address associated with each section.

For large arrangements (0110) the first variant might be more efficient, since fewer signals (only address 0504, the references 0510 and 0511, and the decoded instruction) have to be routed to the arrangement. In the latter case all instruction data has to be routed from the global IR to the arrangement (0110) which could easily sum up to thousands of signals. Of course further variants of implementing the IR are feasible.

FIG. 5A shows an exemplary embodiment of a Register Positioning Table (RPT). The table (0561) is construed of a plurality of multi-bit wide registers (0550, 0551, 0552, 0553, . . . , 055n). Each register is related to a register reference. For example register r0 references 0550 (r0→0550), register r1 references 0551 (r1→0551), register r2 references 0552 (r2→0552), . . . , register rn reference 055n (rn→055n). Each register stores the address of the EXU which output contains the value of the referenced register, and, depending on the embodiment, possibly further information.

For newly writing the EXU location of a result register into the table (0561), the result register reference (RRA) is decoded by an n-to-$2^n$ decoder (0562), n is the total amount of registers provided by the Instruction Set Architecture (ISA). The respective register (0550, 0551, 0552, 0553, . . . , 055n) in the table (0561) is enabled (we0, we1, we2, we3, . . . , wen) for writing and the location value (0504), connected to the data input port of each of the registers, is written into the register selected by the decoder (0562) via the decoder output (we0, we1, we2, we3, . . . , wen). The output of each register of the table (0561) is fed to three multiplexers (0563, 0564, 0565). Multiplexer 0563 selects the register of table (0561) addressed by OAR1 for output (0511). Multiplexer 0564 selects the register of table (0561) addressed by OAR0 for output (0510). And multiplexer 0565 selects the register of table (0561) addressed by RRA for output (0505).

Interrupt Processing

Data processing of a task or thread on processors can be interrupted and processor continues with the processing of another task or thread. This function is fundamental for processor design, for example to switch between tasks (multi-tasking) and/or threads (multi-threading) and/or simply to react on requests from periphery (keyboard entry, mouse movement, data from/to networks) and/or to react on the memory system, e.g. on a page miss if e.g. data has to be loaded/off-loaded from/to the page file (MS Windows) or swap partition (e.g. Unix, Linux, etc.).

Interrupts can be generated by hardware (e.g. timers, peripherals, etc.) or software (e.g. software timers, schedulers, debuggers, operating system calls). Once a processor (or a processor core) receives an interrupt request, the current data processing must be interrupted such, that it can be correctly continued at a later point in time.

Thus it is mandatory, at the reception of an interrupt request, to save the state of the data processing of the current task/thread to memory. One approach is to save all internal relevant registers, such as e.g. operand data, result data, status (i.e. e.g. carry, zero, negative, overflow), and also intermediate data from pipeline stages. When switching back to said task/thread all registers must be restored from memory. This is highly complex and requires a significant amount of additional hardware, clock cycles and energy. Thus typically pipeline stages are not saved, but pipelines keep on processing the current set of operands, are emptied (flushed) and only the final result of the pipeline is saved.

Still saving all there operand and result registers in the arrangement of Execution Units—and also the Register Positioning Table and possibly other control/management registers) is complex and time consuming.

Thus, in a preferred embodiment, interrupts are processed in the following way:

With the reception of an interrupt request, the Issue Unit stops fetching and issuing new instructions (e.g. of the currently executed thread) received from the Decode Unit. In one embodiment push instructions are inserted into the instruction stream (e.g. by the Issue Unit or Decode Unit). Push instructions are known in the state of the art to move register values into memory, typically onto the so called stack.

The inserted push instructions will be issued to Execution Units, just as aforesaid for any other instruction. The push instructions will be connect to the latest register references in the Register Positioning Table (RPT). Since instruction issue is in-order, all instructions prior to the current position of the program pointer (PP) have been issued and RPT references the register values being actually related to the program pointer's current position.

Data processing (e.g. in the arrangement of Execution Units) will continue unaltered, until the position at which the push instructions have been inserted. Consequently all pipelines finish the processing of their input operand data normally and no special measures are required for saving intermediate values from pipelines.

When the data to be pushed becomes available, since the respective instructions have been executed and the result data has been produced, the execution of the push instructions by the respective Execution Unit (preferably a Load/Store Unit) will move the to be saved register value to memory.

While inserting the push instructions into the instruction stream, the processor front end can be flushed, the program pointer be adjusted to the address of the interrupt service routine (ISR), and its instructions can be loaded and issued to the arrangement of Execution Units.

Obviously it is not necessary to insert the push instruction automatically into the instructions stream. In another embodiment it is also possible to stop fetching and issuing new instructions (e.g. of the currently executed thread) received from the Decode Unit. Execution continues with the interrupt service routine (ISR). The interrupt service routine (ISR) preferably pushes exactly those registers which are required for processing the ISR. The push instructions are thus part of the ISR. Once the ISR execution is finished, the respective registers are restored by according pop instructions and the execution of the interrupted code (e.g. tread) is resumed.

A return from the interrupt service routine (ISR) is handled as known in the state of the art. The previously pushed out registers content is restored via a pop instruction and a return into the interrupted task/thread at the program position of the previous interrupt is performed.

In one embodiment the interrupt processing overhead is reduced by storing (pushing) only a subset of the registers to memory. Typically only a few registers are required for executing an interrupt handler code. Thus push instructions for only a subset of registers (e.g. 4) are inserted. If additional registers are required by the interrupt handler code, the code might comprise additional push instructions for the registers to be stored in memory.

Conditional Instructions and Branch Misprediction
Condition Instructions/Predication Conditional instruction, i.e. instructions supporting predication, i.e. an instruction implicit execution condition, have been discussed in FIG. 3 already, reference is made in particular to 0302 again. Predication is known in the state of the art, for an exemplary implementation reference is made to [14].

As explained in FIG. 3, the embodiment depending implementation of predication requires an additional multiplexer in the respective Execution Unit. The respective optional (depending on the embodiment) multiplexer (0151) is shown in FIG. 1A drawn in dotted lines. If the condition is met, the result output from 0123 is selected, the same path which feeds 0131 in all embodiments not supporting predication. The selection is made by a signal (0152) indicating if the condition is met or not.

The result register referenced by the instruction is fed as an operand input to the Execution Unit.

For example, the instruction
addlt r4, r5, r6
adds the register r5 to register r6 and writes the result into register r4, if the condition less-then (10 is met based on evaluation the status flags. The instruction is implemented as such (using C-style syntax):
r4=? (r5+r6): r4

If the condition is not met, the original r4 value is selected by the multiplexer and fed through to the new location of the now produced r4 register. Accordingly the register reference produced as a result of the operation is required as operand input for this type of instructions. Respectively an additional data input for receiving operand data from the network is required (0153).

The Result Register Address (RRA), in the given example r4, is looked up by the Register Positioning Table (RPT) to produce the pointer (0505) to the Execution Unit (EXU) containing the old register value. The pointer is used to select by a multiplexer (0154) the respective value as an operand for feeding it to multiplexer 0151. As discussed before, some embodiments may comprise operand input registers, in this case 0155.

Conditional Jumps and Branch (Mis)Prediction

Conditional jumps cause a major problem for processor design. A conditional jump interrupts the instruction flow through the processor stages, since the actual target of the jump is not predetermined but depends on the current data processing. Accordingly, to correctly process a jump instruction the processor pipeline must stall, until the condition has been calculated.

For increasing performance, microprocessors predict the likelihood of a jump and continue fetching instructions and filling the pipeline with the most likely jump target. This is called prediction. If a prediction fails, the wrongly executed instructions have to be trashed and data processing has to restart at the location before the wrongly predicted (mispredicted) jump. Of course data must also be restored, such that execution can correctly continue.

It is not topic of this patent to discuss branch prediction. It is known to one skilled in the art. For an introduction to branch prediction reference is made to [18] and [19] both of which are herewith incorporated by reference in their entirety.

Public sources, such as Wikipedia, provide further introduction and overview:

"In computer architecture, a branch predictor is a digital circuit that tries to guess which way a branch (e.g. an if-then-else structure) will go before this is known for sure. The purpose of the branch predictor is to improve the flow in the instruction pipeline. Branch predictors play a critical role in achieving high effective performance in many modern pipelined microprocessor architectures such as x86.

Two-way branching is usually implemented with a conditional jump instruction. A conditional jump can either be "not taken" and continue execution with the first branch of code which follows immediately after the conditional jump—or it can be "taken" and jump to a different place in program memory where the second branch of code is stored.

It is not known for certain whether a conditional jump will be taken or not taken until the condition has been calculated and the conditional jump has passed the execution stage in the instruction pipeline.

Without branch prediction, the processor would have to wait until the conditional jump instruction has passed the execute stage before the next instruction can enter the fetch stage in the pipeline. The branch predictor attempts to avoid this waste of time by trying to guess whether the conditional jump is most likely to be taken or not taken. The branch that is guessed to be the most likely is then fetched and speculatively executed. If it is later detected that the guess was wrong then the speculatively executed or partially executed instructions are discarded and the pipeline starts over with the correct branch, incurring a delay.

The time that is wasted in case of a branch misprediction is equal to the number of stages in the pipeline from the fetch stage to the execute stage. Modern microprocessors tend to have quite long pipelines so that the misprediction delay is between 10 and 20 clock cycles. The longer the pipeline the greater the need for a good branch predictor.

The first time a conditional jump instruction is encountered, there is not much information to base a prediction on. But the branch predictor keeps records of whether branches are taken or not taken. When it encounters a conditional jump that has been seen several times before then it can base the prediction on the history. The branch predictor may, for example, recognize that the conditional jump is taken more often than not, or that it is taken every second time.

Branch prediction is not the same as branch target prediction. Branch prediction attempts to guess whether a conditional jump will be taken or not. Branch target prediction attempts to guess the target of a taken conditional or unconditional jump before it is computed by decoding and executing the instruction itself. Branch prediction and branch target prediction are often combined into the same circuitry.

Static Prediction

Static prediction is the simplest branch prediction technique because it does not rely on information about the dynamic history of code executing. Instead it predicts the outcome of a branch based solely on the branch instruction.

The early implementations of SPARC and MIPS (two of the first commercial RISC architectures) used single direction static branch prediction: they always predicted that a conditional jump would not be taken, so they always fetched the next sequential instruction. Only when the branch or jump was evaluated and found to be taken did the instruction pointer get set to a non-sequential address.

Both CPUs evaluated branches in the decode stage and had a single cycle instruction fetch. As a result, the branch target recurrence was two cycles long, and the machine would always fetch the instruction immediately after any taken branch. Both architectures defined branch delay slots in order to utilize these fetched instructions.

A more complex form of static prediction assumes that backward branches will be taken, and forward-pointing branches will not be taken. A backward branch is one that has a target address that is lower than its own address. This technique can help with prediction accuracy of loops, which are usually backward-pointing branches, and are taken more often than not taken.

Some processors allow branch prediction hints to be inserted into the code to tell whether the static prediction should be taken or not taken. The Intel Pentium 4 accepts branch prediction hints while this feature is abandoned in later processors.

Static prediction is used as a fall-back technique in some processors with dynamic branch prediction when there isn't any information for dynamic predictors to use. Both the Motorola MPC7450 (G4e) and the Intel Pentium 4 use this technique as a fall-back.

Next Line Prediction

Some superscalar processors (MIPS R8000, Alpha 21264 and Alpha 21464 (EV8)) fetch each line of instructions with a pointer to the next line. This next line predictor handles branch target prediction as well as branch direction prediction.

When a next line predictor points to aligned groups of 2, 4 or 8 instructions, the branch target will usually not be the first instruction fetched, and so the initial instructions fetched are wasted. Assuming for simplicity a uniform distribution of branch targets, 0.5, 1.5, and 3.5 instructions fetched are discarded, respectively.

Since the branch itself will generally not be the last instruction in an aligned group, instructions after the taken branch (or its delay slot) will be discarded. Once again assuming a uniform distribution of branch instruction placements, 0.5, 1.5, and 3.5 instructions fetched are discarded.

The discarded instructions at the branch and destination lines add up to nearly a complete fetch cycle, even for a single-cycle next-line predictor.

Saturating Counter

A saturating counter or bimodal predictor is a state machine with four states:

1. Strongly not taken
2. Weakly not taken
3. Weakly taken
4. Strongly taken

When a branch is evaluated, the corresponding state machine is updated. Branches evaluated as not taken decrement the state toward strongly not taken, and branches evaluated as taken increment the state toward strongly taken. The advantage of the two-bit counter over a one-bit scheme is that a conditional jump has to deviate twice from what it has done most in the past before the prediction changes. For example, a loop-closing conditional jump is mispredicted once rather than twice.

The original, non-MMX Intel Pentium processor uses a saturating counter, though with an imperfect implementation.

On the SPEC'89 benchmarks, very large bimodal predictors saturate at 93.5% correct, once every branch maps to a unique counter.

The predictor table is indexed with the instruction address bits, so that the processor can fetch a prediction for every instruction before the instruction is decoded.

Two-Level Adaptive Predictor

Every entry in the pattern history table represents a 2-bit saturating counter.

If there are three if statements in a code, the third if statement might be taken depending upon whether the previous two were taken/not-taken. In such scenarios two-level adaptive predictor works more efficiently than a saturation counter. Conditional jumps that are taken every second time or have some other regularly recurring pattern are not predicted well by the saturating counter. A two-level adaptive predictor remembers the history of the last n occurrences of the branch and uses one saturating counter for each of the possible 2n history patterns.

Consider the example of n=2. This means that the last two occurrences of the branch are stored in a 2-bit shift register. This branch history register can have 4 different binary values: 00, 01, 10, and 11; where 0 means "not taken" and 1 means "taken". Now, we make a pattern history table with four entries, one for each of the 2n=4 possible branch histories. Each entry in the pattern history table contains a 2-bit saturating counter of the same type as in FIG. 2. The branch history register is used for choosing which of the four saturating counters to use. If the history is 00 then the first counter is used. If the history is 11 then the last of the four counters is used.

Assume, for example, that a conditional jump is taken every third time. The branch sequence is 001001001 . . . . In this case, entry number 00 in the pattern history table will go to state "strongly taken", indicating that after two zeroes comes a one. Entry number 01 will go to state "strongly not taken", indicating that after 01 comes a 0. The same is the case with entry number 10, while entry number 11 is never used because there are never two consecutive ones.

The general rule for a two-level adaptive predictor with an n-bit history is that it can predict any repetitive sequence with any period if all n-bit sub-sequences are different.

The advantage of the two-level adaptive predictor is that it can quickly learn to predict an arbitrary repetitive pattern. Variants of this prediction method are used in most modern microprocessors.

Local Branch Prediction

A local branch predictor has a separate history buffer for each conditional jump instruction. It may use a two-level adaptive predictor. The history buffer is separate for each conditional jump instruction, while the pattern history table may be separate as well or it may be shared between all conditional jumps.

The Intel Pentium MMX, Pentium II and Pentium III have local branch predictors with a local 4-bit history and a local pattern history table with 16 entries for each conditional jump.

On the SPEC'89 benchmarks, very large local predictors saturate at 97.1% correct.

Global Branch Prediction

A global branch predictor does not keep a separate history record for each conditional jump. Instead it keeps a shared history of all conditional jumps. The advantage of a shared history is that any correlation between different conditional jumps is part of making the predictions. The disadvantage is that the history is diluted by irrelevant information if the different conditional jumps are uncorrelated, and that the history buffer may not include any bits from the same branch if there are many other branches in between. It may use a two-level adaptive predictor.

This scheme is only better than the saturating counter scheme for large table sizes, and it is rarely as good as local prediction. The history buffer must be longer in order to make a good prediction. The size of the pattern history table grows exponentially with the size of the history buffer. Hence, the big pattern history table must be shared among all conditional jumps.

A two-level adaptive predictor with globally shared history buffer and pattern history table is called a "gshare" predictor if it xors the global history and branch PC, and "gselect" if it concatenates them. Global branch prediction is used in AMD microprocessors and in Intel Pentium M, Core and Core 2.

Alloyed Branch Prediction

An alloyed branch predictor combines the local and global prediction principles by concatenating local and global branch histories, possibly with some bits from the program counter as well. Tests indicate that the VIA Nano processor may be using this technique.

Agree Predictor

An agree predictor is a two-level adaptive predictor with globally shared history buffer and pattern history table, and an additional local saturating counter. The outputs of the local and the global predictors are XORed with each other to give the final prediction. The purpose is to reduce contentions in the pattern history table where two branches with opposite prediction happen to share the same entry in the pattern history table.

The agree predictor was used in the first version of the Intel Pentium 4, but was later abandoned.

Hybrid Predictor

A hybrid predictor, also called combined predictor, implements more than one prediction mechanism. The final prediction is based either on a meta-predictor that remembers which of the predictors has made the best predictions in the past, or a majority vote function based on an odd number of different predictors.

Predictors like gshare use multiple table entries to track the behavior of any particular branch. This multiplication of entries makes it much more likely that two branches will map to the same table entry (a situation called aliasing), which in turn makes it much more likely that prediction accuracy will suffer for those branches. Once you have multiple predictors, it is beneficial to arrange that each predictor will have different aliasing patterns, so that it is more likely that at least one predictor will have no aliasing. Combined predictors with different indexing functions for the different predictors are called gskew predictors, and are analogous to skewed associative caches used for data and instruction caching.

Loop Predictor

A conditional jump that controls a loop is best predicted with a special loop predictor. A conditional jump in the bottom of a loop that repeats N times will be taken N−1 times and then not taken once. If the conditional jump is placed at the top of the loop, it will be not taken N−1 times and then taken once. A conditional jump that goes many times one way and then the other way once is detected as having loop behavior. Such a conditional jump can be predicted easily with a simple counter. A loop predictor is part of a hybrid predictor where a meta-predictor detects whether the conditional jump has loop behavior.

Many microprocessors today have loop predictors.

Prediction of Indirect Jumps

An indirect jump instruction can choose among more than two branches. Newer processors from Intel and AMD can predict indirect branches by using a two-level adaptive predictor. This kind of instruction contributes more than one bit to the history buffer.

Processors without this mechanism will simply predict an indirect jump to go to the same target as it did last time.

Prediction of Function Returns

A function will normally return to where it is called from. The return instruction is an indirect jump that reads its target address from the call stack. Many microprocessors have a separate prediction mechanism for return instructions. This mechanism is based on a so-called return stack buffer, which is a local mirror of the call stack. The size of the return stack buffer is typically 4-16 entries.

Overriding Branch Prediction

The trade-off between fast branch prediction and good branch prediction is sometimes dealt with by having two branch predictors. The first branch predictor is fast and simple. The second branch predictor, which is slower, more complicated, and with bigger tables, will override a possibly wrong prediction made by the first predictor.

The Alpha 21264 and Alpha EV8 microprocessors used a fast single-cycle next line predictor to handle the branch target recurrence and provide a simple and fast branch prediction. Because the next line predictor is so inaccurate, and the branch resolution recurrence takes so long, both cores have two-cycle secondary branch predictors which can override the prediction of the next line predictor at the cost of a single lost fetch cycle.

The Intel Core i7 has two branch target buffers and possibly two or more branch predictors.

Neural Branch Prediction

Machine learning for branch prediction using LVQ and multi-layer perceptrons, called "neural branch prediction", was proposed by Prof. Lucian Vintan (Lucian Blaga University of Sibiu). The neural branch predictor research was developed much further by Prof. Daniel Jimenez (Rutgers University, USA). In 2001, (HPCA Conference) the first perceptron predictor was presented that was feasible to implement in hardware.

The main advantage of the neural predictor is its ability to exploit long histories while requiring only linear resource growth. Classical predictors require exponential resource growth. Jimenez reports a global improvement of 5.7% over a McFarling-style hybrid predictor. He also used a gshare/perceptron overriding hybrid predictors.

The main disadvantage of the perceptron predictor is its high latency. Even after taking advantage of high-speed arithmetic tricks, the computation latency is relatively high compared to the clock period of many modern microarchitectures. In order to reduce the prediction latency, Jimenez proposed in 2003 the fast-path neural predictor, where the perceptron predictor chooses its weights according to the current branch's path, rather than according to the branch's PC."

Recovery after Misprediction/Rollback

On the speculative execution of a conditional jump, the Register Positioning Table (RPT) is duplicated to save the current pointers. In case of a branch mispredict, the original, saved RPT is restored.

The retire signals (0513) for all Execution Units referenced by RRA in the saved RPT will be recorded but blocked. Thus all data remains in the arrangement of Execution Units and is available in case the prediction was wrong (misprediction), so that the actual data and state before the wrongly execution begun can be restored.

In case the correct speculative prediction is confirmed, once the data/status driving the condition is available, execution continues unaltered, the duplicated RPT will be resigned and/or removed and the recorded retire signals will be unblocked and issued.

In case the speculative prediction was wrong, execution is stopped. All Execution Units which got instructions issued to after the execution of the conditional jump are forced to retire. The RPT created after the execution of the wrongly predicted jump is deactivated and the duplicated RPT is activated again. The recorded retire signals are cleared.

Data for storing to memory is, before released to memory, stored in a data store buffer. The buffer is typically embodied as a FIFO (first-in, first-out) memory, to maintain the order in which the data is stored. In case the speculative prediction is confirmed, the data is released and actually written to memory. Otherwise (speculation was wrong), the respective data is to deleted from the buffer.

An exemplary embodiment for a method for operation speculative conditional jumps can be implemented like this:
CE1) A conditional jump is speculatively executed (e.g. based on a prediction):
   CE1.1) The Register Positioning Table (RPT) is duplicated to a duplicated RPT;
   CE1.2) All retire signals will be recorded but blocked from now on;
   CE1.3) If no more resources are available (e.g. due to blocked retire signals and/or full data store buffer) further code issue stalls until condition has been evaluated (see CE2);
   CE1.4) All data to be stored to memory is sent to a store data FIFO memory.
CE2) Once the condition driving the conditional jump becomes executable (since the required input data and/or status is available):
   CE2.1) If the speculation was correct:
     CE2.1.1) Remove duplicated RPT;
     CE2.1.2) Unblock and issue recorded retire signals (0513);
     CE2.1.3) Transmit store data FIFO to memory;
   CE2.2) If speculation was wrong:
     CE2.2.1) Remove currently active RPT (the one created; after speculative jump), (re-)activate duplicated RPT;
     CE2.2.2) Clear recorded retire signals;
     CE2.2.3) Data from store data FIFO is not sent to memory, clear store data FIFO.

Register Position Table (RPT) for Duplication

Figure 6:
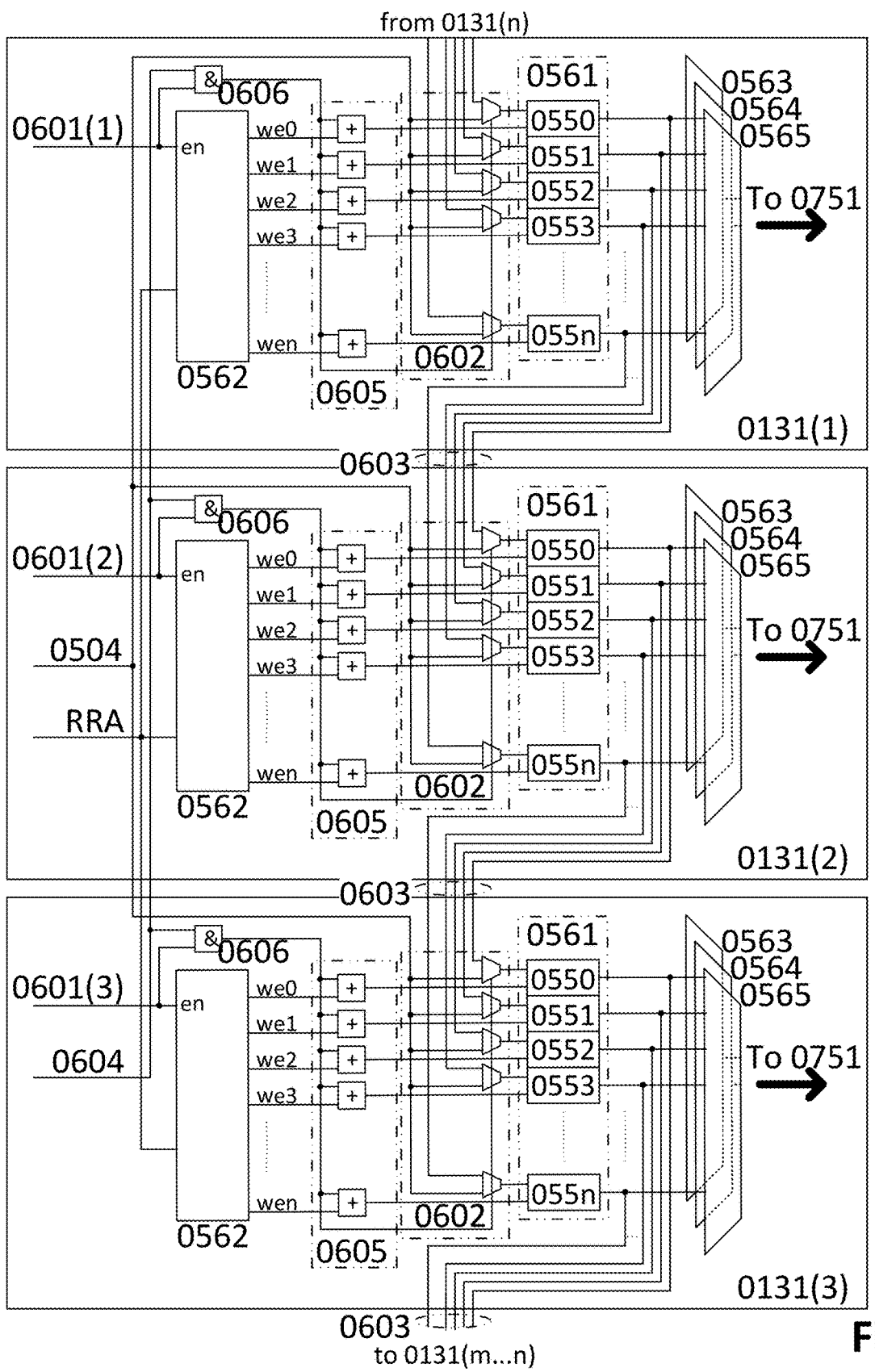
FIG. 6 is a diagrammatic illustration of an example implementation of an enhanced Register Positioning Table (RPT)

FIG. 6 shows an exemplary embodiment of a respectively enhanced Register Positioning Table (RPT). For a detailed description of all references with the numbers 05nn (e.g. 0501, 0510) refer to FIG. 5.

The exemplary shown embodiment comprises a plurality of chained RPT (0131(1), 0131(2), 0131(3), and further n-m+1 tables 0131(m . . . n)) forming one combined RPT. The outputs of each table (0561) are connected (0603) via multiplexers (0602) to the inputs of the respective subsequent table. This connection provides for duplicating a table (0561 e.g. of 0131(1)) by copying its content into the respective subsequent table (0561 e.g. of 0131(2)). Preferably the outputs of the last RPT (0131(n)) are connected to the inputs of the first (0131(1)) to constitute a ring-buffer structure.

A selector signal (0601) is provided by the control unit (0801, see FIG. 8) for enabling one of the plurality of decoders 0562 and by such one of the RPTs for writing access.

If a RPT is newly activated by the speculative execution of a conditional jump, the unit executing the conditional jump (depending on the implementation this might be for example either one of the Execution Units, the Instruction Decoder or the Instruction Fetcher) triggers the release of a new selector signal (0601) selecting the new table, into which the current table shall be duplicated, and a single cycle (e.g. single clock) copy signal (0604). The copy signal is logically (AND) combined (0606) with the selector signal to a) select via the multiplexer stage 0602 the input from the previous RPT (0603) as write data input to the table (0561), and b) trigger via a logical (OR) combination (0605) with each of the write enable (WEn) signals the write enable for each of the registers (0550, 0551, 0552, 0553, . . . , 055n) of the respective table 0561 of the RPT selected by the selector signal 0601.

Triggered by the speculative execution of a conditional jump instruction the current RPT (i.e. original RPT) is saved by copying its content to the subsequent RPT (i.e. new RPT) and enabling the subsequent RPT for further use via an updated selector signal 0601 for further operation. By a control unit, an exemplary embodiment is shown in FIG. 8, first the selector signal (0601) is updated. Then, for one clock cycle, the copy signal (0604) is activated to transfer the content from the original RPT to the new RPT.

All newly issued instructions will alter the new RPT (e.g. 0131(2)). The original RPT (e.g. 0131(1)) remains unchanged and is thus "saved". In case the speculation was wrong (mispredicted), the selector signal is reset to the previous value and the original, unaltered RPT (original, e.g. 0131(1)) is operational again.

The maximum number of speculative conditional jump instructions in-flight (i.e. issued, but not concluded) is defined by the number of RPTs implemented in the combined RPT. For each conditional jump instruction in flight one additional RPT is required. Thus the total amount of conditional jump instructions in-flight (#ConditionalJumps-InFlight) is the number of RPTs (#RPTs) minus 1:

conditionalJumpsInFlight=#RPTs−1

FIG. 7 provides further details of an exemplary implementation of the inventive Issue Unit.

As described, in case of a mispredict of a speculated conditional jump operation, the whole operation has to be rolled back until the position directly in front of the mispredicted jump, then the jump has to correctly executed. For rolling back the operation and removing the wrongly issued instructions from the arrangement of Execution Units, in one embodiment the retire signals (0513) could be used. However this is rather time and energy consuming, since the Execution Units will only retire, once their operation has been concluded (i.e. terminated).

Thus, in a preferred embodiment as shown in FIG. 7A, an additional signal is introduced to each of the Execution Units, called "trash". The signal trash causes an immediate abortion of the operation of an Execution Unit at the earliest possible moment. By that time is saved, since the Execution Unit becomes almost immediately available for new operations and additionally energy is saved since no unnecessary operations are executed longer as necessary.

There is a dedicated (e.g. trash_(0,0), trash_(0,1), trash_(0,2), . . . , trash_(m,n)) trash signal (0702) from a Trash Unit (0701) to each of the Execution Units. In a table (0711) for each newly used Execution Unit an entry (in register 0721, 0722, 0723, . . . , 072n) is made as soon as an instruction is issued. If a misprediction is detected and a rollback is required a signal ROLLBACK (0713(n)) is sent from the control unit (0801) to the Trash Unit (0701). The signal is combinatorial combined with the entries of the table (0711) using AND gates (0712). Consequently for each entry made, the respective trash signal (0702) is generated.

As shown in FIG. 7, each RPT (0131(1), 0131(2), . . . , 0131(n)) has an associated Trash Unit (0701(1), 0701(2), . . . , 0701(n)).

Reference is made to FIG. 7A again. The entries of the table (0711) are cleared, whenever the selector signal (0601) selects a new RPT and the copy from the original RPT to the new RPT is initiated by the copy signal (0604). The clear signal (clear_all) for the associated thrash unit (0701(n)) is generated by combining the copy signal (0604) with the respective selector signal for the RPT (0601(n)) using a AND gate.

For setting an entry a set signal (set_0, set_1, set_2, . . . , set n) is generated for each of the entries by a decoder (0710). The decoder receives the address (0504) of the Execution Unit currently selected for instruction issue and generates the respective set signal.

As discussed before, when a speculative conditional jump is performed, the retirement of all currently active Execution Units must be blocked until the conditional jump is finally concluded by evaluation the condition and deciding whether the speculative jump was correctly predicted (correct) or mispredicted. In case it was correctly predicted, all Execution Units scheduled for retirement can immediately retire. If it was mispredicted, all Execution Units scheduled for retirement have to remain in existence, so that the register values stored in their result registers remain accessible for further operations.

In the exemplary embodiment this function is implemented by a Sample-and-Hold Stage (0751) inserted into the retirement signal (0505). Reference is made to FIG. 7B and FIG. 5.

For each of the Execution Units its dedicated retirement signal 0501 can be sampled and held. FIG. 7B shows a Sample-and-Hold Unit (0751) comprising a dedicated Sample-and-Hold Stage for each one of the Execution Units in the arrangement of Execution Units, as indicated by the plurality of layers shown in FIG. 7B.

Exemplary shown is the Sample-and-Hold Stage (0751_(u,v)) for the retirement signal 0505(u,v) of the Execution Unit (EXU(u,v)) at position (u,v) inside the arrangement of Execution Units.

When a conditional jump is speculatively performed, within the Sample-and-Hold Unit (0751) the selector signal (0601(n)) is combined with the copy signal (0604) using a AND gate to set a register (0761) to logical 1 indicating the activation of the respective Sample-and-Hold Unit.

Consequently, within each Sample-and-Hold Stage, the retire signal for the respective Execution Unit (EXU(u,v)) is not propagated through the multiplexer 0762 to the output (0752(u,v)) to the respective Execution Unit (EXU(u,v)) anymore. Instead, the value of the retire signal (0505(u,v)) is stored in a register (0763).

If the respective conditional jump is confirmed, a confirmation signal (0753(n)) is released by the control unit (0801) for a single cycle (e.g. single clock cycle). The signal is combined with the output of register 0763 using an AND gate to generate the release signal. Said release signal is propagated through multiplexer 0762 to the output (0752(u,v)) to the respective Execution Unit (EXU(u,v)).

If the respective conditional jump was mispredicted, data processing is rolled back. The ROLLBACK signal (0713(n)) clears the registers of the Sample-and-Hold Unit, including the registers of all its internal Sample-and-Hold Stages. Thus the wrongly sampled retire signals are all cleared.

It shall be noted that, in a preferred embodiment, each Sample-and-Hold Unit is also cleared when being selected for operation, prior to actually becoming operational. The respective selector signal (0601(n)) is combined with the copy signal (0604) in an AND gate to generate a clear signal. This can be derived from the associated unit 0701(n). The clear signal is combined with the ROLLBACK signal (0713(n)) by an OR gate (0764) to generate the clear pulse for the registers.

As shown in FIG. 7, each RPT (0131(1), 0131(2), ..., 0131(n)) has an associated Sample-and-Hold Unit (0751(1), 0751(2), ..., 0751(n)).

The RPTs, Trash Units and Sample-and-Hold Units are under control of the Control Unit (0801) which provides control signals to the units (e.g. 0601, 0713, 0753). Of each unit 1 to n units are implemented, one for basic operations and another one for each supported speculative jump operation in flight. Thus n levels of units are implemented. A multiplexer (0791) selects the level of units which is currently activated by the control unit (0801) via a select signal 0802 provided by the control unit. The select signal 0802 is typically set in accordance with the active RPT selected by 0601(n), e.g. 0601(2). The respective levels output signals are fed through the multiplexer output and transmitted (0792) to the arrangement of Execution Units (0110).

FIG. 8 shows an exemplary embodiment of a Control Unit. Jump instructions are issued to units performing the jump operation, which is the respective modification of the program pointer. Which unit actually does the modification depends on the embodiment (e.g. an Execution Unit, a Jump Unit, a unit integrated into the Instruction Fetcher, etc.) and is not of this patents concern. We refer to the unit from now on as Jump Unit. In any case jumps are issued to this unit or units (Jump Unit) in-order and executed in-order to ensure the correct sequence of the executed program. The Jump Unit provides a first signal (JMP_SPEC, 0821) to the Control Unit (0801) indicating that a speculative jump is performed. A speculative jump is a conditional jump for which the condition has been predicted, since the actual data or status information required to evaluate the condition is currently not yet available from the respective Execution Units. A second signal (JMP_COR, 0822) is provided to indicate that the speculative jump has been concluded and the speculation was correct, a third signal (JMP_MIS, 0823) respectively indicates that the speculation was mispredicted (i.e. wrong).

JMP_SPEC triggers a counter (0803), speculation counter, to increment for selecting the next level, speculation level. Reference is made to FIG. 7. The counter output is transmitted (0802) to the level multiplexer's (0791) select input. Further the counter value is fed to a n-to-$2^n$ decoder for activating the respective units via 0601(1 ... n). Further the JMP_SPEC signal is delayed (0810) to fit the other elements timing to produce the copy signal (0604).

JMP_COR triggers a second counter (0805), confirmed counter, to increment for setting the level, confirmed level, up to which the speculatively executed jumps have been confirmed to be correct.

In the preferred embodiment, the RPTs, Trash Units, and Sample-and-Hold Units, are arranged in a ring, reference is made to FIG. 6 0603, implementing a FIFO like structure. Consequently the Control Unit (0801) has to provide respective functionality for detecting a full condition, in which no more speculative jumps can be performed. This is done by comparing the value of the two counters 0803 and 0805 in a comparator (0804). If the value of the speculation counter 0804 is one step away of the confirmed counter (0805), in a way such that with the next speculative execution of a jump the two counter values would be the same, the structure is full. Respectively the comparator issues a full signal (0831) blocking to the issue of the next speculative conditional jump and all following instructions.

The ROLLBACK signal (0713) is generated by computing the difference between the two counters 0803 and 0805. All entries in between these must be removed in case of a detected misprediction. A first level decoder (0807) decodes the value of counter 0803 into a fill level. Assuming the counter 0803 is n-bits wide, the level decoders result is 2n-bits wide, the MSB being the leftmost bit and the LSB being the rightmost. Usual n-to-$2^n$ decoders are combinational circuits that convert binary information from 'n' coded inputs to a maximum of $2^n$ unique outputs. Exactly the output bit 'b' is set which correlates to the binary input code. The level decoder also sets the correlated bit and all low-order bits. For example for n=3 the different decoders would produce:

| Binary input | 3-to-$2^3$ output | Level output |
| --- | --- | --- |
| 000 | 00000001 | 00000001 |
| 001 | 00000010 | 00000011 |
| 010 | 00000100 | 00000111 |
| 011 | 00001000 | 00001111 |
| 100 | 00010000 | 00011111 |
| 101 | 00100000 | 00111111 |
| 110 | 01000000 | 01111111 |
| 111 | 10000000 | 11111111 |

A second level decoder (0808) respectively decodes the value of counter 0805 into a fill level.

The levels between the speculation level and confirmed level can now be simply computed by bitwise XORing the level decoders results (0809).

FIG. 8A shows an example. The confirmed level counter (0805) is at level 1. Accordingly the level output of 0808 is 00000011 (0862). The speculation level counter (0803) is at level 3. Accordingly the level output of 0807 is 00001111 (0861). A bit wise XOR of the two levels produces 00001100 (0863), indicating all levels in the ring being speculative (SPECULATIVE LEVELS).

The Jump Unit provides the already explained signal (0823), JMP_MIS signal, to the Control Unit, indicating a previously speculative jump has now been evaluated on basis of the now being available data; and was wrongly predicted. Accordingly processing must roll back to the last confirmed level.

The JMP_MIS signal triggers the speculation counter 0803 to load the value of the confirmed counter (0805). Thus all speculative levels are removed. Simultaneously the JMP_MIS signal triggers a mask (0811) to release the computed SPECULATIVE LEVELS to the ROLLBACK signal (0713), resulting in a roll back. The mask can be implemented as a bitwise AND, logically AND-combining each of the SPECULATIVE LEVELS vector with the JMP_MIS signal into an output vector.

If a jump has been confirmed by the Jump Unit by releasing the signal JMP_COR, additionally the Sample-and-Hold stages must release the respective retire signals. Thus 0753 must be respectively generated.

The most efficient embodiment uses an adder (0812), adding a binary 1 to the confirmed counter's (0805) value. Accordingly the result of the adder points to the level being confirmed with the incoming JMP_COR signal (note: with the arrival of the signal 0805 counts up and points to this level one clock later). A n-to-2n decoder (0813) decodes the adder's value producing a bit vector. The bit vector is released through a mask (0814) to the confirmation signal 0753. The mask (0814) can be implemented as mask 0811 using AND gates, of course with the difference that the JMP_COR signal drives the mask.

Note: In a simpler embodiment the adder (0812) can be removed, if the JMP_COR signal to the mask (0814) is delayed such that it arrives at the mask after the counter (0805) has counted up triggered by JMP_COR. Thus the counter points already to the level to be confirmed. The disadvantage of this embodiment is that a clock cycle is wasted in which possibly already new instructions could have been issued to the already retired Execution Units.

The above explained two alternative embodiments show, that the described invention can be implemented in a variety of embodiments, depending on the preference of the engineer, and/or market and/or product restrictions and/or requirements. Understanding the basic concepts of this invention, this variety of possible embodiments is obvious for one skilled in the art.

Interrupt Processing Based on RPT Duplication

Some of the capabilities introduced to handle jump prediction can be used for another interrupt processing method, either in addition or alternatively to the previously described methods.

This method operates as follows:

Once an interrupt occurs a new RPT (RPT_ISR) is select. The RPT (RTP_TRT) used by the thread active before the interrupt remains unaltered and is not copied into the newly selected one. By doing so, a virtually new register file is generated. The interrupt service routine (ISR) can freely use any register, since the RPT is empty and will assign new registers inside the array.

When the ISR routine terminates, the previous RPT (RTP_TRT) is restored and by such the original register set and its content.

An exemplary embodiment is based on the previously described figures. According to FIG. 6 a new RPT (RPT_ISR) is selected by setting the respective 0601(n), e.g. (0601(3)) to select the new RPT (RPT_ISR). 0802 is accordingly set to transfer the output of the selected RPT through the multiplexer 0791.

In difference to the above mentioned speculative execution, the content of the currently active RPT (RTP_TRT) is not copied into the new RPT (RPT_ISR). Thus the copy signal 0604 is not set. Therewith a new, empty RPT (RPT_ISR) is used for the interrupt service routine (ISR).

Once the ISR terminates the selector signals 0601 are set to select the old RPT (RTP_TRT) again. The RPT (RPT_ISR) used for the interrupt service routine (ISR) is abandoned and might be cleared.

The effect of that procedure is that a virtually new register file is available for the ISR, while the register file used by the interrupted thread remains untouched. Consequently there is no need to save the register file of the interrupted thread before executing the interrupt service routine (ISR) and restoring it after the ISR has been terminated.

Common Bus

The EXU-Block of ZZYX processors was originally designed for accelerating loops. According to the nature of such algorithms, mostly next neighbour or close-vicinity connections where possible, keeping the networking overhead at a reasonable level.

Applying the EXU-Block for out-of-order processing according to the present invention requires a more flexible interconnectivity. Typically any EXU could produce a result which might be used as an operand for any other EXU. Thus the connectivity of an EXU cannot be optimized to a rather close vicinity (plus the register file). A full connectivity between any of the EXUs (any-EXU to any-EXU) is required, significantly increasing the wiring overhead.

A reasonably sized EXU-Block may comprise for example as of today up to 256 EXUs (in this example having only one output register), providing similar out-of-order capabilities like a 256 entry Reorder Buffer. But, a 256-to-256 network interconnectivity for supplying any result to any operand input appears comparably large and inefficient.

On the other hand, it is unlikely that many EXUs produce results at the same time. Thus, in a preferred embodiment, a reduced bus system is implemented. The bus system has a limited amount of transmission paths, shared between the potential data senders. The access of the data producing EXUs (senders) to one of the transmission paths is arbitrated by an arbiter for each of the transmission paths.

Data transfer from an EXU is arbitrated and data transmitted to the transmissions paths of the bus system under at least the following two circumstances:

1. A result has been newly produced by the EXU and is ready for transmission to the operand data inputs of the receiving EXUs.
2. An instruction is newly issued to an EXU. If the operand data is already available, it is transmitted from the source register (e.g. inside the source EXU or from the register file).

Accessing the result registers is under supervision of the RPT (0131), as described before.

FIG. 20 shows an exemplary implementation of a shared bus:

In this exemplary embodiment the shared bus (2001) comprises 8 transmission paths which is regarded as a reasonable lower limit (of course, for low cost applications, even less transmission paths are feasible). Large arrays have preferably more transmission paths. For example have experiments shown that 32 to 64 paths are reasonable for an array of 256 EXUs. The shared bus receives results data from i) a plurality of Load/Store Units (2002) via arbiter 2003 and ii) a plurality of Execution Units (2004 and 2005) via arbiter 2006. This exemplary embodiment comprises two types of Execution Units: A first plurality of small, so called light weight, EXUs (2004) being designed for simple and hardware efficient (in terms of area) instructions; and a second plurality of large, so called heavy weight, EXUs (2005) being designed for complex and hardware area consuming instructions.

This exemplary embodiment comprises 4 Load/Store Units (2002), and a heterogeneous arrangement of Execution Units of 4 light weight Execution Units and 2 heavy weight execution units.

Via a multiplexer, indicated by 2010) the shared bus (2001) feeds the operand inputs of i) the plurality of Load/Store Units (2002) and ii) the plurality of Execution Units (2004 and 2005). Further the shared bus can write result data directly into the register file (2011) via multiplexer 2012.

The arbiters (2003 and 2006) add a token (tag) to the data arbitrated for transmission onto a transmission channel of the shared bus. The token indicated from which of the Execution Units the data has been produced. Basically it can be the Execution Unit's address. The multiplexers (2010 and 2011) selecting the transmitted data as an operand input for the Execution Units or the Register File check the respective token, so that the correct result data is transmitted to their respective operand data input.

Conditional Execution and Predication

A ZZYX processor might support the execution of if-then-else statements in the processor architecture. An if-instruction executed either by one of the ALUs of the ALU Block or by s separated unit tests the status flags generated by at least one of the ALUs of the ALU Block (reference is made to [1], e.g. chapters "Processor Status" and "Conditional Execution") for a certain given condition. The condition to be evaluated is encoded in the if-instruction's opcode (reference is made to [1] again and [4], e.g. chapter "Branch prediction and speculative execution"). The execution of the if-instruction produces a flag indicating whether the condition was met (true) or not met (false). The produced flag is stored in a register (FLAG-bit) together with an indicator (COND-bit) that the following code is conditionally processed. In one preferred embodiment the register is located in or part of the processor's status register.

An exemplary processor status register (PSR) is shown below:

| m..n+3 | n+2 | n+1 | n..0 |
|---|---|---|---|
| higher PSR bits | FLAG | COND | lower PSR bits |

At least some of the instructions of a ZZYX processor might comprise a conditional execution field to supports predication. Predication is known e.g. from ARM processors (reference is made to [14]); further reference is made again to [1] and [4].

In difference to the state of the art (e.g. ARM), the predication field of the instructions does not comprise the complete condition for which encoding usually 4 or more bits are required. This is not necessary, since the complete condition was encoded and checked by the if-instruction. Only one predication bit is used in typical instructions (the TE-field), defining whether the instruction is executed if the condition is met (predication bit is 0) or the condition is not met (predication bit is 1). A complete if-then-else construct can be implemented:
 if is implemented by the if-instruction.
 then is implemented by subsequent condition bits set to 0.
 else is implemented by subsequent condition bits set to 1.
Conditional execution is terminated by an endif-instruction. The endif-instruction clears the COND-bit in the register described above.

Each following instruction supporting predication is subsequently either executed if the condition is met (if-path, condition bit is 0) or not met (else-path, condition bit is 1). Or, in other words: If the TE-field of the instruction's binary is set to 0, the instruction is executed if the condition was met. If the TE-field is set to 1, the instruction is executed if the condition was not met.

In a preferred embodiment multiple conditions can be nested, for example like this 2-level construct:

| code | condition level | action |
|---|---|---|
| ... | unconditional processing | |
| if ( ) | up to level 1 | write result of condition test to FLAG[0] |
| then | level 1 | execute depending on FLAG[0] |
| if ( ) | up to level 2 | write result of condition test to FLAG[1] |
| then | level 2 | execute depending on FLAG [1] |
| else | level 2 | execute depending on FLAG [1] |
| endif | back to level 1 | |
| else | level 1 | execute depending on FLAG[0] |
| if ( ) | up to level 2 | write result of condition test to FLAG[1] |
| then | level 2 | execute depending on FLAG [1] |
| else | level 2 | execute depending on FLAG [1] |
| endif | back to level 1 | |
| endif | back to unconditional processing | |
| ... | unconditional processing | |

Preferably at least 4 nested levels are supported. Therefore the PSR is extended with a FLAG-bit for each level, i.e. 4 levels require 4 FLAG-bits. Further, the single COND-bit is replaced by a multi-bit indicator show the currently active level. To support 4 levels the indicator requires 3 bits:2 to indicate the level and a third to indicate whether conditional processing is active, i.e. the execution is within one or more if-then-else constructs.

To support $\lambda$ nested levels the indicator requires $$(\log_2 \lambda)+1$$

bits.

For example 3 nested levels can be encoded in the level identifier field (LID) like this:

| LID | |
|---|---|
| 00 | unconditional processing |
| 01 | condition level 1 |
| 10 | condition level 2 |
| 11 | condition level 3 |

A 4 level implementation might be encoded like this: LID in the PSR indicates the current level 001 to 100. If LID is 000, no condition is executed.

A 4-level PSR might be implemented like this:

| m..n+8 | n+7..n+ 4 | n+3..n+1 | n..0 |
|---|---|---|---|
| higher PSR bits | FLAG[4..1] | LID | lower PSR bits |

The if-instruction causes to step up one level, consequently LID is incremented. The result of the condition is entered into FLAG[LID]. The following instructions are executed depending on FLAG [LID]. The endif-instruction steps one level down and consequently decrements LID.

It is possible to jump conditionally into a subroutine. If the subroutine uses conditional execution, it should save the status of LID and FLAG and restore it before returning.

Interrupt service routines (ISR) (e.g. to switch to an interrupt routine), and/or thread-, and/or task-switches, and/or operating system, and/or library calls, etc.) should also save the status of LID and FLAG and restore it before returning.

Interrupt Processing in Loop-Acceleration Mode

After describing interrupt handling for ZZYX processor being designed for out-of-order processing, interrupt handling for standard ZZYX processors without out-of-order capabilities is described. Reference is made to the applicant's patents [1], [2], [3], [4], [5], [6], [7], [8] which all are incorporated by reference in their entirety. Anyhow, the same method can be applied on out-of-order processors according to this patent application, operating in a loop acceleration mode (e.g. Hyperscalar-mode and/or loop-acceleration-mode) as described in the patents listed above.

In loop-acceleration-mode a plurality of ALUs of the ALU-Block are semi-statically set up with the body (or a partition of a body) of a loop. Code is issued to the ALUs and the ALUs are interconnected via the network as described by the register accesses in the binary code. Register access in the loop body (or a partition of it) are transformed into a respective network setup to interconnect the ALUs. The once issued code of the loop body (or a partition of a body) remains static for all or at least a subset of loop iterations. Once the loop (or a partition of it) has terminated code issue starts with the next instructions in the binary. While iterating the loop the instructions issued to the ALUs of the ALU-Block and the network connections remain the same (static for that time). Detailed descriptions of this function can be found in the patents listed above.

Once an interrupt occurs, the data within the loop body (or a partition of it) has to be saved, typically it is pushed to the stack. Further the loop counter has to be saved. The interrupt service routine (ISR) is executed. Afterwards the loop has to be set up again, i.e. the ALUs have to be supplied with the instructions of the loop body (or a partition of a body) and the network has to be set up again. The loop counter has to be restored and loop iteration has to resume.

To further illustrate the issue and its solution Lothar Collar's Hailstone Sequence is used as example:

Given an integer n, we repeatedly want to apply the following procedure:

```
iters ← 0
while n ≠ 1:
    iters ← iters + 1
    if n is odd:
        n ← 3 × n + 1
    else:
        n ← n / 2
```

The pseudo code is translated into the ARM (reference is made to [14]) assembly program shown in FIG. 9a. As a note, n×3 is computed as (n+(n<<1)) and n/2 as (n>>1).

The program according to FIG. 9A would work fine in out-of-order mode, but in the other ZZYX processor modes (particularly e.g. Hyperscalar-mode and/or loop-acceleration-mode) as described in the applicant's patents [1], [2], [3], [4], [5], [6], [7], [8] the jump instructions inside the loops body are disturbing. Consequently the code is transformed and optimized using instruction predication to eliminate the jump instructions as shown in FIG. 9B. It shall be noted, that one skilled in the art understands the method of predication. Yet, reference is made to [14] for further details.

For the sake of completeness FIG. 9c shows the same code using the if-then-else construct as described above instead of predication.

The loop body comprises a loop carried dependency, obviously the value of register r0 generated in iteration n is required as input value for iteration n+1. This dependency cannot be resolved and thus it is beneficial to optimize the loop body for minimal latency.

For the sake of completeness an accordingly optimized version of the loop body is shown in FIG. 9C. The ADDNE R0, R0, R0, LSL #1 instruction is now non-conditional and writes its result to register r2: ADD R2, R0, R0, LSL #1. The instruction is now speculatively processed. If the ADDNE branch is taken, r2 is required as an input to the ADDNE instruction; but if the MOVEQ branch is selected, r2 is not required as an input. This allows, on a 4×n-ALU-Block (e.g. a 4×4-ALU-Block) to place the loop body (0901) into only 2 rows. Therewith the latency of the loop body is reduced to only 2 clock cycles.

The while loop, comprising the test and conditional exit jump in block 0902 and the unconditional jump back to the loop entry 0903, is optimized and in a preferred embodiment moved to dedicated loop hardware. Yet, it shall be expressively noted that, in an alternative embodiment, the respective instructions could, of course, be issued to the execution units (e.g. the ALUs of the ALU-Block) for execution.

FIG. 9D shows an alternative embodiment of the code of FIG. 9C, with the difference that the previously described IF instructions has been used to implement the conditional execution (0921).

Details of interrupting loops are discussed based on the exemplary code of FIG. 9B.

Reference is made to [1], [6], [7], [8] and particularly to [4]. [4] shows various methods to analyze code by a hardware analyzer unit inside a processor and optimize the code at execution time for more efficient loop processing, see e.g. [4] FIG. 13 and [4] FIGS. 19A-19F.

Figure 10:
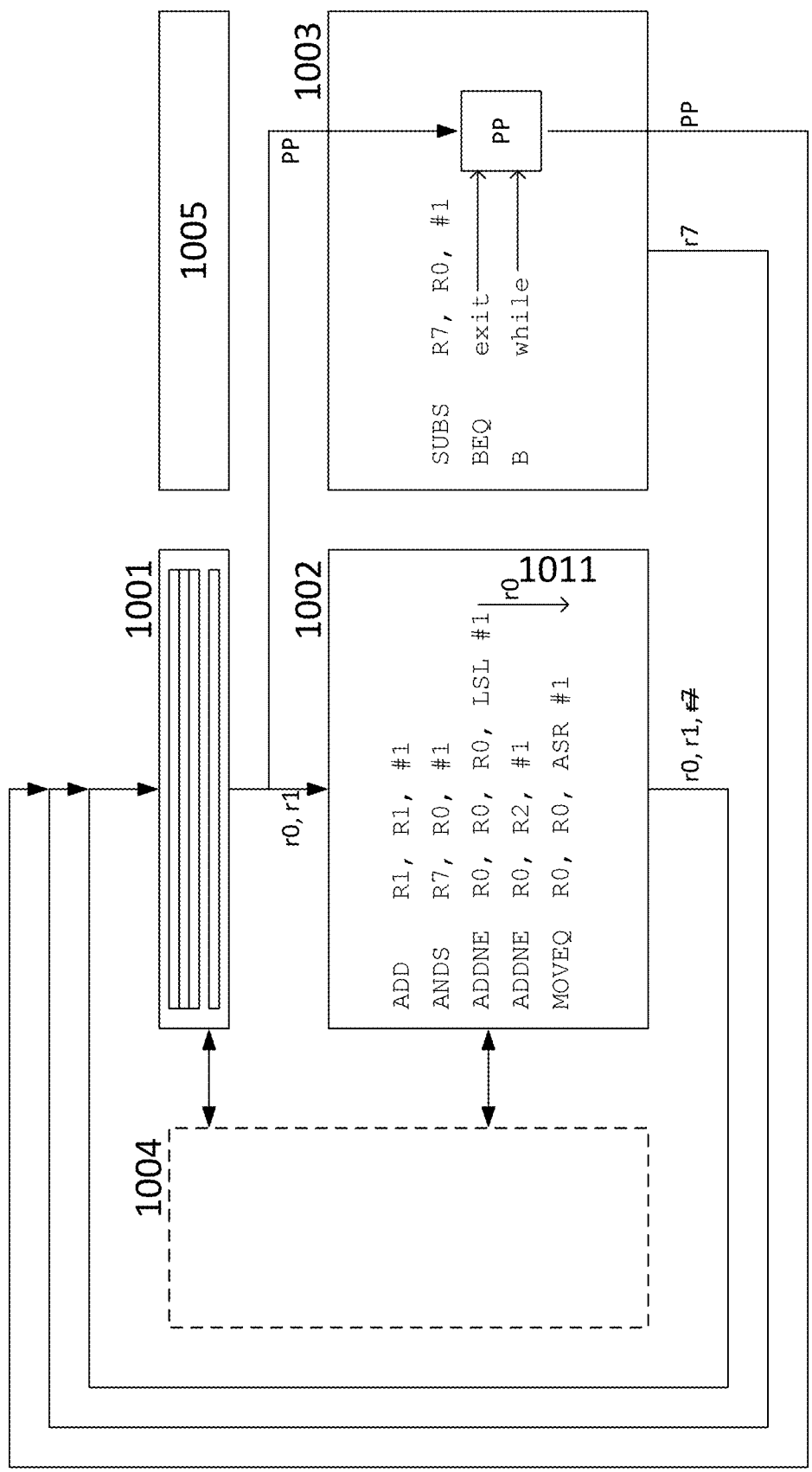
FIG. 10 is a diagrammatic illustration of an example implementation using a loop acceleration method.

FIG. 10 shows an exemplary embodiment of a loop acceleration method. The method can be implemented on the processors according to this application and/or the references listed above. Data is transmitted to or from the processors register file (1001). It shall be noted that the register file 1001 is a logic representation, the architectural register file. The physical register file might be implemented in various ways, for example i) as a dedicated register file being physically separate from the execution units (e.g. the ALU-Block) of the processor; or ii) as a distributed register file comprising registers being part of the execution units (e.g. the ALU-Block) as e.g. described in FIG. 1A and FIG. 2.

The execution units (1002) (e.g. the ALU-Block) execute the data processing instructions, again a logic representation is shown. In a preferred embodiment the loop control instructions are processed by dedicated unit. Yet, it shall be expressively noted, that loop control can also be processed on the execution units (1002). Depending on the embodiment loop control might be exclusively processed either on the execution units or the dedicated unit. If a dedicated loop control unit is used, complex loops might require support by the execution units, so that part of the loop code is processed on the execution units and another part by the dedicated hardware. 1003 shows a logic representation of the unit.

Only indicated, since not actually used by the exemplary code, is a logical representation of the load/store units (1004) exchanging data with the register file and/or directly with the execution units.

While issuing the code, a list in a memory (1005) monitors the actual location of the target registers of the issued instructions. For example the RPT (e.g. 0131), or RCRT (see [4] e.g. FIG. 16), or a remap file (e.g. used in MIPS R10000, Alpha 21264, AMD Athlon), or future file and/or rename file (e.g. used in AMD K7 and K8 and Intel Nehalem) and/or any other respective unit used in out-of-order processors.

As it has been described in [1], in a preferred embodiment, the execution units (e.g. ALU-Block or core) operates based on the requirement that all necessary input data for the computation inside the ALU-Block is available from the sources and ideally and depending on the implementation that the produced result data is acceptable at the receivers of the result data, e.g. register file, load/store units, etc.; i.e. the execution units become active and processing only when these conditions are met.

Thus it is a priori ensured that all data inside 1002 can be processed once it becomes active, since all operands required are available from the sources and the targets are ready to accept the result(s). Even for large arrays of execution units (e.g. a large ALU-Block) the execution time, i.e. the time to process all input operands and produce the output result, is in a reasonably time frame of a couple of tenth of clock cycles (e.g. 4-200 cycles as of today).

Consequently, upon the occurrence of an interrupt, the data processing pipeline inside 1002 is flushed by finishing the active data processing but not newly starting processing new operands. The exemplary code produces 3 times results targeting register r0 (indicated by 1011) all but the last results are temporary and intermediate. Since it is guaranteed that all data in 1002 will be completely processed (i.e.

data processing will be finished) it is, before entering the ISR, only necessary to save (e.g. push) the results from the data processing written back to the register file. No internal data within 1002 has to be saved. Since the instructions are issued in-order, these registers are referenced by 1005 (e.g. the RPT) as the last ones issued and are thus register RPT currently points at. Consequently, the describe method allows for ordinary saving (e.g. pushing) of those registers to the stack before entering the ISR and restoring (e.g. popping) the values back from the stack to the register file when returning from the ISR.

The same is the case for data produced by the loop control unit (1003) and the load/store units (1004).

Yet the program pointer (PP) requires some further discussion: First, the loop control unit monitors the status of the loop and controls its iteration and termination. It basically processes the loop control code which is in this example checking the value of register r0 (SUBS) and either terminating (BEQ) or continuing (B) the loop. How these three instructions are detected and mapped to the loop control unit (1003) will be described later on (e.g. in FIG. 12A and FIG. 13C).

The program pointer (PP) is set depending on the evaluation of the SUBS instruction: If the loop continues, i.e. the B while branch is taken, the program pointer (PP) is set to the loop entry, i.e. FIG. 9B 0931. If the termination criteria is met (i.e. R0 equals 1), the program pointer (PP) is set to the next instruction after the loop, i.e. FIG. 9B 0932. Consequently, the describe method allows for ordinary saving (e.g. pushing) of the program pointer (PP) to the stack before entering the ISR and restoring (e.g. popping) its value back from the stack when returning from the ISR. When returning from the ISR the loop restarts exactly at the loop entry (0931) with the next iteration.

It shall be noted that FIG. 10 shows the values received from the register file (i.e. r0 and r1 to 1002; and PP to 1003). Also it shows the values written to the register file (i.e. r0 and r1 from 1002; and PP from 1003). Depending on the implementation, r7 might be written either from 1002 or 1003. In the shown exemplary implementation r7 is actually written from 1003, while one would assume it is written from 1002 (thus it is respectively struck out). The reason for this will be discussed in FIG. 13C. It is obvious that all registers being used as input operands to the loop body in 1002 and the loop control unit 1003 are actually stored in 1001 and thus can be exchanged with 1001 for saving and restoring the respective values to/from the stack for processing the interrupt service routine (ISR). The same is the case for the load/store units (1004) but not shown in this example.

Analyser and Optimizer

Binary code analysers and optimizers (e.g. Analyser and Optimizer Stage (AOS)) have been described in [4], for details reference is made to the respective patent which is incorporated by reference. An advanced analyser and optimiser is one described now, as one aspect of this invention.

The analyser and optimizer stage, here called Analyser and Optimizer Unit (AOU), is located inside the processor front end and analyses the instruction stream for specific patterns. For example it detects loops. Other exemplary patterns are described later. Once loop code has been detected by the AOU, the code might be optimized and rearranged and the processor mode might be switched, e.g. in loop acceleration mode.

For the description of the AOU a more complex code example has been chosen, a matrix multiplication based on the following pseudo code:

```
for i = 1 to 1
    for k = 1 to n
        for j = 1 to m
            C(i,k) = C(i,k) + A(i,j) × B(j,k)
        end
    end
end
```

FIG. 11 shows the respective assembly code:
r0 holds i, r10 is the length l.
r1 holds k, r11 is the length n.
r2 holds j, r12 is the length m.
r7 holds the base address of C.
r8 holds the base address of A.
r9 holds the base address of B.
The following code sections are of particular relevance:
1101 calculates the address of C(i,k) and loads its value.
1102 calculates the address of A(i,j) and loads its value.
1103 calculates the address of B(j,k) and loads its value.
1104 calculates the address of C(i,k) and stores its value.
1111 controls the j-loop.
1112 controls the k-loop.
1113 controls the i-loop.
The actual operation on the data takes place in 1121.

Figure 12A:
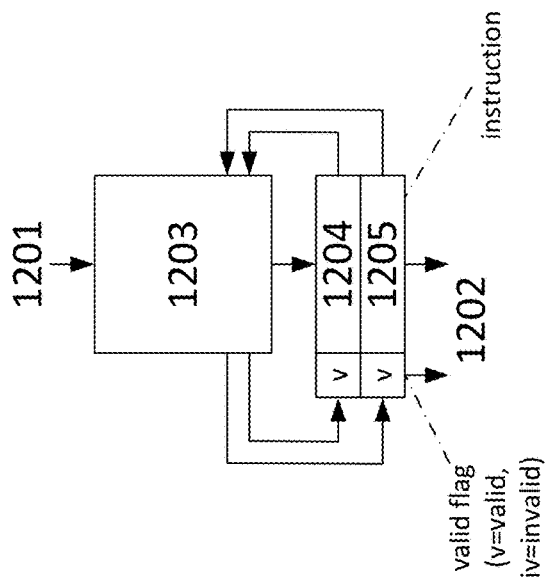
FIGS. 12A and 12B are diagrammatic illustrations of different example AOUs.

The Analyser and Optimizer Unit (AOU) is shown in FIG. 12A. Depending on the processor architecture, the unit might be placed in several locations, for example behind the instruction fetcher, connected to a trace cache, connected to a loop buffer, etc. Respectively the instructions might be supplied (1201) by the instruction fetcher, a trace cache, a loop buffer; and the optimized instructions might be sent to (1202) the instruction issue unit and/or a trace cache and/or a loop buffer, etc.

In the exemplary embodiment of FIG. 12A, the AOU operates on a window of 3 instructions which is sufficient to detect, analyse and optimize the instruction patterns in FIG. 13A and FIG. 13C. For FIG. 13B ultimately an enhanced implementation is preferred having a window of 3+1 instructions as will be described later on.

Of course other more complex instruction pattern may require larger instruction windows (e.g. 5, 10, or even more instructions) but the basic functionality remains the same.

The AOU comprises of a state machine and/or comparator, comparing instructions with a given pattern. FIG. 12A shows a comparator based embodiment.

The AOU operates as such: The AOU (1203) gets an $n^{th}$ instruction for evaluation. The $(n-1)^{th}$ instruction has already been evaluated and is store in a register (1204). Also a $(n-2)^{th}$ instruction has already been evaluated and is store in another register (1205). The registers 1204 and 1205 are organized as a FIFO, i.e. each input value received from 1203 gets at first into 1204 and then, after the data in 1205 has been sent out, moves to 1205. It is synchronized such that data can only be written to the 1204/1205 FIFO if the 1204 stage is empty and data is only sent out (to 1202) if valid data is present in 1205. Each of the registers 1204 and 1205 has an associated valid flag v indicating that the data in the register is valid.

The AOU at a specific clock cycle the AOU is capable of analysing a block of 3 instructions, namely the $n^{th}$ received from 1201, the $(n-1)^{th}$ stored in 1204 and the $(n-2)^{th}$ stored in 1205. If the AOU detects a specific pattern it generates a respective complex and specialized instruction and/or triggers a certain action such as, for example, switching into loop acceleration mode and/or initiates instructions issue to and/or activation of one or more specific unit(s), for example such as the loop control unit(s) or the load/store unit(s). Particularly the AOU may fuse a plurality of instructions into a single instruction or microoperation (microcode). For further details on micro-operations (microcode) reference is made to [15], [16] and [17].

Since a new instruction is generated based on a group (e.g. $(n-2)^{th}$ to $n^{th}$) of instructions, typically all or at least some of the instructions of that group become obsolete. Respectively 1203 can discard the $n^{th}$ instruction and replace it with the new one (e.g. the fused instruction generated on merging at least some of the analysed instructions). Each of the $(n-2)^{th}$ and $(n-1)^{th}$ instruction can be separately invalidated by setting the respective valid flag in register 1204 and/or register 1205 to invalid.

Consequently a new instruction is inserted into the instruction stream replacing all or at least some of the original instructions and sending it for example to at least one of the instruction issue unit and/or a trace cache and/or a loop buffer and/or the execution units and/or load/store unit(s) and/or loop control unit(s).

It shall be noted that the comparator in 1203 might have an associated state machine for performing sequential operations.

The registers 1204 and 1205 increase the latency of the processor front end. Therefore in an advance but preferred embodiment, pipeline stages of subsequent units downstream the instruction path might be used to feed-back information of the earlier instructions (i.e. the $(n-2)^{th}$ and $(n-1)^{th}$ instruction) to the AOU. Such an implementation reduces the latency. It shall be understood that FIG. 12A provides an example for an AOU unit. The AOU might be physically implemented exactly as described but the description could also be understood as logical, resulting in a variety of possible physical implementations. For example, as said, the registers 1204 and 1205 might be distributed in the processor (preferably the processor front end) and/or implemented as pipeline registers instead of a FIFO. Also, for example, in some embodiments the registers might not comprise a valid flag, but might simply be cleared and/or a no-operation instruction/token (NOP) might be inserted to invalidate their content instead of marking it invalid.

It shall also be noted that some examples of possible positions of the AOU are exemplary shown in [4] FIGS. 19A-19F (note that AOU is named AOS in [4]).

The valid flag is transmitted (1202) together with the instruction to subsequent logic. It can, for example, be used for control logic to discard the instruction and/or used as a selector input to a multiplexer for replacing the original (invalid) instruction with a no-operation (NOP) instruction.

FIG. 13A shows the analysis and optimization of a load or store instruction. The respective operation is performed for example on the code sections 1101, 1102, 1103 and 1104 of FIG. 11.

1301: First the multiplication instruction is received from 1201. In registers 1204 and 1205 are the preceding instructions $instr_{-1}$ and $instr_{-2}$.

1302: The addition instruction is received from 1201. Register 1204 contains the multiplication instruction, register 1205 the preceding instruction $instr_{-1}$.

1303: The load (or in case of 1104 store) instruction is received from 1201. Register 1204 contains the addition instruction, register 1205 the multiplication instruction. The AOU is now able to capture the address generation pattern for the load (or store) instruction. One address input of the load (or store) instruction is computed by the multiplication and addition instructions preceding the load (or store) instruction which can be determined by AOU based on register analysis. For example in 1101 register r3 is computed by the multiplication and addition and then provided to the load instruction (ldr) as an address input (for details of the ldr instruction reference is made to [14]). The same is the case for 1102, where r4 is computed and used as an address input for the load instruction; for 1103, where r5 is computed and used as an address input for the load instruction; and for 1104, where r4 is computed and used as an address input for the store (str) instruction (for details of the str instruction reference is made to [14]). In response to the detection of the address computation pattern the AOU generates a fused load (or store) instruction embedding the address calculation, performed by the multiplication and addition instruction, into the single fused instruction (fused-ldr (fldr) in case of load (ldr); fused-str (fstr) in case of store (str)). The respective instruction is inserted into the instruction stream, replacing the load (or store) instruction. Since both, the addition instruction and multiplication instructions, are obsolete now they are marked invalid (iv) in the registers 1204 and 1205 and are not further processed (e.g. written into a buffer, trace cache, issued to execution units, etc).

1304: The next instruction ($instr_{+1}$) is analysed by the AOU. The fused load (or fused store) instruction is in 1204 and marked valid. The invalid addition is in 1205. The invalid multiplication has left register 1205 and has been discarded.

1305: Instruction $instr_{+2}$ is analysed by the AOU. Instruction $instr_{+1}$ is located in 1204 now. The fused load (or fused store) instruction is in 1205 and marked valid. The invalid addition has left register 1205 and has been discarded.

1306: The fused and valid load (or store) instruction has been released for further processing (e.g. by at least one of the instruction issue unit and/or a trace cache and/or a loop buffer and/or the execution units and/or load/store unit(s) and/or loop control unit(s).

The fused load and store instructions are shown in FIG. 14A. 1401 is generated based on the pattern 1101 and replaced the respective instructions. Respectively 1402 replaces 1102, 1403 replaces 1103 and 1404 replaces 1104.

Advanced load/store units are required for processing the respective instructions. The load/store units are described later on in detail.

FIG. 13C shows the analysis and optimization of a while-loop construct as e.g. used in FIG. 9B. The construct is translated into 3 instructions, SUBS, BEQ and B (0941, 0942). In this case the detection does not start with the first instruction to be processed (i.e. SUBS). To the contrary, when SUBS first arrives in the instruction stream no respective while construct pattern is detected by the analyser and the instruction is not optimized.

Actually the pattern to be detected and optimized starts with the jump back to the start of the loop, i.e. the jump (B, 0942) instruction. The pattern detection is described in FIG. 13C:

1321: First the jump instruction is received from 1201. In registers 1204 and 1205 are the preceding instructions $instr_{-1}$ and $instr_{-2}$.

1322: The substract instruction is received from 1201. Register 1204 contains the multiplication instruction, register 1205 the preceding instruction $instr_{-1}$.

1323: The conditional branch instruction is received from 1201. Register 1204 contains the subtraction instruction, register 1205 the jump instruction. The AOU is now able to capture the while-loop construct pattern: The unconditional jump to a test function (the subtraction instruction) and the following conditional jump to an address just behind the unconditional jump. The unconditional jumps can additionally be identified by jumping backwards in the instruction sequence to an already executed instruction. Preferably, in addition to merely analysing the instructions for the pattern, the addresses are analysed to detect the conditional jump to the loop exit (see exit label in FIG. 9B) located just behind the unconditional branch to the test function. A respectively fused while instruction is inserted into the instruction stream, replacing the subtract instruction. Since both, the conditional jump and unconditional jump instructions, are obsolete now they are marked invalid (iv) in the registers 1204 and 1205 and are not further processed (e.g. written into a buffer, trace cache, issued to execution units, etc).

- 1324: The next instruction ($instr_{+1}$) is analysed by the AOU. The fused while instruction is in 1204 and marked valid. The invalid subtraction is in 1205. The invalid unconditional jump has left register 1205 and has been discarded.
- 1325: Instruction $instr_{+2}$ is analysed by the AOU. Instruction $instr_{+1}$ is located in 1204 now. The fused while instruction is in 1205 and marked valid. The invalid subtraction has left register 1205 and has been discarded.
- 1326: The fused and valid while instruction has been released for further processing (e.g. by at least one of the instruction issue unit and/or a trace cache and/or a loop buffer and/or the execution units and/or load/store unit(s) and/or loop control unit(s).

In a preferred embodiment, the generated while instruction will not be issued to the execution units (e.g. of the ALU-Block) but to a separated and dedicated loop control unit (e.g. 1003), managing the control sequence of the loop iterations.

FIG. 13B shows the analysis and optimization of a for-loop construct as e.g. used in FIG. 11. The construct is translated into 3 instructions, ADD, CMP and BNE (see e.g. 1111, 1112, 1113). The pattern detection is described in FIG. 13B:

- 1311: First the addition instruction is received from 1201. In registers 1204 and 1205 are the preceding instructions $instr_{-1}$ and $instr_{-2}$.
- 1312: The compare instruction is received from 1201. Register 1204 contains the addition instruction, register 1205 the preceding instruction $instr_{-1}$.
- 1313: The conditional branch instruction is received from 1201. Register 1204 contains the compare instruction, register 1205 the addition instruction. The AOU is now able to capture the for-loop construct pattern: Incrementing the loop counter by the addition instruction, testing the loop counter by the compare instruction and conditionally jumping to the begin of the loop body, which can additionally be identified by jumping backwards in the instruction sequence to an already executed instruction. A respectively fused for instruction is inserted into the instruction stream, replacing the conditional jump instruction. Since both, the compare and addition instructions, are obsolete now they are marked invalid (iv) in the registers 1204 and 1205 and are not further processed (e.g. written into a buffer, trace cache, issued to execution units, etc). Obvious for one skilled in the art, depending on the loop-construct, instead of an addition instruction incrementing the loop counter, a subtraction instruction could be used decrementing the loop counter. Naturally an implementation of the AOU would recognize and optimize both variants.
- 1314: The next instruction ($instr_{+1}$) is analysed by the AOU. The fused for instruction is in 1204 and marked valid. The invalid compare is in 1205. The invalid addition has left register 1205 and has been discarded.
- 1315: Instruction $instr_{+2}$ is analysed by the AOU. Instruction $instr_{+1}$ is located in 1204 now. The fused for instruction is in 1205 and marked valid. The invalid compare has left register 1205 and has been discarded.
- 1316: The fused and valid for instruction has been released for further processing (e.g. by at least one of the instruction issue unit and/or a trace cache and/or a loop buffer and/or the execution units and/or load/store unit(s) and/or loop control unit(s).

It shall be mentioned that FIG. 13A, FIG. 13B, and FIG. 13C (and also the later described FIGS. 13D and 13E) ignore the latency of the jump instructions. Naturally there is additional latency caused by these instructions. Yet, including the latency in the description would only complicate the depiction of the sequence without adding or changing matter and thus is purposely ignored.

In a preferred embodiment, the generated for instruction will not be issued to the execution units (e.g. of the ALU-Block) but to a separated and dedicated loop control unit (such as e.g. 1003), managing the control sequence of the loop iterations.

The fused for instructions are shown in FIG. 14A. 1411 is generated based on the pattern 1111 and replaced the respective instructions. Respectively 1412 replaces 1112 and 1413 replaces 1113.

As already described in [4], the loop analysis detects and optimizes loops at the end of the first loop iteration. To the effect that the first loop iteration is conventionally processed and the loop optimization starts with the second iteration. FIG. 14A shows this. While the load and/or store instructions are immediately fused and optimized, the loop body is executed conventionally during the first iteration. The loop is detected at the end of the loop body, as shown in FIG. 13B and FIG. 13C. Consequently and in difference to prior art, the loop instruction is placed at the end of the loop, not its beginning. Thus the mnemonic endfor (1411, 1412, 1413) has been chosen for the for-instruction generated by the AOU (e.g. in FIG. 13B). It is positioned at the end of the loop body and points forward to its entry (via the j_loop, k_loop and respectively i_loop address).

Processors implementing an extension to the instruction set for advanced loop processing, such as e.g. a for- or while-instruction, are, of course, capable of placing these instructions at the start of the loop body, so that even the first loop iteration can be performed in an optimized, accelerated manner. The respective code is shown in FIG. 14C based on an exemplary embodiment of instructions for a for-endfor-construction in assembly language. Obvious for one skilled in the art other embodiments could be chosen, for example could the for-instruction contain the number of instructions in the for loop and by such eliminates the need for the endfor-instruction, shortening the size of the binary and increasing the performance by eliminating the instruction fetch, decode, etc. for the endfor-instruction.

The parameters of the for-instruction equal those of the endfor-instruction of FIG. 14B and are there described in detail.

It shall also be mentioned, that the method described in FIG. 12A eliminates the rather complex requirement for backtracking still required in [4].

FIG. 14A shows the optimized code produced by the AOU. It shall be noted that the code is represented as assembly instructions. Depending on the processor architecture and/or the position of the AOU inside the processor the produced optimized code might be in microoperation (microcode) form. The fused load (or store) instructions (1401, 1402, 1403, 1404) comprise the same parameters as the original load (or store) instructions. In addition the address calculation is completely integrated into the instruction (e.g. 1401: (r10*r0)+r1)). This allows for more complex load/store units which take the burden of address calculation form the execution units (e.g. the ALU-Block). Further the address calculation integrated into the load/store units might be more time (in terms of clock cycles and latency) and energy efficient than the conventional calculation on the execution units. Although, as will be described later on, it might allow for advanced pipelining, drastically reducing the clock cycles required for processing a task (e.g. the hailstone sequence or matrix multiplication).

The loop control instructions endfor (1411, 1412, 1413) comprise the complete loop control parameters. First the loop index register. Second the incrementer/decrementer, i.e. in the exemplary matrix multiplication+1 for all loops which causes an increment of the loop index by the integer value 1 for each iteration. Third the loop limit at which the loop terminates. And fourth the address to the loop entry. If a loop terminates, the jump back to the loop entry is omitted and processing continues directly behind the respective endfor instruction.

It shall be expressively noted that only examples for loop constructs where provided in the description. One of ordinary skill in the art understands that there are a number of different loop constructs (for example: for, while, unit; further various ways to treat the index (e.g. increment, decrement or data driven); further various checks for the termination criterion). Not all potential loops can be described here. The examples provide the basic understanding of how the code is analyzed, loops are detected and optimized. Naturally an implementation of the invention would cover a wider range of patterns than the ones described.

Nested Loops

If only the inner loop of an algorithm shall be optimized, the given apparatus and method performs well. It is clear that j_loop in FIG. 14A is mappable to execution units and to a loop control unit. If only the inner loop is optimized the AOU comprises a state machine and/or register to record the detection of an inner loop. Afterwards the optimization is disabled until the inner loop has been terminated. Consequently i_loop and k_loop would not be optimized but executed in the original code, i.e. for example 1112 and 1113 would remain non-optimized and not be fused.

However, clearly the algorithm would perform better if all loops are optimized. In that case, the initiation of the loop index (i.e. the loop counter) has to be removed from the code and optimized in a way that the loop control unit (e.g. 1003) set the initial index (loop counter) value. Accordingly it must become part of the fused loop instruction.

In one advanced embodiment the AOU is enhanced such that the loop initialization is included in the optimization. In an exemplary embodiment it is required, that the loop initialization is positioned directly in front of the loop, i.e. the address the backward jump jumps to. It shall be mentioned that the code in FIG. 9B has been accordingly arranged to demonstrate this requirement, compare 0951 and 0952 of FIG. 9A. This can be for example achieved by reading the instruction directly in front the jump (i.e. bne in FIG. 13B and B in FIG. 13C) in the instruction sequence). But this read cycle would complicate the processor's control logic and disturb the instruction fetch path and its control.

Figure 12B:
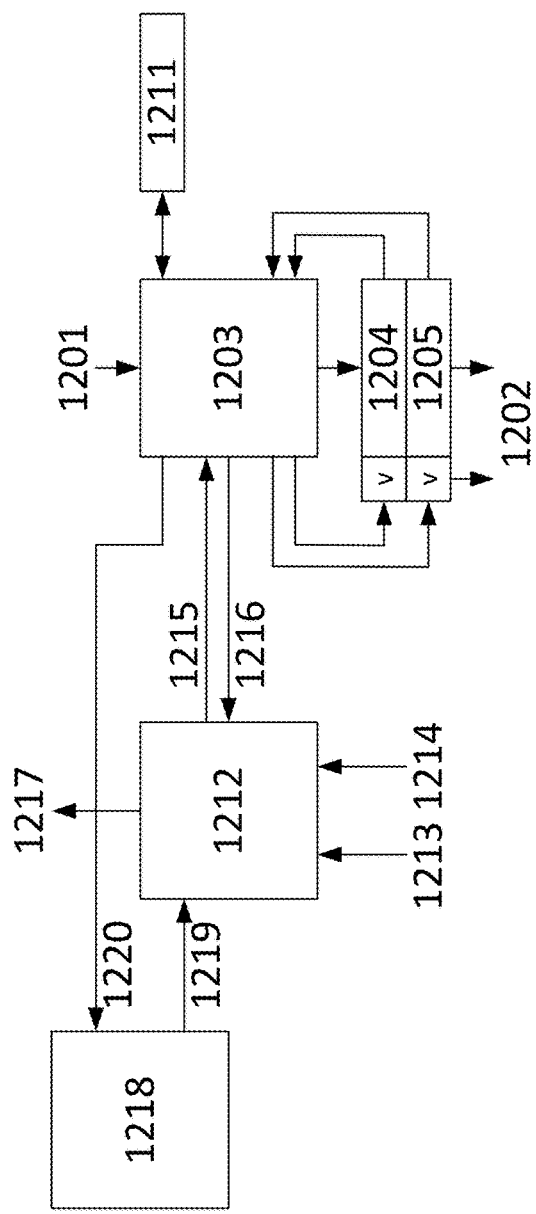

Another, preferred, exemplary embodiment is shown in FIG. 12B. Here a unit (1212) executing the jump instruction, jumps one instruction further back in the instruction sequence (it jumps instead to address addr to address addr−1) than the original backward jump would require, exactly to the loop index (counter) initialization instruction. The address to be jumped to is transmitted (1217) to the instruction fetch unit of the processor. Of course, this instruction must not be executed again, thus it is marked invalid and/or immediately written into a separate register (1211) by the AOU.

Naturally jumping for each backward jump further back than required would add a significant amount of unnecessary execution cycles and waste energy. Thus various checks might be performed by the unit 1212 to test the feasibility of a loop. For example:

1. The difference between the program counter PP (1213) at the position of the jump instruction and the address of the jump target (1214, addr) is calculated. Only if the target is in a range close enough for an optimizable loop, the possibility of a loop is taken into account and the jump to addr−1 is performed. For example if the jump target is 10.000 instructions behind (less then) the current PP, it is unlikely an inner loop, and—unless the loop will be partitioned by an enhanced analyser/optimizer (AOU) unit—the number of execution units is likely insufficient to map this loop body. The AOU is respectively informed of a backward jump in a reasonable range by a signal 1215, so that the instruction at addr−1 is removed from the instruction stream and instead written into the register 1211.
2. The AOU sends a signal 1216 to the unit performing the jump (1212) to inform that a loop is possible. If, for example, the AOU did not detect the ADD, CMP sequence of FIG. 13B, a conditional jump instruction is not the described while-construct.
3. Another source for evaluating the feasibility of a loop is the branch prediction unit. For example if the currently to be performed jump has already an entry in any of the branch prediction list or memories, its function is known. For example, in a preferred embodiment, backward jumps forming a loop will not be recorded by the branch prediction unit. This would be pointless since the jump is anyhow optimized and removed. Consequently a jump having an entry in the branch prediction unit is not related to a loop. Either i) the branch unit (1212) informs the AOU (1203) accordingly, if the backward jump has an entry in the branch prediction unit and cannot be optimized, via signal 1215; or ii) the branch prediction unit informs the AOU (1203) directly of the non-fitting backward jump.

FIG. 12B shows the variant in which the branch prediction unit (1218) sends information (1219) regarding the type (and/or existing entry) of the currently to be executed backward jump to the branch unit (1212). On the other hand, the AOU (1203) informs, via signal (1220), the branch prediction unit of the detection of a loop, so that the branch prediction unit does not record the respective jump.

While the analysis and optimization of load and store instructions does not differ between FIG. 12A and FIG. 12B (i.e. the sequence of FIG. 13A remains the same), the sequence of the exemplary for (FIG. 13B) and while (FIG. 13C) loops change.

The respectively modified sequence of the exemplary for-loop is shown in FIG. 13D, the one of the exemplary while-loop in FIG. 13E. Only the time-frame t to t+3 is shown, the following clock cycles, with one clock cycle offset, are obviously based on the description of FIG. 13B and FIG. 13C and further explanation would be repetitive. In addition to FIG. 13B and FIG. 13C register 1211 is shown in FIG. 13D and FIG. 13E.

For detecting a for-construct the first three clock cycles (t to t+2) in FIG. 13D do not differ from FIG. 13B. Thus reference is made to 1311, 1312, and 1313. In clock cycle t+3 (1334) the mov instruction setting up the loop index (counter) at address jump_addr−1 is received and stored in register 1211. All information necessary to fuse the fused for-instruction (or microcode) is available and the instruction is emitted (1201) by the AOU (1203).

At time t+4 (1335) the fused for instruction (or microcode) generated by the AOU is entered into register 1304, the AOU receives the instruction the original jump address is pointing at ($instr_{+1}$). The sequence continues, with one clock cycle delay, as described in FIG. 13B.

For detecting a while-construct (see FIG. 13E) only the first clock cycle t remains identical and reference is made to 1321 of FIG. 13C. In clock cycle t+1 (1342) the mov instruction setting up the loop index (counter) at address jump_addr−1 is received and stored in register 1211. The AOU emits an invalidated and/or no-operation instruction to the instruction pipeline (of which registers 1204 and 1205 are part of). The instruction $instr_{-1}$ can be issued to the later stages of the instruction path, but the pipeline of registers 1204 and 1205 is, in a preferred embodiment, not clocked, so that the invalid and/or no-operation instruction is not entered into the registers.

After issuing the instruction $instr_{-1}$ is marked invalid to avoid erroneous double issuing, see 1343. In this clock cycle the subtract instruction is received and emitted by the AOU. In the next clock cycle (t+3) (1344) the conditional branch instruction is received and the while-loop is detected. The AOU is capable of issuing a fused while instruction (or microcode), including the loop index (counter) initialization according to the parameters of the move instruction stored in 1344. The instructions in registers 1304 and 1305 are marked invalid.

At time t+4 (1345) the fused while instruction (or microcode) generated by the AOU is entered into register 1304, the AOU receives the instruction the original jump address is pointing at ($instr_{+1}$). The sequence continues, with one clock cycle delay, as described in FIG. 13C.

FIG. 14B shows the instructions (and/or microcode) generated by the AOU according to FIG. 12B. The fused load and store instructions (1401, 1402, 1403 and 1404) are exactly the same as in FIG. 14A. The fused endfor instructions (1421, 1422, and 1423) comprise now the loop initialization value for the loop index (i.e. loop counter) according to the respective move instruction which have been removed and replaced by no-operation (nop) and/or a not to be issued instruction (1431, 1432, and 1433). In all three cases the initialization value is 0.

Integration into State of the Art Processors

The matrix multiplication example shows that the inventive loop acceleration technology is not only applicable on ZZYC processors having an ALU-Block, but is also highly beneficial for all kind of processors, such as RISC and/or CISC and/or VLIW and/or out-of-order and/or in-order and/or superscalar.

FIG. 14B and FIG. 14C show that for the execution path only the multiplication and addition (1431) remains. These can be merged into a single multiply-addition-instruction commonly available by most processor Instruction Set Architectures (e.g. MLA for ARM). All instruction can operate concurrently in parallel. Thus one result is produced in each clock cycle, enabling a speed up of at least an order of magnitude compared to conventional processing as e.g. the code in FIG. 11.

Figure 15:
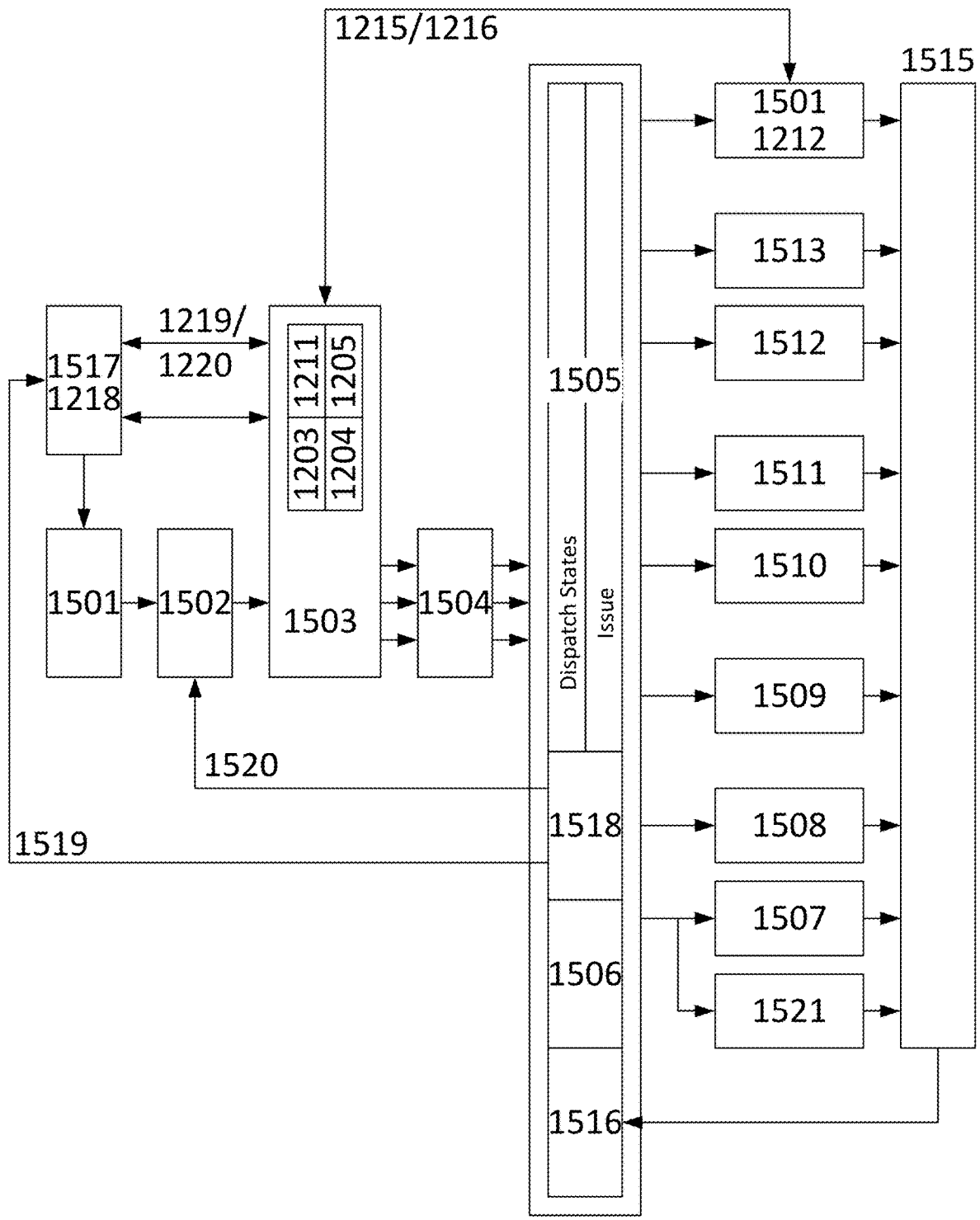
FIG. 15 is a diagrammatic illustration of an example integration of described features into a standard processor.

As an example, FIG. 15 shows an exemplary integration of the inventive method and apparatus into a standard processor based on an ARM Cortex A57 core. It shall be explicitly mentioned that FIG. 15 is an example of a possible embodiment and, obvious for one skilled in the art, different design choices can be made to integrate the inventive concepts into a processor core such as the exemplary shown ARM Cortex A57.

Instructions are received from the level-1 instruction cache (1501) under control of the Instruction Fetch Unit (IF) (1502). The IF supplies the instructions to the Instruction Decode unit (ID) (1503). The decoded instructions (Cortex A57 has a 3-way decoder and is thus capable of supplying up to 3 instructions in parallel) go to the Register Rename unit (RR) translating the virtual to physical registers. From there the instructions having renamed register references go to the Instruction Dispatch and Issue stage (IDI). Associated with IDI is the Register File (RF) (1506) for supplying the operand data once it becomes available; according to its availability the instructions are scheduled.

a) Up to 8 instructions (micro-operations) are issued to:
b) 2 Load/Store Units (LSU) (1507 and 1508);
c) 1 Multiply/Multiply-Add/Multiply-Accumulate and Divide Cluster (1509);
d) 2 so called Complex Clusters including ARM's Neon and floating point units (1510 and 1511);
e) 2 so called Simple Clusters comprising Arithmetic Logic Units (ALUs) including shifters and some SIMD arithmetic (1512 and 1513); and
f) 1 Branch unit (1514) managing jump instructions.

In this patent the units b) to f) are referred to as "Execution Units" and the units a) as "Load/Store Units". The Branch Unit f) is frequently separately referred as Branch Unit (e.g. 1212 in FIG. 12B).

Data produced by the above listed units a) to f) are transmitted out-of-order to the WriteBack Stage (WBS) (1515) supporting up to 128 instructions (micro-operations) in flight and comprising the Retirement Buffer (RB). From there data is transmitted in-order to the Commit Unit (1516) which provides data to the Register File (RF) and retirement information to the Register Rename unit (RR).

The program pointer (PP) is managed by the Branch Prediction Unit (BP) (1517), e.g. according to control instructions (such as jump, call, return) and data calculated by the Branch Unit (1514). The instruction address is transmitted from the Branch Prediction Unit (1517) to the Level-1 Instruction Cache (1501).

It is not in the scope of this patent to discuss the exemplary Cortex architecture in detail. For an introduction to out-of-order processing reference is made to [20] which is herewith incorporated by reference in its entirety. For an introduction to branch prediction reference is made to [18] and [19] which are herewith incorporated by reference in their entirety.

To implement the inventive approach the exemplary Cortex processor architecture is not enhanced as such:

The AOU according to FIG. 12B is integrated into the Instruction Decode (ID) unit (1503) as indicated by the references 1203, 1204, 1205 and 1211. The AOU exchanges information according to FIG. 12B (1215, 1216) with the Branch Unit 1514, which is enhanced with the features of the Branch Unit 1212 described in FIG. 12B. Further the AOU exchanges information according to FIG. 12B (1219, 1220) with the Branch Prediction Unit 1517, which is enhanced with the features of the Branch Prediction Unit 1218 described in FIG. 12B.

The Loop Control Unit (1518) (as e.g. described as 1003 in FIG. 10 and further in FIG. 16, FIG. 17 and FIG. 18) is associated with the Register File. Basically it could be implemented in parallel to the Execution Units, but since it supplies the index register values to the Execution Units and thereby substitutes the Register File functionality, it is preferably associated with the Register File and accordingly located.

Further the Loop Control Units controls (1519) the movement of the Program Pointer (PP). For example during loop execution PP remains static since no instruction issue is required. During that time PP points to the start of the loop. After loop termination PP is set right behind the end of the loop to fetch the following instruction and continue execution. Similarly the Loop Control Unit controls (1520) the Instruction Fetch Unit, e.g. be stopping further instruction fetching during loop execution.

It shall be noted that both, the Program Pointer (PP) and Instruction Fetch Unit (IF) are not exclusively controlled be the Loop Control Unit (1518). Naturally both are mainly controlled by the processor control structure and in addition by the Loop Control Unit which interacts with the processor control structure.

To provide decent data load and store capability an additional Load/Store Unit (1521) is implemented, so that at least two load and one store operations can be performed in parallel. The additional Load/Store Unit might exclusively operate as stream Load/Store Unit in a DMA like manner (as e.g. described in [1] and [4] and further in FIG. 19). Thus it is not necessary to issue instructions on a regular basis. In order to save issue slots and apply only the minimal set of modifications to the exemplary Cortex architecture, the additional Load/Store Unit (1521) thus shares an issue slot with the Load/Store Unit (1507).

Figure 19:
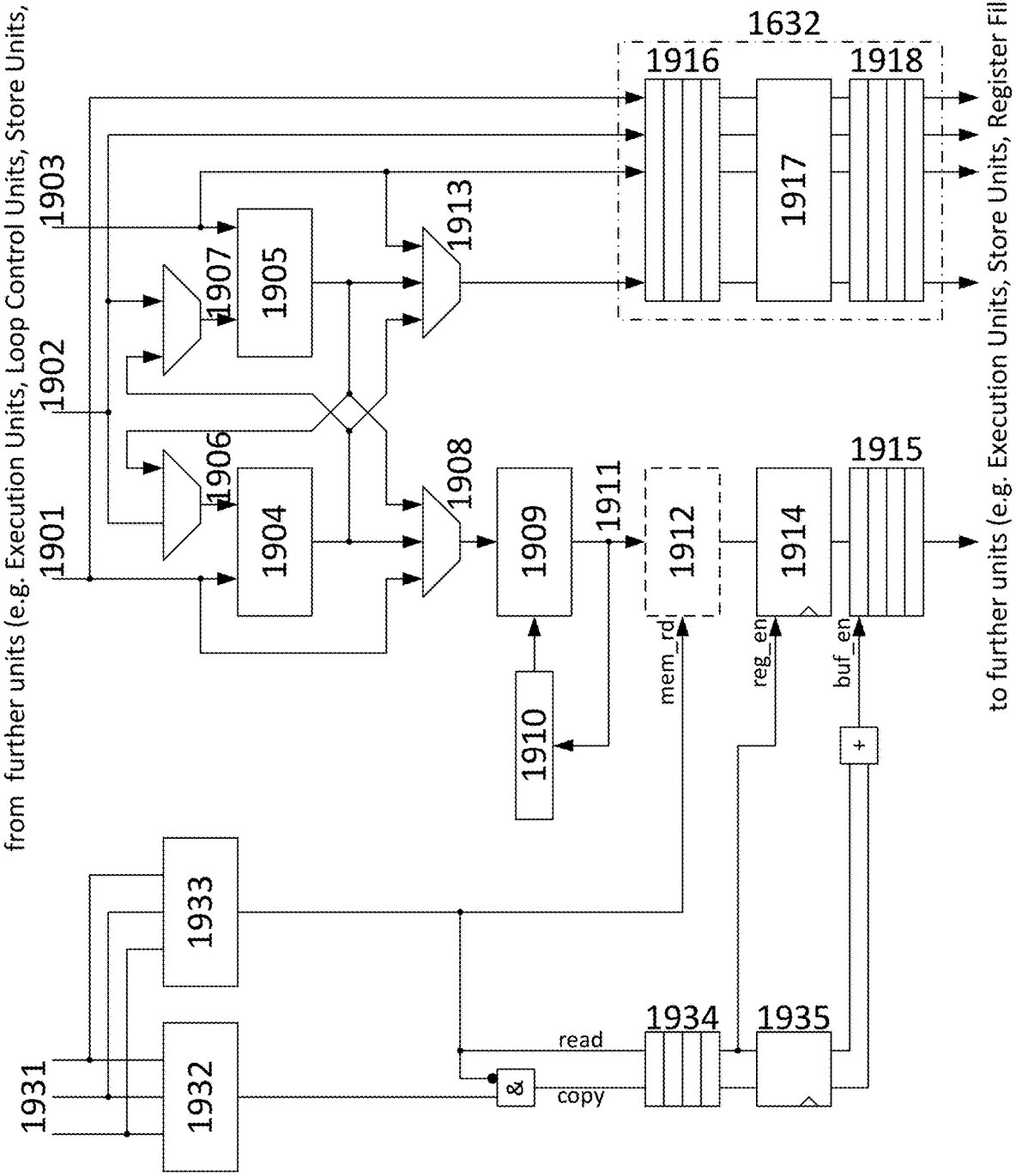
FIG. 19 is a diagrammatic illustration of an example load/store unit.

Both Load/Store Units 1507 and 1508 are enhanced with DNA-like stream capabilities as e.g. described in [1] and [4] and further in FIG. 19.

Advanced Loop Control

The following description is based on the optimized code of FIG. 14B. Yet, it is expressively mentioned that everything described also matches the code of FIG. 14C which is based on specific instructions (i.e. for example fldr, fstr, for, endfor) added to a standard processors (e.g. Intel, AMD, ARM, IBM) instruction set.

Referring to FIG. 14B: In theory the load instructions 1402 and 1403 could operate in parallel, given the level-1 memory architecture permits such accesses. Both, the multiplication and addition 1431 could be executed as a single instruction, which even could operate pipelined. The for-/endfor-instructions (1421, 1422, 1423) operate in parallel to 1431. The store-instruction (1404) finally stores the result.

The execution sequence is illustrated in FIG. 16A. Data is requested from level-1 memory (1601). After a significant latency of 1 clock cycles data arrives at the execution units and is processed (1602). A clock cycle later the result is written to level-1 memory (1603). After 1+3 clock cycles, the loop is repeated which, in turn, means that only each $(1+3)^{th}$ cycle a result is produced.

The negative effect of latency can be minimized if the loop is broken into two loops:
1) A first loop loading data from memory, and
2) a second loop processing the data and writing the results back to memory.

This is possible by duplicating loop control such that loading data from memory is controlled by a first independent loop control (1611) and processing data is controlled by a second independent loop control (1612). Both loop controls operate exactly the same (i.e. produce the same sequence of indexes) but with a time offset. The first loop control 1611 provides constantly new indexes to the load units, whenever they are ready to accept a new read address (which is typically in each single clock cycle). Thus the loop iterates each $1^{st}$ clock cycle. Consequently, after a single delay of 1 clock cycles at start-up, the load units provide a constant stream (1613) of data packets: one packet, comprising the register r4 (matrix A) and register r5 (matrix B) content, in each clock cycle.

The second loop control starts iterating once the first data packet has arrived, i.e. after (1+2) clock cycles. Theoretically the multiplication and addition (1431) could process a data packet per clock cycle and produce a result per clock cycle. Yet, in the structure of FIG. 16B, the store-instruction is part of the loop which requires an additional clock cycle. Thus the second loop control can iterate only each $2^{nd}$ clock cycle. As a consequence, only each $2^{nd}$ clock cycle data packets from the stream 1613 are accepted and consumed by the multiply-addition instruction (1602). Since, according to the ZZYX model all data transfers are synchronized with control, this will backfire to the first loop control and force it to iterate only each $2^{nd}$ clock cycle. Anyway, the performance increased from one calculation per (1+3) clock cycles to one calculation in each $2^{nd}$ clock cycle after a single initial latency of (1+2) clock cycles.

Figure 16C:
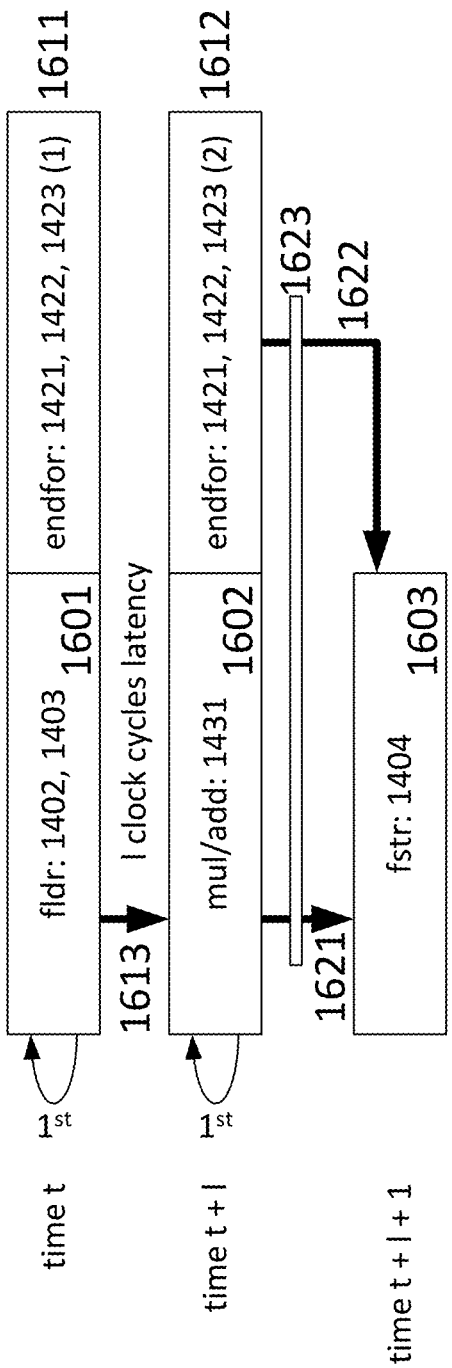

FIG. 16C shows how the performance can be further optimized to one calculation per clock cycle after a single initial latency of (1+2) clock cycles:

There is no loop carried dependency between 1603 and 1602, i.e. no result data is sent back from 1603 to 1602. Thus 1603 can be taken out of the loop and simple the result data (1621) from 1602 and indexes (1622) from the Loop Control Unit (1612) are streamed to the store instruction (1603). Depending on the architecture, the interconnect system and the routing one or more pipeline stages (1623) might be present in hardware for transmitting the data stream.

Figure 16D:
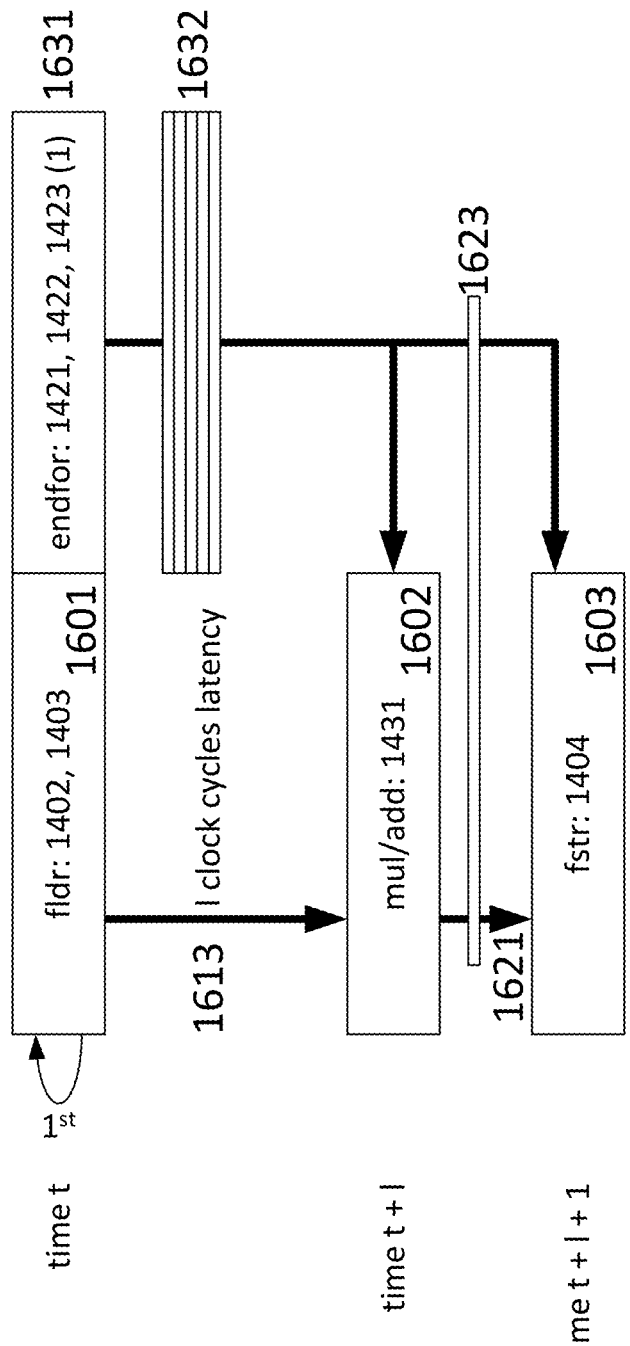

This leads to another implementation shown in FIG. 16D. Here the Loop Control is not duplicated, only a single one (1631) is used, connected to the data load section (1601). Instead of duplication loop control the indexes are streamed through a FIFO memory (1632) to balance the latency of the data load from memory path. To the effect that the indexes and loaded data arrive in sync at the data processing (i.e. in this example multiplication and addition) section (1602).

The FIGS. 16A to 16D show that it is beneficial to split the loading of data from memory and data processing in two independent operations to avoid the effects of memory latency. Whether this is achieved by duplicating loop control and providing respective support (e.g. additional loop control units) or providing FIFO units for streaming the indexes remains a processor architecture and design choice. Storing data to memory can typically be removed from the loop since no backward path into the loop (i.e. a loop carried dependency) usually exists (unless maybe to a data load from memory). Result data is thus just pipelined from the execution section to the data store section.

Figure 17A:
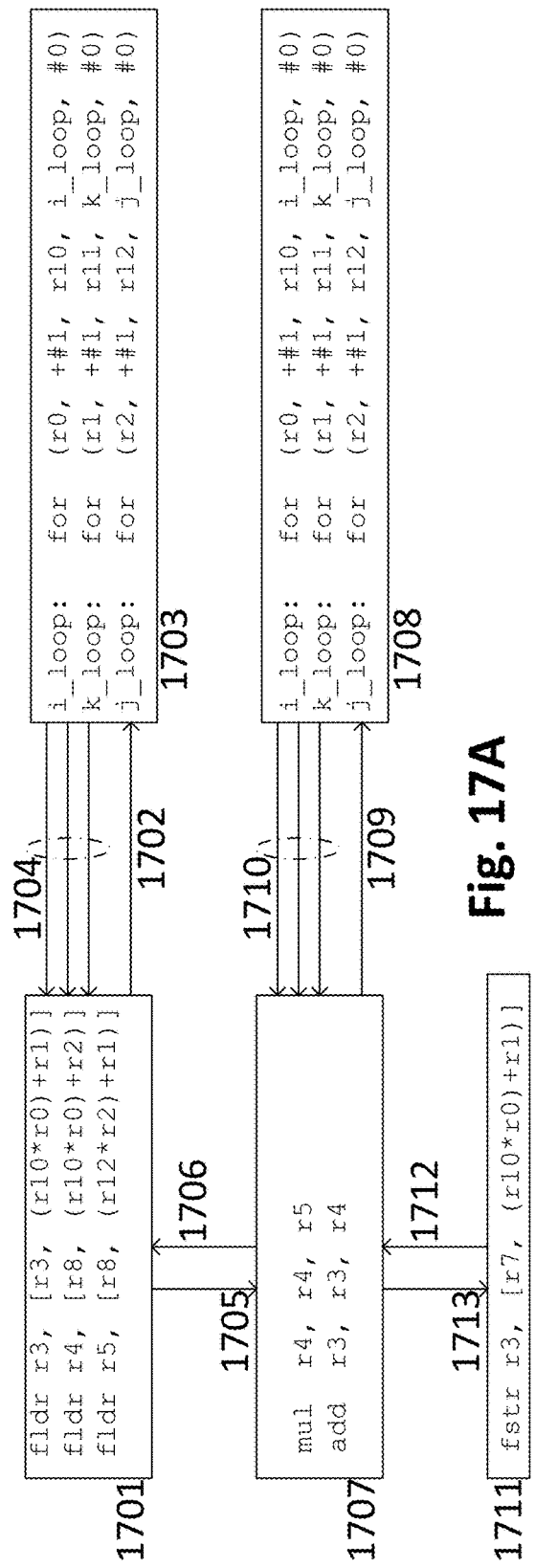
FIGS. 17A and 17B are diagrammatic illustrations of synchronization models for FIGS. 16C and 16D based on the exemplary code of FIG. 14C.
Figure 17B:
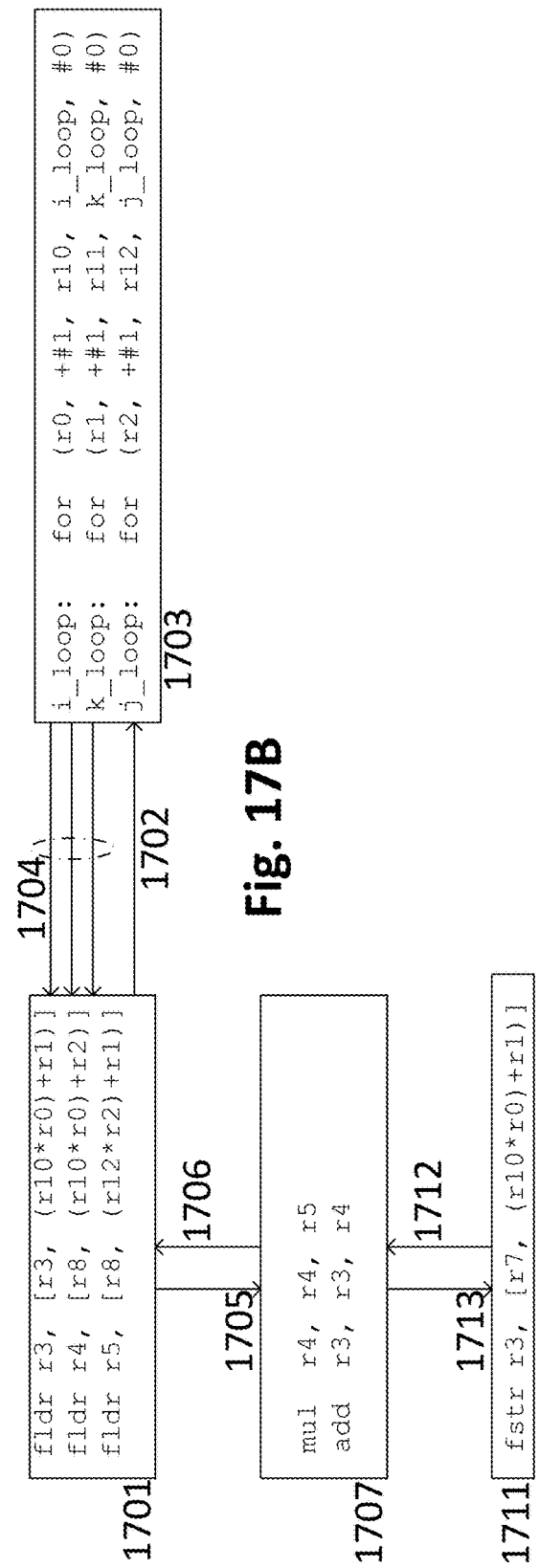

FIG. 17A and FIG. 17B show the synchronization models for FIG. 16C and FIG. 16D based on the exemplary code of FIG. 14C.

In each clock cycle in which all load units (1701) are ready (ready signal 1702) to load new data the first loop control (1703) steps. Which loop counters step is defined by the nesting of the loop and the limits of each loop. If an index changes, a trigger signal is sent. There are three trigger signals (1704) in this example, one for each index (i_loop=r0, k_loop=r1, j_loop=r2). Unchanged indexes are available like register values from a register file. Only those load units start a new load request to memory which receive at least one changed index (e.g. signalled by said trigger signal).

The load units (1701) release for each clock cycle in which at least one trigger from loop control (1703) was received their data to the execution units (1707). If no trigger (1704) is received, no data packet is sent. Load units which receive no trigger, send their last loaded data. If a load cannot provide data since a new load cycle is in pending and the data to be loaded has not been received yet from memory, no data packet can be released, i.e. none of the load units will send data and no trigger signal (1705) is released. Sending data to the execution units is delayed until reception of said data. If data is sent to the execution units a trigger signal (1705) is sent from the load units to the execution units. In turn, the execution units send a ready signal (1706) to the load units whenever they are able to receive and process new data.

In each clock cycle in which the execution units are ready (ready signal 1709) to process new data the second loop control (1708) steps. Which loop counters step is defined by the nesting of the loop and the limits of each loop. If an index changes, a trigger signal is sent. There are three trigger signals (1710) in this example, one for each index (i_loop=r0, k_loop=r1, j_loop=r2). Unchanged indexes are available like register values from a register file.

Whenever the store unit(s) (1711) are ready to store data they send a ready signal (1712) to the execution units (1707). The execution units send a trigger signal 1713 to the store units whenever new result data is produced.

|  | Ready | Process |
|---|---|---|
| Execution Units (1707) | Store is ready | (Store unit (1711) is ready (1712)) & (Loop control (1708) triggers (1709)) & (Load unit (1701) triggers (1705)) |
| Load Unit (1701) | All data available (note: there might be pending loads in the memory pipeline and/or a load data buffer holding already loaded data) | (Loop control (1703) triggers (1704)) & (Memory pipeline and data buffer is not full) |
| First loop control (1703) | Always | Load unit (1701) is ready (1702) |
| Second loop control (1708) | Always | Execution unit (1707) is ready (1709) |
| Store unit(s) (1711) | Data can be written to memory (data store pipeline can accept new data) | Execution unit (1707) triggers (1713) |

Summarizing FIG. 17A: Two loop control units are set up, a first one synchronized with the load units and a second one synchronized with the execution units. The load and execution units are synchronized in between. The store unit is synchronized with the execution unit.

In case an interrupt occurs, the content of the loop control unit handling the processed data, i.e. the second loop control unit (1216) has to be stored before entering the ISR. Returning from ISR both, the first and second loop control unit can be set up with the stored values. The RPT has to be managed accordingly, so that it points for the index registers to the second loop control.

FIG. 17B operates accordingly no additional synchronization is required, the synchronization between the execution unit (1707) and the load unit (1701) is sufficient.

Summarizing FIG. 17B: One loop control unit is set up, synchronized with the execution units. The load and execution units are synchronized in between. The store unit is synchronized with the execution unit. The execution unit receives the indexes through a FIFO stage, possibly located within the load units (as will be described later on in FIG. 19). In case an interrupt occurs, the content derived from the current FIFO stage output has to be stored before entering the ISR. Returning from ISR the loop control unit can be set up with the stored values. The RPT has to be managed accordingly, so that it points for the index registers to the output of the FIFO.

Figure 18:
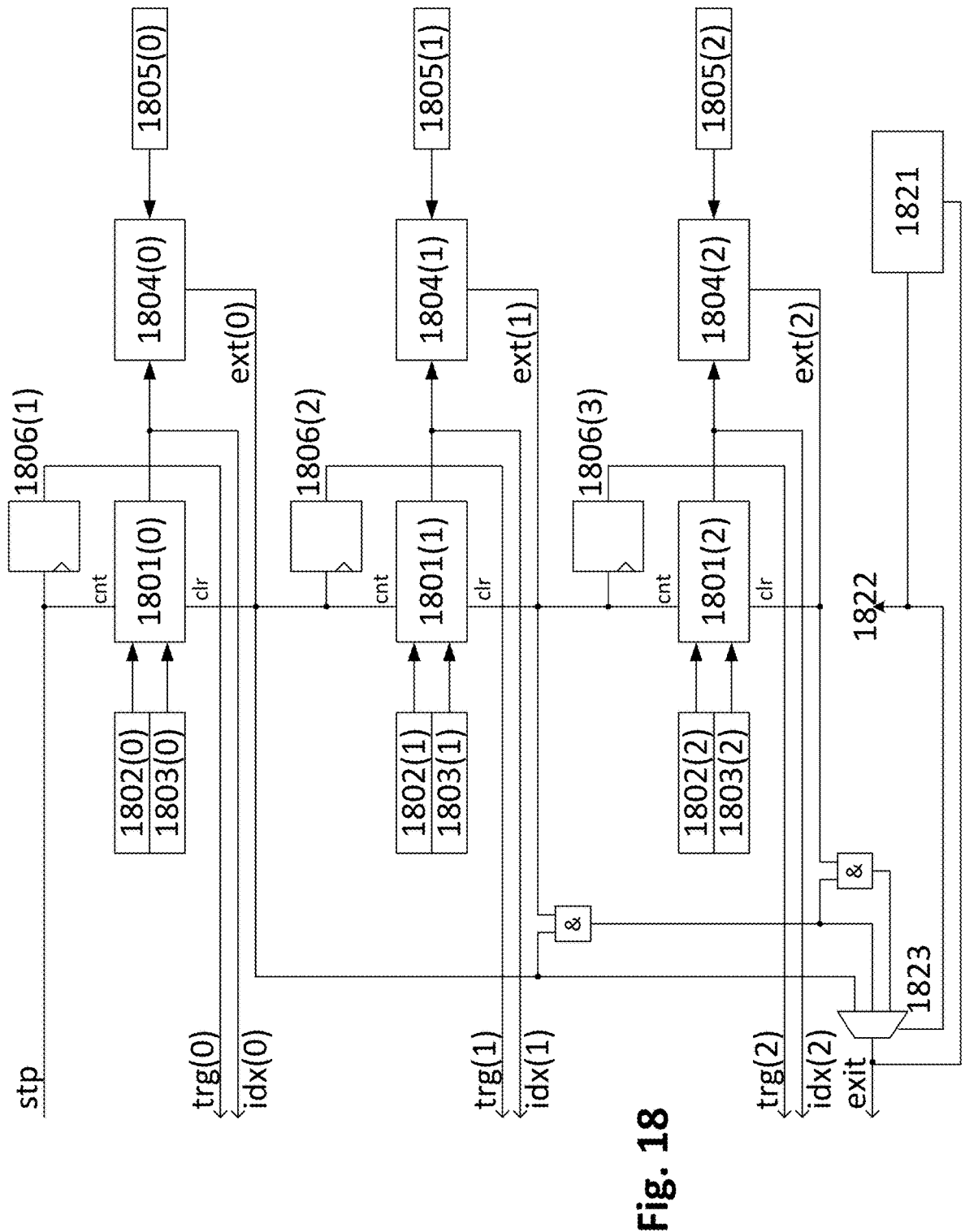
FIG. 18 is a diagrammatic illustration of an example implementation of an index computation part of a Loop Control Unit.

FIG. 18 shows an exemplary implementation of the index computation part of a Loop Control Unit for 3 indexes. It is obvious for one skilled in the art that the unit can be scaled down to as little as 1 index but also scales infinitely up (e.g. to 4, 6, 8, 16, or more indexes).

Each for the three stages is almost identical. Identical units are described only once and have an identical reference to which the stage number is added in bracket, e.g. 1801(1) is the counter of the first stage, 1801(3) the one of the third. Each of the tree index stages contains a counter 1801 to count the index. The counter can, depending on its programmable setup count up or down. The step width is selectable via a programmable step width register (1802). Also the initial index value is programmable via an initial value register (1803). The counter is connected to a comparator (1804) comparing the counter value to the loop termination value and generating a termination signal ext to indicate the loop exit upon termination. Once a loop terminates, the loop counter is cleared (clr) by loading the initial index value from 1803. The loop termination value is also programmable via a loop termination register (1805).

Programmable means that the respective value is set when issuing the respective instruction to the loop control unit. The values are independently set for each stage in accordance to the parameters of the respectively issued for- or endfor-instruction.

Each time the counter moves and produces a new result, a trigger signal trg is generated and the index value idx is updated. trg and idx are transmitted to the respectively connected unit(s) e.g. the Load Unit(s) and/or Execution Unit(s) and/or other units. The three trg signals trg(0) to trg(2) form for example 1704 or 1710. idx(0) is for example the register value r0 in FIG. 17A, idx(1) register r1, and idx(2) register r2.

The first index stage is triggered by a step signal stp to move (cnt) the index counter (1801(0)) via a signal coming in from a respectively connected unit, e.g. the Load Unit(s) and/or Execution Unit(s) and/or other unit(s). For example 1702 or 1709 would be connected to stp. The step signal is delayed by a flip-flop (1806) to generate the trg signal. The flip-flop compensates the counter latency, so that trg is in sync with then new index value.

Each subsequent stage is triggered by the ext signal of the previous stage.

An issue counter counts (1821) up with each instruction issued to the loop control unit producing a stage select value (1822). The value is used to select the next stage for instruction issue. For example when the first for- or endfor-instruction is issued to the loop control unit, the first stage (0) is select, the counter (1821) moves up, so that the second for- or endfor-instruction is issued to the second stage (1), and so on.

Also the value is used to select the loop exit (exit) signal informing processor control that the loop has terminated and instruction fetch and issue and data processing continues with the code behind the loop. If only a single loop is processed, the exit signal is generated from the ext(0) signal. A nested loop comprising two loops requires both loops to reach their termination criteria, so that ext(0) and ext(1) must be set. Respectively a nested loop comprising three loops require all three loops to reach their termination criteria, so that ext(0), ext(1) and ext(2) must be set.

The multiplexer 1823 selects the exit signal respectively, depending on the number if loops used which can be derived from 1822.

The issue counter is cleared when the loop terminates by the exit signal, so that a new loop is again issued starting with the first stage (0).

As an example, with reference to the code in FIG. 14C, the first for-instruction for (r0, +#1, r10, i_loop, #0) would be issued the first stage. idx(0) is linked to register r0 in the RPT. The step width in 1802(0) is set to #1, counting up (+#1). The termination value in register 1805(0) is set to the value of register r10, and the initial index value in 1803(0) is set to #0.

Then the loop counter moves up and the second for-instruction for (r1, +#1, r11, k_loop, #0) is accordingly issued to the second stage (1), and so on . . . .

FIG. 18A shows the computation of the Program Pointer (PP) while the Loop Control Unit is active (e.g. a loop is currently processed). After the loop code (including outer loops if nested loops are supported but only the inner loop if nested loops are not supported) the Program Pointer points to the next instruction after the loop. As discussed in FIG. 10, it is preferred if during loop execution the Program Pointer points to the start of the loop body. Thus during the execution of a loop, the processor's Program Pointer (PP) is replaced by a Loop Program Pointer (LPP) (1851) which is used as PP in case of an interrupt.

A loop status is computed by a loop status logic. The loop status selects, via a multiplexer, one of a plurality of addresses depending on the loop status. FIG. 18A shows an exemplary embodiment for the Loop Control Unit in FIG. 18. 3 nested loops are supported:

The loop status is computed by the loop status logic (1852) as follows:
- 00 if the inner loop (loop 0) is active;
- 01 if the inner loop (loop 0) has terminated but the second loop (loop 1) is still active;
- 10 if the inner loop (loop 0) and the second loop (loop 1) have terminated but the third loop (loop 2) is still active;
- 11 if all loops have terminated.

The loop status signal drives (1853) the select input (sel) of a multiplexer (1854). Via the multiplexer one of 4 addresses is selected as Loop Program Pointer (LPP) (1851) as such (reference is made to FIG. 14B or FIG. 14C and FIG. 18A):

- 00 start address (1855) of loop 0 (e.g. label j_loop:),
- 01 start address (1856) of loop 1 (e.g. label k_loop:),
- 10 start address (1857) of loop 2 (e.g. label i_loop:),
- 11 Program Pointer PP, pointing to the first instruction behind the loops (e.g. label exit:).

The programmable start address registers (1855, 1856, 1857) are set when the respective loop instruction is issued. Their content can, for example, be obtained either from
- a) the loop instructions address, e.g. in case of a for-instruction, the loop starts with the following instruction (i.e. instruction_address+1); or
- b) the jump back address of the loop, which is one of the parameters of (fused) the loop instruction.

Advanced Load/Store

The Instruction Set Architecture (ISA) of the processor preferably supports Load/Store instructions with implicit address generation, e.g. of the form address_of_data_transfer=base_address+offset.

Further the ISA preferably supports continuous address modifications (e.g. linear up, down, striding, 2- or 3-dimensional address pattern). Some of these schemes may require more complex type of offset calculation, e.g. including multiplication. Preferably also the calculated address of a data transfer is recorded (for example by writing it back into the base address), so that the next address calculation uses the previous address as a basis.

Preferably complex address generation requiring additional arithmetic operations such as addition and multiplications are supported.

As described before, preferably arithmetic operations for complex address calculation are merged with load/store instructions by the processor front and/or the processor instruction set architecture (ISA) supports load/store instructions with complex address generation.

An exemplary load/store unit is shown in FIG. 19, outlining most of the features described in this patent.

The unit is capable of receiving a total of 3 data operands (A, B, C) for address calculation from the Register File and/or Execution Units, A (1901), B (1902), and C (1903).

1901 is directly fed to a multiplier unit (1904), 1903 is directly fed to an adder unit (1905). 1902 can be fed to either the multiplier (1904) or the adder (1905) via the multiplexers 1906 and 1907. The two multiplexers 1906 and 1907 also allow for flexibly interconnecting the multiplier and adder to allow address calculations such as $$adr=A\times(B+C); \text{ and} \quad \text{i)}$$

$$adr=(A\times B)+C \quad \text{ii)}$$

Via multiplexer 1908 either the result of the multiplier (1904) (in case of i)) or adder (1905) (in case of ii)) is transmitted to a second adder (1909).

The second adder adds the value to a base address stored in the programmable register 1910. If no base address shall be added, the register value is set to zero (#0).

The multiplexers' selection inputs are also programmable. Programmable means, the register content or function is set when issuing the (fused) load or store instruction according to the instructions parameters.

The computed address (1911) is transmitted to the memory (1912) and additionally can be written back into the base register.

Loaded data received from memory enters an input register (1914). From there it is transmitted into a load data buffer (1915) for decoupling load operations form data processing, i.e. data loading from memory can be performed at greater timely independence from further data processing by e.g. the execution units. The load data buffer is typically implemented as a FIFO.

The loaded data can be read from the load data buffer by any of the subsequent operations (e.g. by the execution units). The load data buffer acts as the register of the Register File to which the data should be loaded according to the respective load instruction. Respectively RPT points to the load data buffer instead of the Register File. For example for fldr r4, [r8, (r10*r0)+r2)] (FIG. 14B, 1402) the RPT would point to the load data buffer of the load/store unit to which the instruction has been issued instead of register r4 of the processor's Register File.

Via multiplexer 1913 some values from the computation in the multiplexer and adder can be selected. It then made available as a register for transmitting the value to the execution units. This allows performing address calculation in a load/store unit and still making the result available for further processing in by the Execution Units which greatly increases the amount of fuseable address calculations.

The exemplary load/store unit also implements the FIFO stage 1632 as described in FIG. 16D. The FIFO stage 1632 is implemented by the following units:
1) A first FIFO 1916 to balance the latency of the memory path 1912.
2) A register (1917) to emulate the effect of the load data input register 1914.
3) A second FIFO 1918 operating exactly as and in sync with the load data buffer 1915.

Thus the input values A (1901), B (1902), and C (1903) and the value selected by 1913 are available at the output of the FIFO stage 1632 exactly in sync with the availability of the loaded data associated with the values.

As explained above for the load data buffer, the FIFO stage 1632 also acts as the register of the Register File. Respectively RPT points to the FIFO stage 1632 instead of the Register File for the respective registers.

Three trigger signals (1931) are received e.g. from Loop Control. Each of the triggers is tested by unit 1933 for being related to anyone of the data operands A (1901), B (1902) and C (1903); I.e. if any of the data operands is an index produces by the assigned load control unit and any of the triggers is the respective trg signal. For example if operand input A (1901) would be connected to idx(0) of FIG. 18, then trg(0) would be the related trigger.

The effect of a related trigger is, that it triggers a data transfer using the index idx related to that trigger which has been newly altered by loop control. Consequently the load/store unit would perform a memory operation at the new address (either a memory load or memory store operation). The inventive method and apparatus has little impact on the design of memory store operation, such the focus in this description is on memory load operations and it shall be assumed that the load/store unit operates as a load unit.

Respectively if any one of the incoming triggers is related with an index used as operand input at either A (1901), B (1902), or C (1903), a memory read operation is triggered (mem rd).

The unit 1932 just test for any incoming trigger signal regardless of its relation to any of the data operands A (1901), B (1902) and C (1903).

If any trigger occurs initiating a memory read, but none is related to any data operand input (A, B, or C), the signal copy is generated. However, since neither (A, B, or C) has changed, previously read data is re-read (read again). For that purpose the data from the input register (1914) copied into the load data buffer (1915) from where it can be read again. This is achieved by feeding the copy signal to a FIFO stage, similar to 1916 balancing the latency of the memory system (1912). A subsequent register 1935 synchronizes with the delay of the data input register 1914. Ultimately a buffer enable signal (buf_en) is generated to initiate the new transfer from the input register 1914 data to the data buffer 1915. Since the data in the input register has not been updated by a new memory read transfer (reg_en is not set), the data of the last transfer is just copied.

In case of an actual read, the read signal i) triggers a read transfer in the memory system (1912), and ii) is according to the copy signal fed to the FIFO stage 1934. After the FIFO stage it enables (reg_en) the input register (1914) to store the newly read data from memory system (1912). Then it is delayed by register 1935 to synchronize with the data input register (1914) and ultimately generates a buffer enable signal (buf_en) to initiate a new data transfer from the input register 1914 data to the data buffer 1915.

Used Symbols for Boolean Combinations

The following symbols are used to define Boolean operations:

| Boolean operation | Used symbol(s) |
| --- | --- |
| AND | & |
| OR | + or \|\| |
| NOT | ~ or ! |
| XOR | ⊕ or >\| |

LITERATURE AND PATENTS OR PATENT APPLICATIONS INCORPORATED BY REFERENCE

The following references are fully incorporated by reference into the patent for complete disclosure. It is expressively noted, that claims may comprise elements of any reference incorporated into the specification:

[1] ZZYX07: PCT/EP2009/007415 (WO2010/043401); Vorbach
[2] ZZYX08: PCT/EP2010/003459 (WO2010/142432); Vorbach
[3] ZZYX09: PCT/EP2010/007950 (WO2011/079942); Vorbach
[4] ZZYX10: PCT/EP2011/003428 (WO2012/003997); Vorbach
[5] ZZYX11: PCT/EP2012/000713 (WO2012/123061); Vorbach
[6] ZZYX12: PCT/EP2012/002419 (WO2012/167933); Vorbach
[7] ZZYX13: PCT/IB2012/002997 (WO2013/098643); Vorbach
[8] ZZYX14/15: EP 14 18 5745.8; Vorbach
[9] THE GREENDROID MOBILE APPLICATION PROCESSOR: AN ARCHITECTURE FOR SILICON'S DARK FUTURE; Nathan Goulding-Hotta, Jack Sampson, Ganesh Venkatesh, Saturnino Garcia, Joe Auricchio, Po-Chao Huang, Manish Arora, Siddhartha Nath, Vikram Bhatt, Jonathan Babb, Steven Swanson, Michael Bedford Taylor; University of California, San Diego; Published by the IEEE Computer Society; MARCH/APRIL 2011
[10] An Efficient Algorithm for Exploiting Multiple Arithmetic Units; R. M. Tomasulo; IBM Journal of Research and Development archive; Volume 11 Issue 1, January 1967 Pages 25-33; IBM Corp. Riverton, NJ, USA

[11] PCT/EP2002/002403 (WO2002/071249); Vorbach
[12] Trace Cache: a Low Latency Approach to High Bandwidth Instruction Fetching; Rotenberg, Bennett, Smith; IEEE; Proceedings of the 29th Annual International Symposium on Microarchitecture, Dec. 2-4, 1996, Paris
[13] CRIB: Consolidated Rename, Issue, and Bypass; Erika Gunadi, Intel Corporation, Santa Clara, CA and Mikko Lipasti, Department of Electrical and Computer Engineering, University of Wisconsin—Madison; ISCA'11, Jun. 4-8, 2011, San Jose, California, USA. Copyright 2011 ACM 978-1-4503-0472-6/11/06
[14] ARM7TDMI-S Data Sheet, ARM DDI 0084D, Chapter 4, ARM Instruction Set, Arm Limited, http://www.arm.com
[15] Computer Organization and Architecture, Chapter 15. Control Unit Operation; umcs.maine.edu; 2010 Mar. 16.
[16] The microarchitecture of Intel, AMD and VIA CPUs: An optimization guide for assembly programmers and compiler makers; Agner Fog (2014 Feb. 19); agner.org.
[17] The Architecture of the Nehalem Processor and Nehalem-EP SMP Platforms; Michael E. Thomadakis (2011 Mar. 17); Texas A&M University.
[18] Microarchitecture of Superscalars (3): Branch Prediction, Dersö Sima, Universitas Budensis, John von Neumann Faculty of Informatics; Fall 2007
[19] CS 152 Computer Architecture and Engineering: Lecture 6—Superpipelining+Branch Prediction; John Lazzaro; UC Berkeley; Feb. 6, 2014
[20] Lecture Notes: Out-of-Order Processors; Rajeev Balasubramonian; University of Utah; Oct. 13, 2007

The invention claimed is:

1. An out-of-order microprocessor having an out-of-order-mode, the out-of-order microprocessor executing instructions out of order in the out-of-order-mode, wherein, in the out-of-order-mode, some of the instructions have at least two source register references for referencing at least two source registers from which at least two operand data are received and one target register reference for referencing at least one result data register in which result data is stored, the out-of-order microprocessor comprising for the out-of-order-mode:
  a unit adapted to fetch said instructions in a fetching order from an instruction memory; and
  a unit adapted to issue the fetched instructions in the fetching order to a two-dimensional array of execution units,
    the execution units being adapted to produce the result data for storing in result data registers by processing operand data received from result data registers storing previously produced result data,
    the execution units beinginterconnectedin the two-dimensional array by a network that transmits processing results previously produced by execution units and stored in the result data registers as operand data to execution unit inputs,
    each of the execution units receiving an issued instruction, waiting for the operand data required for the received instruction to arrive from the result data register storing previously produced result data, processing the operand data after arrival from the network, producing the result data according to the instruction received, and storing the produced result data in a result data register for transmitting the produced result data to the network; wherein
    the result data is made available to receiving execution units, and after the result data has been made available to all receiving execution units requiring the result data as operand data, the respective execution unit that made the result data available becomes available for processing a new respective instruction issued from the unit adapted to issue the fetched instructions; and
    the result data is determined to have been transmitted to all receiving execution units requiring the result data as operand data based on records of a register positioning table, wherein the records include identifications of registers that store results of instructions and identifications of execution units that include the registers.

2. The out-of-order microprocessor of claim 1 wherein the result data is determined to have been transmitted to all receiving execution units requiring the result data as operand data based on a further instruction being issued by the unit adapted to issue the fetched instructions, the further instruction using, as a result register, a register of the respective execution unit that stores the result data.

3. A data processing chip comprising:
  a plurality of execution units that (I) each has a unique identifier, (II) each has at least one respective result register, and (III) are arranged in a multi-dimensional array that includes interconnections that interconnect the plurality execution units;
  an instruction fetcher, wherein the instruction fetcher is adapted to fetch said instructions in a fetching order from an instruction memory;
  an instruction issuer;
  wherein:
    the data processing chip is adapted to operate in an out-of-order processing mode in which the instruction issuer issues, selectively to available execution units of the plurality of execution units, the available execution units being a subset of the plurality of execution units that have been verified to have a status of being available, issuer instructions:
      (I) based on the fetched instructions that had been fetched from the instruction memory;
      (II) in the fetching order; and
      (III) one or more of which each, using a respective one or more of the unique identifiers, identifies from which one or more of the plurality of execution units output data is to be received (i) via the interconnections and (ii) as operand data for execution of the issuer instruction, the output data to be received having been previously generated by the one or more of the plurality of execution units by execution of one or more of the issuer instructions that had been issued earlier in the fetching order to the one or more of the plurality of execution units;
    each of at least some of the plurality of execution units is adapted to perform the following after receiving a respective one of the one or more of the issuer instructions having the identification:
      wait for the operand data of the respective one of the issuer instructions to be received via the interconnections from the one or more of the plurality of execution units identified by the respective one or more of the unique identifiers of the respective issuer instruction;
      process the operand data of the respective one of the issuer instructions once the operand data of the respective one of the issuer instructions has been received via the interconnections, thereby producing further output data; and store the produced further output data in the at least one respective result register of the respective one of the execution units, the further output data being transmittable from the at least one respective result register as operand data to other ones of the plurality of execution units for subsequent execution of other ones of the issuer instructions.

4. The data processing chip of claim 3, wherein, for the each of the at least some of the plurality of execution units, after the further output data produced by the respective execution unit has been stored in the at least one respective result register of the respective execution unit, status of the respective execution unit is changed from unavailable to available in response to the further output data of the respective execution unit having been transmitted to all other ones of the plurality of execution units that require the further output data of the respective execution unit as operand data.

5. The data processing chip of claim 3, wherein, for the each of the at least some of the plurality of execution units, after the further output data produced by the respective execution unit has been stored in the at least one respective result register of the respective execution unit, the instruction issuer is adapted to respond to the further output data of the respective execution unit having been transmitted to all other ones of the plurality of execution units that require the further output data of the respective execution unit as operand data by issuing a further instruction that (I) changes the status of the respective execution unit from unavailable to available and (II) uses the at least one respective result register of the respective execution unit in which the produced further output data had been stored by the respective execution unit.

6. The data processing chip of claim 3, wherein the interconnections are formed by a bus system that includes a plurality of transmission paths that are shared and selectively accessible by the plurality of execution units.

7. The data processing chip of claim 3, wherein the each of the one or more of the issued instructions further identifies a specific one of the at least one respective result register of the identified one or more of the plurality of execution units from which the operand data for the respective issued instruction is to be obtained.

8. The data processing chip of claim 3, further comprising:
a register positioning table that includes records with respective references to specific ones of the result registers storing specific ones of the output data, wherein the instruction issuer looks up the records in order to determine the identifiers to include in the issued instructions.

9. The data processing chip of claim 3, wherein the instruction issuer includes a trash unit that is configured to respond to, in response to a detection of a mis-predicted jump to an issued instruction being executed by one of the plurality of execution units, issue a trash signal that immediately aborts the respective issued instruction and changes the status of the executing one of the execution units to available.

10. The data processing chip of claim 3, further comprising an instruction analyzer, wherein the instruction analyzer is configured to compare groups of original instructions to predefined patterns, in response to a match for one of the groups of original instructions being determined by the comparison, replacing the respective group of original instructions with a consolidated instruction and sending the consolidated instruction to the instruction issuer for generating one of the issued instructions issued to one of the execution units.

11. A microprocessor, the microprocessor being adapted to operate on instructions and having:
execution units arranged in an array for processing operand data and producing result data according to instructions issued and being adapted to use registers as source registers for storing operand data and target registers for storing result data;
a network for the interconnection of the execution units;
units adapted to fetch said instructions on which the microprocessor operates and to issue the instructions in a fetching order respectively;
units adapted to fetch said instructions on which the microprocessor operates and to issue the instructions in a fetching order respectively; and
a register positioning table adapted to reference as references to target registers for storing result data to the execution units producing the result data;
wherein the unit for issuing the instructions in the fetching order is adapted to:
lookup operand sources in the register positioning table for enabling the execution units to obtain the operands via the network by setting operand input references of the instruction to be issued in view of the looked up reference sources;
issue the instructions to an available execution unit; and
enter a reference to the target register for storing the result data the execution unit receiving the instruction is to produce into the register positioning table.

12. The microprocessor of claim 11, wherein result data is transmitted over the network from the target register of a producing execution unit to at least one source register of at least one receiving execution unit.

13. The microprocessor of claim 12, wherein in a releasing processing mode, after the result data of the producing execution unit has been transmitted to all receiving execution units requiring the result data as operand data, the producing execution unit becomes available for receiving a new instruction from the unit adapted to issue instructions in a fetching order.

14. The microprocessor of claim 12, wherein in a semi-static processing mode, after the result data of the producing execution unit has been transmitted to all receiving execution units requiring the result data as operand data, the producing execution unit continues processing on the same instruction newly received operand data to produce new result data.

15. The microprocessor of claim 14, wherein:
both, a releasing processing mode and the semi-static processing mode are used, the releasing processing mode for processing algorithms out-of-order and the semi-static processing mode for accelerating loops; and
in the releasing processing mode, after the result data of the producing execution unit has been transmitted to all receiving execution units requiring the result data as operand data, the producing execution unit becomes available for receiving a new instruction from the unit adapted to issue instructions in a fetching order.

16. The microprocessor of claim 15, wherein the processor switches between the releasing and semi-static processing modes within at least one clock cycle.

17. The microprocessor of claim 12, wherein in a releasing processing mode, the source register input is set by the unit for issuing the instructions to receive result data over the network from the execution unit producing the result.

18. The microprocessor of claim 12, wherein in a semi-static processing mode, the network is set up to interconnect the execution units for transmitting data accordingly to the register access pattern of the issued instructions.

19. The microprocessor of claim 17, wherein:
the releasing processing mode is used for processing algorithms out-of-order; and
in a semi-static processing mode, which is used for accelerating loops, the network is set up to interconnect the execution units for transmitting data accordingly to the register access pattern of the issued instructions.

20. The microprocessor of claim 19, wherein the processor switches between the releasing and semi-static processing modes within at least one clock cycle.

21. The microprocessor of claim 11, wherein the fetched instructions are, before being issued by the unit for issuing the instructions, amended with operand input references, retrieved from the register positioning table, to the operand sources in the array.

* * * * *